US011593074B2

(12) United States Patent
Kang et al.

(10) Patent No.: US 11,593,074 B2
(45) Date of Patent: Feb. 28, 2023

(54) SYSTEM, METHOD, AND APPARATUS FOR DATA-CENTRIC NETWORKED APPLICATION DEVELOPMENT SERVICES

(71) Applicant: BizFlow Corporation, Falls Church, VA (US)

(72) Inventors: Jongbaek Kang, Centerville, VA (US); Grace Ahn, Vienna, VA (US); Jae Kyoung Ahn, Vienna, VA (US)

(73) Assignee: BizFlow Corporation, Falls Church, VA (US)

( * ) Notice: Subject to any disclaimer, the term of this patent is extended or adjusted under 35 U.S.C. 154(b) by 0 days.

(21) Appl. No.: 17/085,596

(22) Filed: Oct. 30, 2020

(65) Prior Publication Data

US 2021/0149645 A1 May 20, 2021

Related U.S. Application Data

(60) Provisional application No. 62/935,346, filed on Nov. 14, 2019.

(51) Int. Cl.

*G06F 8/34* (2018.01)
*G06F 8/33* (2018.01)
*H04L 67/131* (2022.01)

(52) U.S. Cl.

CPC .................. *G06F 8/34* (2013.01); *G06F 8/33* (2013.01); *H04L 67/131* (2022.05)

(58) Field of Classification Search

None

See application file for complete search history.

(56) References Cited

U.S. PATENT DOCUMENTS

| | | | | |
|---|---|---|---|---|
| 5,619,708 | A * | 4/1997 | Ho | G06F 3/0489 358/453 |
| 7,720,879 | B2 * | 5/2010 | Tsyganskiy | G06F 8/72 707/803 |
| 8,726,234 | B2 * | 5/2014 | Mital | G06F 8/70 717/115 |
| 2010/0031167 | A1 * | 2/2010 | Roytman | G06F 16/972 715/760 |
| 2011/0225485 | A1 * | 9/2011 | Schnitt | G06F 40/197 715/222 |
| 2015/0193418 | A1 * | 7/2015 | Koska | G05B 19/0423 715/223 |

(Continued)

OTHER PUBLICATIONS

McCutchen et al., "Object Spreadsheets: A New Computational Model for End-User Development of Data-Centric Web Applications " ACM, 2016, 17pg. (Year: 2016).*

(Continued)

*Primary Examiner* — Ryan D. Coyer

(74) *Attorney, Agent, or Firm* — H.C. Park & Associates, PLC

(57) ABSTRACT

A method for data-centric networked application development includes: modifying a graphical user interface of a networked application development environment with a selectable component for including a reusable data entity in a project, the reusable data entity being defined and bound to a form component via interaction with the graphical user interface; and configuring a block of a data-centric form of the project with the form component in response to selection of the selectable component at a design surface of the graphical user interface.

20 Claims, 64 Drawing Sheets

(56) References Cited

U.S. PATENT DOCUMENTS

| | | | | |
|---|---|---|---|---|
| 2015/0281333 | A1* | 10/2015 | Albert | H04L 67/38 715/744 |
| 2016/0036898 | A1* | 2/2016 | Curtis | G09B 19/003 709/203 |
| 2017/0337265 | A1* | 11/2017 | Garrett | G06F 40/103 |
| 2020/0110792 | A1* | 4/2020 | Tsabba | G10L 17/00 |

OTHER PUBLICATIONS

Xu et al., "A method of demand-driven and data-centric Web service configuration for flexible business process implementation," Taylor & Francis, 2016, 20pg. (Year: 2016).*
Fu et al., "FORWARD: Data-Centric Uls using Declarative Templates that Efficiently Wrap Third-Party JavaScript Components," VLDB Endowment, 2014, 4pg. (Year: 2014).*
Khodadadi et al., "A Data-Centric Framework for Development and Deployment of Internet of Things Applications in Clouds," IEEE, 2015, 6pg. (Year: 2015).*

* cited by examiner

FIG. 59
Basic Service Performance
URI
Count
Total Time (ms)
Average Response Time (ms)
Least Response Time (ms)
Greatest Response Time (ms)
Request ID
Date
Log User
User Address
Response Time (ms)
Parameter

FIG. 61
Data Service Performance

SYSTEM, METHOD, AND APPARATUS FOR DATA-CENTRIC NETWORKED APPLICATION DEVELOPMENT SERVICES

CROSS-REFERENCE TO RELATED APPLICATIONS

This application claims priority to and the benefit of U.S. Provisional Patent Application No. 62/935,346, filed Nov. 14, 2019, which is hereby incorporated by reference for all purposes as if fully set forth herein.

BACKGROUND

Field

Exemplary embodiments relate to application development, and, more particularly, to data-centric networked application development services.

Discussion

Whether an organization is seeking to develop a new application or improve upon features of an existing application, the overall success of a venture may rest upon the amount of time to market, the quality of the application being developed, and the ability to quickly adapt to changed circumstances. Despite applications having rapidly evolving lifecycles, the data behind these applications tends to be more statically defined. For instance, the manner in which an application gathers or captures information may evolve through its lifecycle, but the types of information being gathered typically remains the same or is merely supplemented as time goes on. As such, developers usually devote a significant amount of time and resources manually creating, testing, deploying, and updating (hereinafter, collectively referred to as "developing") applications to ensure, for instance, high-quality capture of user information. For example, a vast amount of time and resources may be devoted to developing networked data capture forms, which typically capture input information through various form fields. Moreover, as the size and complexity of the forms, the data, and associated business rules increases so too does the amount of time and resources devoted to developing and application.

The above information disclosed in this section is only for understanding the background of the inventive concepts, and, therefore, may contain information that does not form prior art.

SUMMARY

A need exists for efficient, cost-effective techniques to improve the systems, methods, and tools for application development, and, in particular, the systems, methods, and tools utilized to develop data capture forms.

Apparatuses and systems constructed according to principles and some exemplary embodiments of the inventive concepts provide a data-centric approach to developing networked applications that enables users to define, gather, and establish data (e.g., process variables) at an early stage of application development, such as form development.

Apparatuses and systems constructed according to principles and some exemplary embodiments of the inventive concepts implement changeable and reusable data entities, blocks of previously developed forms, and previously developed forms themselves to enable organizations to: create higher performing networked applications; collect information in one or more centralized databases; reuse and reference preexisting development efforts to build new or modify existing forms; and manage data more effectively. Each of these aspects further empowers the improvement to organizational workflow models.

Apparatuses and systems constructed according to principles and some exemplary embodiments of the inventive concepts seek to provide an intuitive application development environment including features and functionality for dynamically designing, building, deploying, and changing aspects of data and/or forms to enable users without technical backgrounds to build a powerful, networked application without necessarily needing help from a conventional software developer, such as a user interface engineer, database engineer, etc.

In this manner, various aspects provide a method for data-centric networked application development, an apparatus for data-centric networked application development, and/or a system capable of providing data-centric networked application development services.

Additional aspects will be set forth in the detailed description which follows, and, in part, will be apparent from the disclosure, or may be learned by practice of the inventive concepts.

According to some aspects, a method for data-centric networked application development includes: modifying a graphical user interface of a networked application development environment with a selectable component for including a reusable data entity in a project, the reusable data entity being defined and bound to a form component via interaction with the graphical user interface; and configuring a block of a data-centric form of the project with the form component in response to selection of the selectable component at a design surface of the graphical user interface.

In some exemplary embodiments, the method may further include: receiving, via the graphical user interface, selection of a first plurality of parameters associated with a piece of collectable data; and generating data schema defining the reusable data entity utilizing the first plurality of parameters.

In some exemplary embodiments, the data schema may include the first plurality of parameters stored as nested objects in at least one of a JavaScript Object Notation (JSON) document tree and an Extensible Markup Language (XML) tree.

In some exemplary embodiments, in association with collection of the piece of collectable data from at least one target via the data-centric form, instances of the piece of collectable data are stored as nested values in at least one of the JSON document tree and the XML document tree.

In some exemplary embodiments, the method may further include mapping, in association with configuring the data-centric form, at least one of the first plurality of parameters in the data schema to a database location according to a predefined application programming interface for collection of the piece of collectable data from at least one target via the data-centric form. The predefined application programming interface may be database agnostic.

In some exemplary embodiments, the method may further include receiving, via the design surface, an interaction to modify a position of the block of the data-centric form relative to another block of the data-centric form. Modification of the position in association with the interaction may not affect the mapping of the at least one of the first plurality of parameters in the data schema to the database location.

In some exemplary embodiments, the database location may be a row in a Structured Query Language (SQL) database table.

In some exemplary embodiments, the method may further include: generating form schema defining the form component utilizing a plurality of look-and-feel parameters received via the graphical user interface, the look-and-feel parameters governing configuration of the form component; and mapping the data schema to the form schema to bind the reusable data entity to the form component.

In some exemplary embodiments, the method may further include receiving a request to publish the reusable data entity to the project. The selectable component may be added to the graphical user interface in response to receiving the request.

In some exemplary embodiments, the selectable component may be one of a plurality of selectable components added to the graphical user interface, each of the plurality of selectable components enabling inclusion of at least one of another reusable data entity bound to another form component, a group of reusable data entities bound to corresponding form components, and a block of a previously configured data-centric form.

In some exemplary embodiments, some of the plurality of selectable components may be modified to the graphical user interface from a predefined library.

In some exemplary embodiments, the some of the plurality of selectable components may be modified to the graphical user interface from the predefined library based on user profile information and at least one business rule.

In some exemplary embodiments, the method may further include: receiving a request to publish the data-centric form; and causing, at least in part, the data-centric form to be deployed to at least one network node.

In some exemplary embodiments, the selection of the selectable component may be a drag-and-drop input.

In some exemplary embodiments, the graphical user interface may include a "what you see is what you get" (WYSIWYG) editor configured to automatically generate underlying computer code for the data-centric form in response to interaction with the graphical user interface.

In some exemplary embodiments, the graphical user interface may be provided over at least one network via a portal uniquely accessible to users via corresponding uniform resource locators.

In some exemplary embodiments, communication over the at least one network may be encrypted according to an Advanced Encryption Standard utilizing temporary keys.

In some exemplary embodiments, the graphical user interface may be configured to interact with an integration server configured to provide access to one or more services associated with development of the data-centric form, the one or more services including at least one of application programming interface services, monitoring services, and reporting services.

According to some aspects, an apparatus includes at least one processor and at least one memory. The at least one memory includes one or more sequences of one or more instructions that, when executed by the at least one processor, cause the apparatus at least to: receive, via a form component configured as part of a data-centric form accessible over at least one communication network, an instance of data defined by a reusable data entity bound to the form component, the data-centric form including schema defining the reusable data entity and binding the reusable data entity to the form component; store the instance of data as a nested value in an abstract storage structure according to the schema, the abstract storage structure being backend database agnostic; and transmit, over the at least one communication network, the instance of data to a backend database according to a predefined application programming interface mapping the reusable data entity to a storage location in the backend database, wherein modification of the form component relative to another form component of the data-centric form does not affect the mapping between the reusable data entity and the storage location.

According to some aspects, a system for providing data-centric networked application development services to a user over at least one network includes a portal, a first server, and a second server. The portal is configured to provide the user unique access to a graphical user interface of an application development environment. The user is assigned a unique uniform resource locator to access the portal over the at least one network. The first server is coupled to the portal via the at least one network. The first server is configured to provide a data-centric form building engine to the graphical user interface to enable the user to: generate a data model including a data entity defining a piece of collectable data via a plurality of first parameter selections, the data entity being bound to a form component capable of receiving the piece of data; customize the form component via a plurality of second parameter selections; develop a data-centric form via gesture-based interaction with at least a representation of the data model; interface with a database configured to store the data model along with instances of the piece of collectable data as nested values in the data model; and publish a networked application to enable collection of the piece of collectable data from a target via the data-centric form. The second server is coupled to the first server via the at least one network. The second server is configured to provide access, via the graphical user interface, to an application programming interface service to support the data-centric form. In association with the development of the data-centric form, the data-centric form building engine is configured to: modify the graphical user interface with a selectable component for including the data entity in a project of the networked application, the selectable component being configured as part of the representation of the data model; and configure a block of the data-centric form of the project with the form component in response to selection of the selectable component at a design surface of the graphical user interface.

The foregoing general description and the following detailed description are exemplary and explanatory and are intended to provide further explanation of the claimed subject matter.

BRIEF DESCRIPTION OF THE DRAWINGS

The accompanying drawings, which are included to provide a further understanding of the inventive concepts, and are incorporated in and constitute a part of this specification, illustrate exemplary embodiments of the inventive concepts, and, together with the description, serve to explain principles of the inventive concepts. In the drawings.

DETAILED DESCRIPTION OF SOME EXEMPLARY EMBODIMENTS

Figure 1:
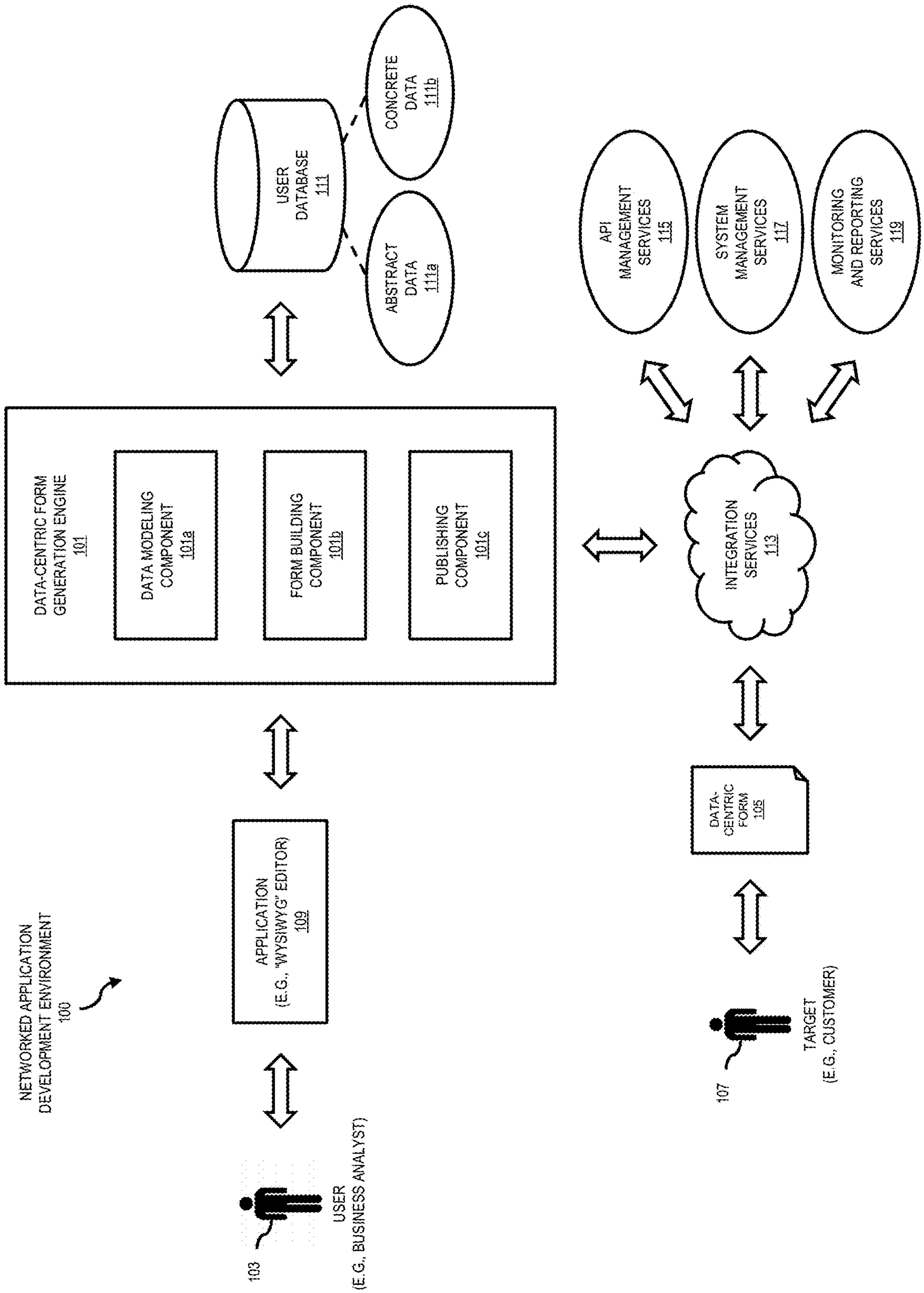
FIG. 1 is a diagram of a networked application development environment including a data-centric form generation engine according to some exemplary embodiments.

In the following description, for the purposes of explanation, numerous specific details are set forth in order to provide a thorough understanding of various exemplary embodiments. As used herein, the terms "embodiments" and "implementations" are used interchangeably and are non-limiting examples employing one or more of the inventive concepts disclosed herein. It is apparent, however, that various exemplary embodiments may be practiced without these specific details or with one or more equivalent arrangements. In other instances, well-known structures and devices are shown in block diagram form in order to avoid unnecessarily obscuring various exemplary embodiments. Further, various exemplary embodiments may be different, but do not have to be exclusive. For example, specific shapes, configurations, processes, and characteristics of an exemplary embodiment may be used or implemented in another exemplary embodiment without departing from the inventive concepts.

Unless otherwise specified, the illustrated exemplary embodiments are to be understood as providing exemplary features of varying detail of some exemplary embodiments. Therefore, unless otherwise specified, the features, components, modules, regions, aspects, etc. (hereinafter individually or collectively referred to as an "element" or "elements"), of the various illustrations may be otherwise combined, separated, interchanged, and/or rearranged without departing from the inventive concepts.

In the accompanying drawings, the size and relative sizes of elements may be exaggerated for clarity and/or descriptive purposes. As such, the sizes and relative sizes of the respective elements are not necessarily limited to the sizes and relative sizes shown in the drawings. When an exemplary embodiment may be implemented differently, a specific process order may be performed differently from the described order. For example, two consecutively described processes may be performed substantially at the same time or performed in an order opposite to the described order. Also, like reference numerals denote like elements.

When an element, such as a layer, is referred to as being "on," "connected to," or "coupled to" another element, it may be directly on, connected to, or coupled to the other element or intervening elements may be present. When, however, an element is referred to as being "directly on," "directly connected to," or "directly coupled to" another element, there are no intervening elements present. Other terms and/or phrases used to describe a relationship between elements should be interpreted in a like fashion, e.g., "between" versus "directly between," "adjacent" versus "directly adjacent," "on" versus "directly on," etc. Further, the term "connected" may refer to physical, communicative, and/or electrical connection. For the purposes of this disclosure, "at least one of X, Y, and Z" and "at least one selected from the group consisting of X, Y, and Z" may be construed as X only, Y only, Z only, or any combination of two or more of X, Y, and Z, such as, for instance, XYZ, XYY, YZ, and ZZ. As used herein, the term "and/or" includes any and all combinations of one or more of the associated listed items.

Although the terms "first," "second," etc. may be used herein to describe various elements, these elements should not be limited by these terms. These terms are used to distinguish one element from another element. Thus, a first element discussed below could be termed a second element without departing from the teachings of the disclosure.

The terminology used herein is for the purpose of describing particular embodiments and is not intended to be limiting. As used herein, the singular forms, "a," "an," and "the" are intended to include the plural forms as well, unless the context clearly indicates otherwise. Moreover, the terms "comprises," "comprising," "includes," and/or "including," when used in this specification, specify the presence of stated features, integers, steps, operations, elements, components, and/or groups thereof, but do not preclude the presence or addition of one or more other features, integers, steps, operations, elements, components, and/or groups thereof. It is also noted that, as used herein, the terms "substantially," "about," and other similar terms, are used as terms of approximation and not as terms of degree, and, as such, are utilized to account for inherent deviations in measured, calculated, and/or provided values that would be recognized by one of ordinary skill in the art.

Unless otherwise defined, all terms (including technical and scientific terms) used herein have the same meaning as commonly understood by one of ordinary skill in the art to which this disclosure is a part. Terms, such as those defined in commonly used dictionaries, should be interpreted as having a meaning that is consistent with their meaning in the context of the relevant art and will not be interpreted in an idealized or overly formal sense, unless expressly so defined herein.

As customary in the field, some exemplary embodiments are described and illustrated in the accompanying drawings in terms of functional blocks, units, and/or modules. Those skilled in the art will appreciate that these blocks, units, and/or modules are physically implemented by electronic (or optical) circuits, such as logic circuits, discrete components, microprocessors, hard-wired circuits, memory elements, wiring connections, and the like, which may be formed using semiconductor-based fabrication techniques or other manufacturing technologies. In the case of the blocks, units, and/or modules being implemented by microprocessors or other similar hardware, they may be programmed and controlled using software (e.g., microcode) to perform various functions discussed herein and may optionally be driven by firmware and/or software. It is also contemplated that each block, unit, and/or module may be implemented by dedicated hardware, or as a combination of dedicated hardware to perform some functions and a processor (e.g., one or more programmed microprocessors and associated circuitry) to perform other functions. Also, each block, unit, and/or module of some exemplary embodiments may be physically separated into two or more interacting and discrete blocks, units, and/or modules without departing from the inventive concepts. Further, the blocks, units, and/or modules of some exemplary embodiments may be physically combined into more complex blocks, units, and/or modules without departing from the inventive concepts.

Hereinafter, various exemplary embodiments will be explained in detail with reference to the accompanying drawings.

FIG. 1 is a diagram of a networked application development environment including a data-centric form generation engine according to some exemplary embodiments. For illustrative purposes, networked application development environment (or "environment") 100 is described with respect to data-centric form generation engine (or "engine") 101 configured to enable user 103 (e.g., a business analysts), to create, test, monitor, and update (hereinafter, collectively referred to as "develop") data-centric forms, such as data-centric form (or "form") 105, which may be published as a networked application to collect data from target 107 (e.g., a customer). As used, herein, a "networked application" may refer to an application that exchanges information over at least one network. Engine 101 may interface with an application 109, user database 111, and integration services 113 as part of enabling user 103 to develop, for example, form 105, and, thereby, provide an end-to-end solution for networked application development. Engine 101 provides application 109 with access to data modeling component 101*a*, form building component 101*b*, and publishing component 101*c* to assist user 103 in developing form 105, such as enable user 103 to generate a data model for form 105, design form 105 via interaction with a representation of the data model, customize the look-and-feel of form 105, and publish not only a networked application to deploy form 105, but also aspects of the data model to a project.

Various embodiments of environment 100 stem from the recognition that conventional processes and tools for networked application development, such as web-based application development, are time-consuming and typically repetitive at least because the conventional processes and tools lack reusability and changeability of data and aspects of forms, such as form fields. It is also recognized that when an organization typically starts a project, various types of engineers may be tasked to collaborate with one another, such as user interface engineers and database engineers. User interface engineers are usually responsible for creating the look-and-feel of an application, e.g., such as mocking up a wireframe for a form. As such, a user interface engineer may draw various form components, such as text boxes, radio inputs, buttons, dropdowns, checkboxes, etc., and lay out the form components to generate a wireframe mockup. Database engineers are typically responsible for building one or more databases and data configurations, as well as allocating the location of variables in the database that are to be gathered via a published form. At some point in time, the user interface engineers and the database engineers will collaborate to create links between the form and the database by binding the variables of the database to the form components. In other words, hard-code is manually written to formulate the links between each form component and each variable to be stored as concrete data. It is no wonder that these conventional processes and tools create inefficiencies given the intensively manual nature (e.g., lack automation) of the design and coding processes, as well as the primary focus on user interface design.

Maintenance is also a manual process, and, therefore, inefficient. For example, if a component, such as a text box, is to be added or revised to a form, a user interface engineer will typically mockup a new form component, create a new wireframe incorporating the form component into an existing design, pass the new wireframe to a database engineer to revise the database, link the form components and variables of the revised form, and test each aspect of the revised form to ensure the modifications do not adversely affect any other form features. In this manner, modifications to the user interface typically necessitate changes to the backend database supporting the user interface. Also, due to the user interface focus, little attention may be devoted to considering the organization of data. This can lead to performance inefficiencies, as well as programming bugs. For instance, although user interface and database engineers may share a general concept of the data to be captured, these engineers may code (or reference) the data in different manners. For example, a user interface engineer may define a variable as a "name," whereas a database engineer may define the variable as a "username." Finding and resolving issues can add to a lack of reusability and changeability of the data and aspects of forms that have been previously created given that deciphering what was done by others can be more complicated and time consuming than starting from scratch. This increases the amount of time and resources spent resolving revision requests.

Accordingly, one or more exemplary embodiments of environment 100 seek to provide a data-centric approach to developing networked applications that enables users to define, gather, and establish data (e.g., process variables) at an early stage of application development, such as form development, via data modeling component 101*a* of engine 101. In addition, some exemplary embodiments seek to implement changeable and reusable data entities, blocks of previously developed forms, and previously developed forms themselves to enable organizations to: create higher performing applications (e.g., networked applications); collect information in one or more databases (e.g., centralized databases); reuse and reference preexisting development efforts to build new or modify existing forms; and manage data more effectively. Each of these aspects further empowers the improvement to organizational workflow models.

Moreover, some exemplary embodiments seek to provide an intuitive application development environment including features and functionality for dynamically designing, building, deploying, and changing aspects of data and/or forms to enable users without technical backgrounds to build a powerful, networked application without necessarily needing help from a conventional software developer, such as a user interface engineer, database engineer, etc. In some exemplary embodiments, application 109 may provide a front-end framework (e.g., graphical user interface) enabling users to build networked applications in a visual environment, e.g., in a "what you see is what you get" (WYSIWYG) environment. As such, form 105 may be visually developed, updated, changed, and published according to basic user commands, such as gesture-based inputs (e.g., drag-and-drop commands, button clicks, option selections, etc.) versus utilizing manual hard-coding techniques of conventional approaches. Thus, various exemplary embodiments enable user 103 to develop networked applications without coding experience. It is noted, however, that application 109 may also enable conventional hard-coding techniques to aid and supplement the development of form 105.

Some exemplary embodiments enable engine 101 to be backend database-agnostic, and, thereby, function with any backend database management system. As such, users may first define and organize data to be gathered via application 109 making use of data modeling component 101*a* of engine 101 before dealing with aspects of user interface design via form building component 101*b* of engine 101. For example, once a data model is setup, users may bind each piece of collectable data of the data model to a corresponding form component to be used in an application without manually writing hard code, e.g., users may simply provide one or more basic input commands, e.g., drag-and-drop commands, text input commands defining look-and-feel parameters, etc., to develop form 105 in association with application 109 and engine 101. To this end, data modeling component 101*a* may be configured to automatically generate or use predefined application programming interfaces (APIs) to not only store the data model as abstract data 111*a* to user database 111, but also store instances of data collected via form 105 as nested values in the data model. Data modeling component 101*a* may also generate or use predefined APIs to cause, at least in part, instances of data collected via form 105 to be stored to corresponding storage locations in concrete data 111*b* of user database 111. In this manner, engine 101 may enable users to organize their data separately from user interface components to improve recyclability and reusability of their development efforts. As such, various exemplary embodiments may utilize various levels of data abstraction to define data and operations to be performed, but not specifically define how such data and operations are to be implemented regardless of the backend database utilized to store concrete data. Utilization of data abstraction also enables changes to be easily implemented.

The simplicity of data definition and form building also translates into form publishing aspects, which may be facilitated via publishing component 101*c* of engine 101 and application 109. For instance, users 103 may deploy their forms 105 with the simple touch of a button via application 109. In this manner, publishing component 101*c* may package one or more application modules to enable deployment (e.g., install and operation) of form 105 in a development scenario to collect data from at least one target 107 to be stored as concrete data 111*b* in, for instance, user database 111.

It is also noted that, if a desire arises to utilize existing data definitions, forms, or aspects of forms from another project, the data definitions, forms, and/or aspects of forms can be imported from, for instance, user database 111 into a current project for reuse, update, and/or modification. In this manner, engine 101 may be configured to provide users with access to libraries of data entities defining pieces of collectable data and blocks of previously configured forms to aid in form development to further reduce time and resource expenditure. As such, various exemplary embodiments of environment 100 enable users 103 to reduce manual workflow processes and to improve reusability and changeability of their data, blocks, and forms.

According to some exemplary embodiments, engine 101 may interface with integration services 113 as part of developing, publishing, managing, and monitoring form 105. For instance, integration services 113 may include at least one integration server configured to provide API services 115, system management services 117, and monitoring and reporting services 119 to user 103 via application 109.

For instance, the API management services 115 may enable users 103 to access at least one predefined API and/or to register at least one first or third-party API as part of developing form 105. In this manner, API management services 115 may be configured to learn first and/or third-party APIs once registered, as well as enable users 103 to test APIs accessible to integration services 113, and, thereby, accessible to application 109. Further, API management services 115 may provide and update at least one API to a project as form 105 is being developed. For instance, platform 201 may provide users with the ability to register, access, and utilize representational state transfer (REST), simple object access protocol (SOAP), etc., APIs as part of developing form 105. Backend operations (including, for instance, external system integration and/or first or third party resource incorporation) may be delegated to integration services 113 and engine 101 versus being hard-coded. In some embodiments, form 105 may be designed for an API, and, for instance, may call an API to create, delete, retrieve, update, etc., data. For example, at least one aspect of form 105 may be designed to handle the result (e.g., record) of an API operation, such as a "GET" command or any other suitable API function.

System management services 117 may enable management of components of environment 100, such as engine 101, application 109, and user database 111. It is also contemplated that system management services 117 may be employed to restrict access to the features and functions of environment 100, as well as assign users unique uniform resource locators to access the features and functions of engine 101 via application 109. Monitoring and reporting services 119 may enable user 103 to test and view performance of form 105 in a simulated and/or deployed scenario, as well as receive reports in response to one or more triggering events associated with the performance of form 105. It is also contemplated that system management services 117 may be configured to optimize automated code generation and runtime performance of an application, such as form 105.

Accordingly, integration services 113 may be configured to allow user 103 via application 109 and engine 101 to register query statements, networked service requests and/or responses, file locations, etc., which may be part of generating and/or documenting one or more APIs. Further, users need not expend significant effort maintaining or debugging applications in which the data, blocks, and/or form have already been defined. Moreover, instead of wading through complex code, users seeking an understanding of a database structure, a relationship between data entities of user database 111 and form components utilized to capture such data, etc., can simply refer to previously generated API documentation, which, as previously mentioned, may be automatically generated and updated by API management services 115 during data modeling and/or form building processes. Accordingly, various exemplary embodiments are capable of providing a complete end-to-end solution that enables user 103 (whether or not technically savvy) to not only quickly create, deploy, and manage data-centric networked applications, but also monitor and adapt their data-centric networked applications once deployed. Additional features and functions of environment 100, engine 101, user database 111, and integration services 113 will become more apparent below in association with the description of a system configured to provide data-centric networked application development services to users, such as user 103.

Figure 2:
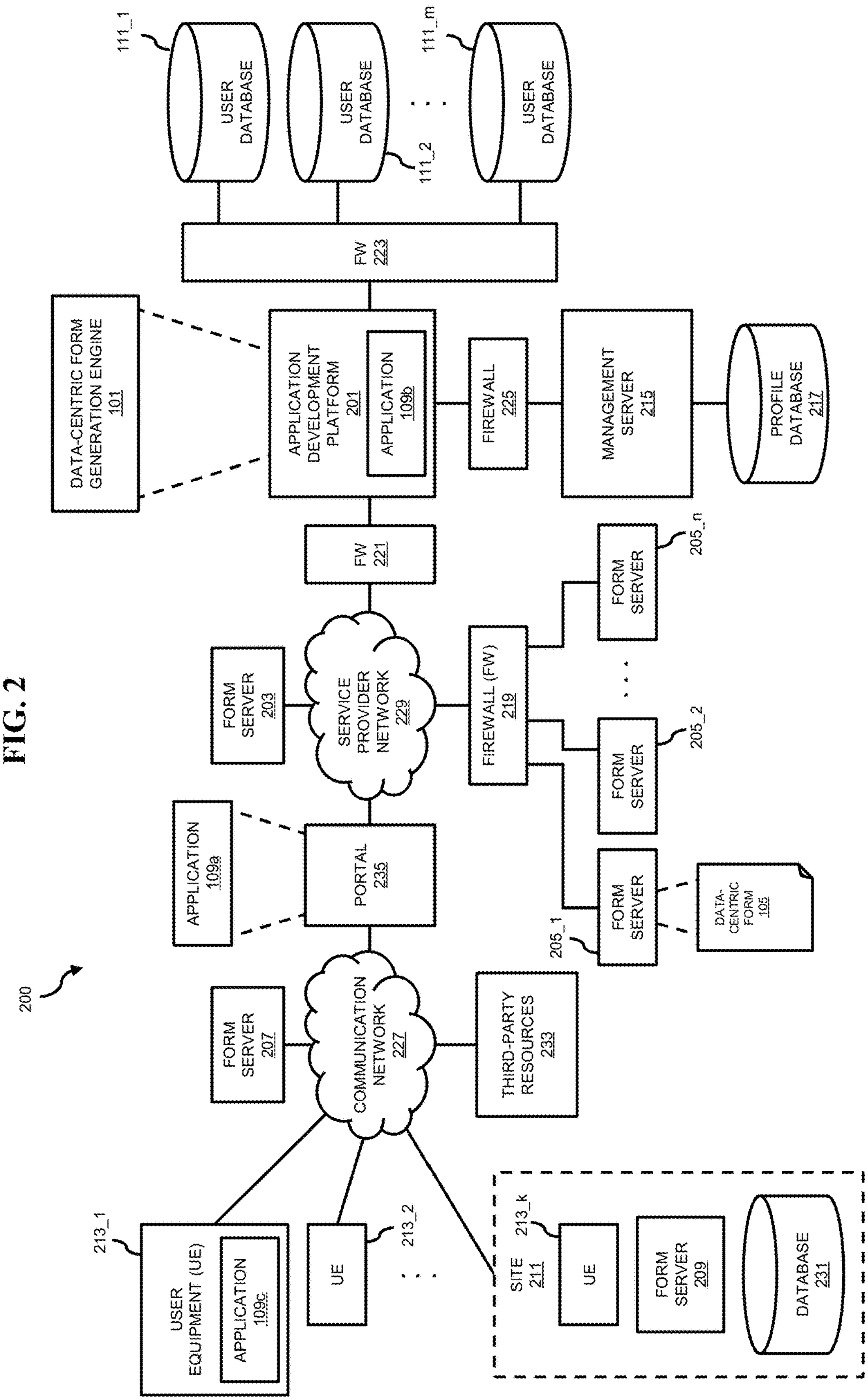
FIG. 2 is a diagram of a system configured to provide data-centric networked application development services via a data-centric form generation engine according to some exemplary embodiments.

FIG. 2 is a diagram of a system configured to provide data-centric networked application development services via a data-centric form generation engine according to some exemplary embodiments. For illustrative purposes, system 200 is described with respect to application development platform (or platform) 201 configured to provide users, e.g., user 103, with data-centric networked application development services (or "services") for creating, testing, and updating (hereinafter, collectively referred to as "developing"), for example, data-centric form 105, which may be published (or deployed) to a form server, such as at least one of form servers 203, 205_1 to **205_*n* (hereinafter, collectively referred to as "form servers 205"), 207, and/or 209. As such, form servers 203, 205, 207, and 209 may be maintained and/or operated by one or more providers, such as a provider of the services of system 200, and/or at least one user, such as a user of site 211**.

According to some exemplary embodiments, users 103 may be provided access to the services of system 200 via user equipment 213_1 to **213_*k* (hereinafter, collectively referred to as "user equipment 213"). Access to the components and services of system 200 may be controlled and managed via management server 215 in conjunction with, for instance, profile database 217 and one or more firewalls, such as firewalls 219, 221, 223, and 225. It is noted that at least some of the components and features of management server 215 may be incorporated as part of integration services 113. User equipment 213 may be configured to communicate over at least one network, such as communication network 227 and service provider network 229. For instance, user equipment 213 may be configured to communicate with each other, one or more controllers of platform 201 and management server 215, one or more servers (e.g., form servers 203, 205, 207, and 209), one or more databases (e.g., profile database 217, database 231, and user databases 111_1 to 111_*m*), and/or one or more third-party resources (e.g., applications, databases, services, and/or the like) 233. While specific reference will be made hereto, it is contemplated that system 200** may embody many forms and include multiple and/or alternative components and facilities.

As previously mentioned, form servers 203, 205, 207, and 209, management server 215, platform 201, and user equipment 213 are configured to exchange communications over at least one of communication network 227 and service provider network 229 (hereinafter, collectively referred to as "networks 227 and 229"). As such, platform 201 may be centrally located at a remote station or office. Platform 201 may operate as a server for communications over networks 227 and 229 that are exchanged between at least some of form servers 203, 205, 207, and 209, management server 215, platform 201, and/or user equipment 213. It, however, is contemplated that platform 201 may be configured in one or more distributed environments. In this manner, platform 201 may include a plurality of servers (or processers) arranged in one or more load balanced architectures to, for example, increase the speed and efficiency of system 200. As such, the plurality of servers may communicate via one or more routers (not illustrated) or distributors (not shown) of, for instance, service provider network 229. Although not shown, it is also contemplated that platform 201 may be locally provisioned at a client site, e.g., site 211.

According to various exemplary embodiments, components of system 200 may enable secure, end-to-end communications via networks 227 and 229. Communications may be encrypted utilizing any suitable technique, such as, for example, Advanced Encryption Standard (AES), Blowfish, Rivest-Shamir-Adleman (RSA), Triple Data Encryption Standard (DES), Twofish, etc., algorithms. In some exemplary embodiments, communications may be encrypted via AES128 bit, AES192 bit, AES256, or the like bit techniques and may further utilize session and/or temporary keys to further enhance the security of communications.

Figure 3:
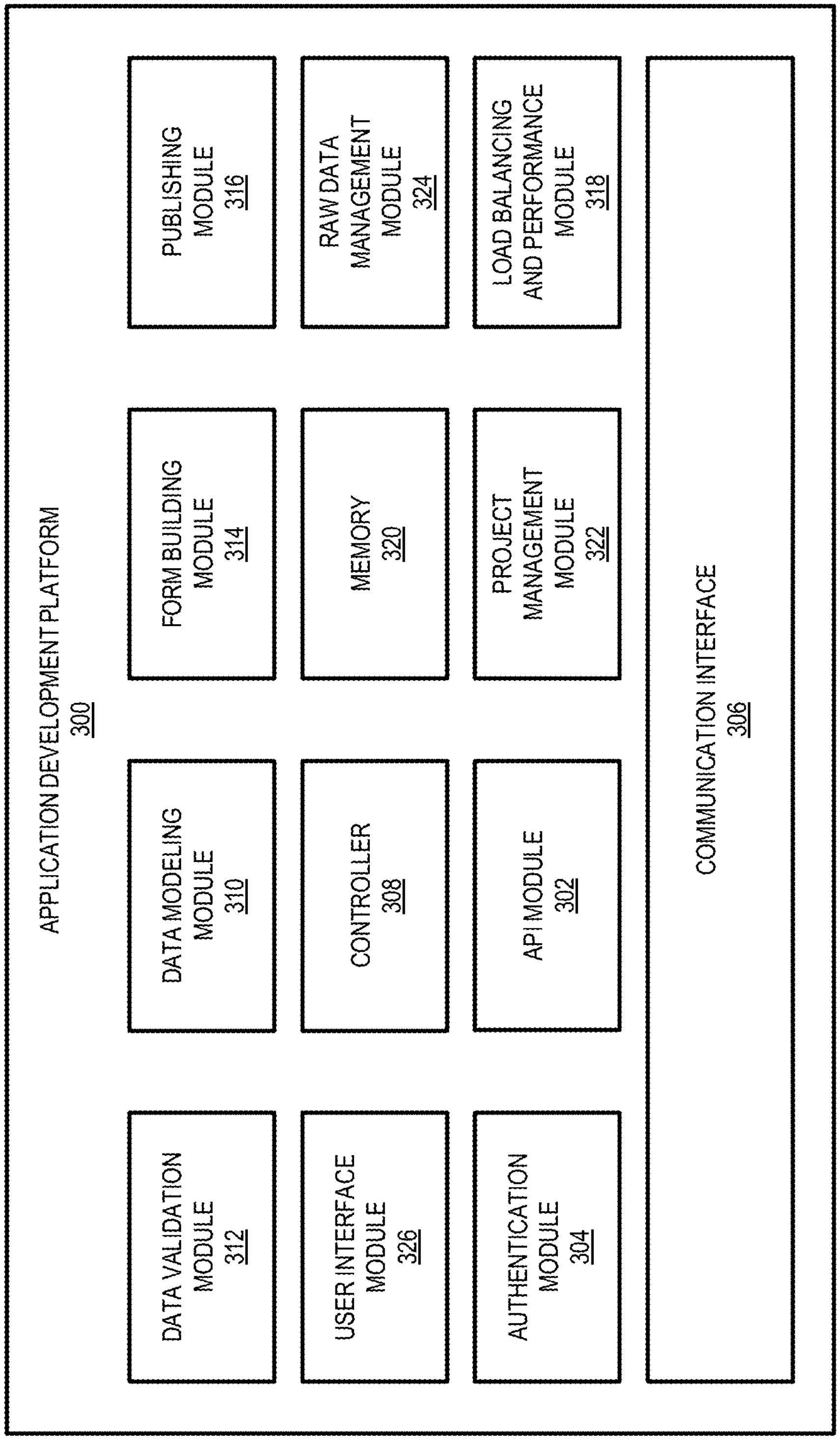
FIG. 3 is a diagram of an application development platform configured to facilitate data-centric networked application development services according to some exemplary embodiments.

Various exemplary embodiments of platform 201 are described in more detail in association with FIG. 3. It is noted, however, that platform 201 may communicate with one or more databases, such as profile database 217, database 231, and user databases 111_1 to **111_*m* (hereinafter, collectively referred to as "user databases 111"). Profile database 217 may store various information (or data) associated with providing the services of system 200, such as access information, addressing information, analysis information, encryption information, historical information, routing information, site information, security information, social information, transactional information, etc. It is also contemplated that profile database 217 may be configured to store information associated with users and/or organizations of the services of system 200. For example, profile database 217** may store information corresponding to subscription information (e.g., account numbers, usernames, passwords, security questions, monikers, uniform resource locators, etc.), subscriber demographic information (e.g., age, gender, ethnicity, location of residence, zip code, school district, community, socioeconomic status, religion, marital status, ownerships, languages, mobility, life cycles, etc.), location information (e.g., spatial positioning, latitude, longitude, elevation, etc.), group/organizational affiliation information (e.g., business, political, social, etc.), membership information, interest information, buddy information, friend information, cohort information, associated user/device information, associated form information, etc., as well as any other suitable organizational and/or personal information.

Database 231 and user databases 111 (hereinafter, collectively referred to as "databases 111 and 231") may be configured to store forms and various information associated with forms, such as workspaces, projects, forms, blocks, binding components, mapping information, data groups, data entities, schemas (e.g., data schema, form schema, project schema, and/or the like), API documentation, etc., of users and organizations subscribed to the services of system 200. It is also contemplated that databases 111 and 231 may store business rules data, user equipment data, machine learning models, user activity data, analytics data, user submission data, and/or the like. It is also contemplated that databases 111 and 231 may further include at least some of the aforementioned information stored to profile database 217.

As used, herein, a "workspace" refers to a storage that contains one or more projects, and a "project" defines a storage that contains one or more forms and/or blocks. A "form" is the shape, visual appearance, and/or configuration of data of an application. In this manner, a form may have a form schema, data schema, and storage. In some exemplary embodiments, a form (such as form 105) serves as a minimum unit capable of being published, such as deployed to at least one form server, e.g., form server 205_1, to collect information, which may also be stored to at least one of databases 111 and 231. A "block" is a part of a form. The data of a block may be included in a form schema, data schema, and/or storage of a form. A block may include one or more form components. A "form component" is any configurable aspect of a form, such as sections, fields, etc., which may be bound, linked, mapped, or otherwise tied to a data entity. A "data entity" refers to the smallest object in a data model, and, thereby, defines a piece of collectable data. From this perspective, a "data group" refers to a group of data entities. A "binding component" or "map" may be utilized to bind one or more data entities to one or more user interface components, e.g., one or more form components. As such, a binding component may not only specify the data itself, but also the look-and-feel of the data vis-à-vis a user interface component.

In some exemplary embodiments, databases 111 and 231, portions of databases 111 and 231, form servers 203, 205, 207, and 209, and/or portions of form servers 203, 205, 207, and 209 may be provisioned and managed according to any suitable datum at any suitable level of granularity, e.g., on a user-by-user basis, a group-by-group basis, an organization-by-organization basis, a form-by-form basis, a project-by-project basis, a workspace-by-workspace basis, etc. Database 231 and form server 209 may be provisioned and maintained by a user (or provider of the services of system 200) at a user location, such as site 211, whereas profile database 217, user databases 111, and form servers 203 and 205 may be provided and maintained by a provider of the services of system 200 at one or more provider locations. Form server 207 and third-party resources 233 may be provided and maintained by a third party, but may be made accessible to users via platform 201 or any other suitable interface. Management server 215 may be configured to facilitate access, provisioning, monitoring, and management of the services of system 200, such as facilitate access, provisioning, monitoring, and management of databases 217, 231, and/or 111, form servers 203, 205, 207, and 209, and third party resources 233. It is also contemplated that management server 215 may be configured to facilitate various other features associated with the services of system 200, such as data and event logging features, system configuration features, application management features, user management features, and/or the like. In this manner, management server 215 may form a portion or component of integration services 113.

According to various exemplary embodiments, any of the described information stored to the various databases, such as databases 111, 217, and 231, may be utilized to extend one or more of the services of system 200 to users, and, as a result, users may be permitted to define permissible boundaries for the use and dissemination of the information stored to their associated database or portion thereof. For instance, users may define permissible boundaries for the use and dissemination of their user profile information, forms, blocks, data groups, data entities, etc., and/or information associated with their use of the services of system 200, whether in connection with the services of system 200 or associated with another purpose.

According to some exemplary embodiments, users may access platform 201 via a portal 235, such as a web portal or a voice portal. In some exemplary embodiments, a networked application (e.g., application 109*a* or 109*b*) for implementing portal 235 may be deployed via platform 201; however, it is contemplated that another facility or component of system 200, such as a frontend, middleware, and/or backend server, may deploy the networked application, and, consequently, interface with platform 201. In this manner, portal 235 may include or provide users with the ability to access, configure, manage, and store user profiles to, for example, profile database 217 or any other suitable storage location or memory of (or accessible to) system 200, as well as develop data-centric applications (e.g., form 105), and publish such applications, such as deploy form 105 to form server 105 for execution and collection of data from targets, such as target 107. In some exemplary embodiments, users and/or user groups may be respectively provided with unique uniform resource locators for uniquely accessing portal 235, and, thereby, accessing the features and services of system 200. As such, portal 235 may enable users to provide corresponding authentication information to platform 201 via user equipment 213, and, subsequently, create, customize, and manage one or more user profiles via one or more user interfaces, e.g., graphical user interfaces (GUI), implemented via portal 235 and/or user equipment 213.

According to various exemplary embodiments, portal 235 may not only enable users to define data models and build forms, but also publish forms in conjunction with platform 201, such as in conjunction with engine 101, which may be made available via platform 201. To this end, portal 235 may operate in conjunction with other components of platform 201, management server 215, and/or third-party resources 233 to provide various features, such as API management features (e.g., query management, database browsing, API documentation, API document viewing, API testing, handshake testing, etc.), system management features (e.g., application management, configuration management, reload configurations, log viewing, log downloading, viewing environment information, etc.), operational management features (e.g., user management, etc.), performance indexing features (e.g., testing and viewing performance of real-time responses, basic services, data services, file services, form services, service provider services, messaging services, web services, etc.), and application access features. Additional features and functions of the services of system 200 will be become more apparent below.

Portal 235 and/or one or more other functions supporting the services of system 200 may be provided by one or more applications, such as applications 109*a* to 109*c*. In this manner, at least one application may be provided over one or more of networks 227 and 229, such as application 109*b* of platform 201 and application 109*a* of portal 235. One or more other applications (e.g., application 109*c*) may be provided at one or more sites of a user. It is noted that form servers 203, 205, 207, and 209 may be maintained and/or operated by one or more service providers, such as a provider of platform 201, a provider of site 211, etc. Further, site 211 may be that of at least one third-party with respect to a user of user equipment 213 and/or a provider of the services of system 200. According to some exemplary embodiments, at least one application may be provided by one or more of user equipment 213, such as application 109*c* of user equipment 213_1. In this manner, one or more services of system 200 may be provided to users of user equipment 213 via applications 109*a* to 109*c*.

According to various exemplary embodiments, service provider network 229 enables user equipment 213 and form servers 203, 205, 207, and 209 to access the features and functionality of platform 201 via one or more networks, such as communication network 227 (also referred to as "network 227"). Network 227 may be any suitable wireline and/or wireless network. For example, network 227 may include a telephony network, such as a circuit-switched network, e.g., the public switched telephone network (PSTN), an integrated services digital network (ISDN), a private branch exchange (PBX), and/or other like network. It is also contemplated that network 227 may employ various technologies including, for example, code division multiple access (CDMA), enhanced data rates for global evolution (EDGE), enhanced mobile broadband (eMBB), general packet radio service (GPRS), global system for mobile communications (GSM), Internet protocol multimedia subsystem (IMS), long term evolution (LTE), LTE advanced, mobile ad hoc network (MANET), mobile broadband wireless access (MBWA), non-orthogonal multiple access (NOMA), orthogonal frequency-division multiple access (ODFMA), ultra wideband (UWB), universal mobile telecommunications system (UMTS), etc., as well as any other suitable wireless medium or passband modulation technique, e.g., microwave access (WiMAX), wireless fidelity (WiFi), wideband code division multiple access (WCDMA), satellite, and/or the like. In some exemplary embodiments, network 227 may be any local area network (LAN), metropolitan area network (MAN), wide area network (WAN), the Internet, or any other suitable packet-switched network, such as a commercially owned, proprietary packet-switched network, e.g., a proprietary cable or fiber-optic network.

Although depicted as distinct entities, networks 227 and 229 may be any number of suitable networks, which may be completely or partially contained in various communication networks, or may embody one or more of the aforementioned infrastructures. For instance, service provider network 229 may embody circuit-switched and/or packet-switched networks that include components and facilities to provide for transport of circuit-switched and/or packet-based communications. It is further contemplated that networks 227 and 229 may include components and facilities to provide for signaling and/or bearer communications between the components and facilities of system 200. In this manner, networks 227 and 229 may embody or include portions of a signaling system 7 (SS7) network, or other suitable infrastructure to support control and signaling functions. Accordingly, the conjunction of networks 227 and 229 may be adapted to provide the services of system 200, as well as enable users to access platform 201.

Firewalls 219, 221, 223, and 225 may provide network security systems to monitor and control incoming and outgoing network traffic based on one or more predetermined rules. One or more of firewalls 219, 221, 223, and 225 may be network firewalls or host-based firewalls to control access to the various services and/or features of system 200. In this manner, firewalls 219, 221, 223, and 225 may be either software appliances running on general-purpose hardware or hardware-based firewall computer appliances. According to some exemplary embodiments, firewalls 219, 221, 223, and 225 may be utilized to control access to different features or services of system 200. For example, firewall 219 may be utilized to control access to form servers 205. In this manner, form servers 205 may be provisioned and/or managed at any suitable level of granularity, e.g., on a user-by-user, group-by-group, organization-by-organization, etc., basis. In various exemplary embodiments, firewall 221 may control access to the features and functions of platform 201, firewall 223 may control access to user databases 111, and firewall 225 may control access to management server 215. Again, access may be provisioned and managed at any suitable level of granularity.

User equipment 213 may be any type of mobile terminal or fixed terminal, such as, for example, a mobile handset, station, unit, device, multimedia tablet, network node, desktop computer, communicator, laptop computer, personal digital assistant, pocket personal computer, smart watch, customized hardware, or any combination thereof. It is also contemplated that user equipment 213 may support any type of interface to a user, such as "wearable" circuitry, touch screens, keyboards, buttons, pointers, etc. Although a limited number of user equipment 213 is illustrated, it is contemplated that system 200 can support a plurality of user equipment 213.

By way of example, user equipment 213 and platform 201 may communicate with each other and other components of system 200 using well known, new, and/or still developing protocols. In this context, a protocol includes a set of rules defining how nodes in, for instance, networks 227 and 229 interact with each other based on information sent over communication links of networks 227 and 229. The protocols are effective at different layers of operation in the nodes, from generating and receiving physical signals of various types, to selecting a link for transferring those signals, to the format of information indicated by those signals, to identifying which application executing on a computer system sends and/or receives the information. The various layers of protocols for exchanging information over networks 227 and 229 are described in the Open Systems Interconnection (OSI) Reference Model.

Generally, communications between components of system 200 are effected by exchanging packets of data. To this end, data transport may be effectuated using, for instance, at least one of eXtensible Markup Language (XML), Comma- Separated Values (CSV), REST, SOAP, JavaScript Object Notation (JSON), and Structured Query Language (SQL) over HyperText Transfer Protocol (HTTP)/HyperText Transfer Protocol Secure (HTTPS). It is also contemplated that data may be transmitted in a binary format to render it more-or-less unreadable and with its underlying information being encrypted. As such, the services of system 200 may be provided with end-to-end security.

FIG. 3 is a diagram of an application development platform configured to facilitate data-centric networked application development services according to some exemplary embodiments. Application development platform (or platform) 300 may include computing hardware (such as described with respect to FIG. 70), as well as include one or more components configured to execute the processes described herein to facilitate the services of system 200. For descriptive purposes, platform 300 is described as corresponding to platform 201; however, it is contemplated that platform 300 may relate to and/or include portions of at least one of form servers 203, 205, 207, and 209, management server 215, and integration services 113.

According to one embodiment, platform 300 includes application programing interface (API) module 302, authentication module 304, communication interface 306, controller 308, data modeling module 310, data validation module 312, form building module 314, publishing module 316, load balancing and performance module 318, memory 320, project management module 322, raw data management module 324, and user interface module 326. It is noted that data modeling module 310, form building module 314, and publishing module 316 may respectively correspond to data modeling component 101*a*, form building component 101*b*, and publishing component 101*c* of engine 101. In addition, platform 300 may communicate with one or more databases, such as profile database 217, database 231, user databases 111, a rules database (not shown), one or more third-party resources 233, and/or one or more servers, such as management server 215, form servers 203, 205, 207, and 209, etc. Users may access platform 300 via user equipment 213. It is also contemplated that platform 300 may embody many forms and include multiple and/or alternative components. For example, the components of platform 300 may be combined, located in separate structures, and/or separate locations. As such, a specific topology is not critical to embodiments of platform 300 or system 200 for that matter.

According to one or more exemplary embodiments, platform 300 embodies one or more application servers accessible to user equipment 213 over one or more of networks 227 and 229 so that users (also referred to as subscribers, clients, or tenants) may access platform 300 to register to and receive authentication information for the services of system 200, as well as to create, customize, and manage user profile(s). Users may be given controlled access to, for instance, data modeling, form building, data entity and form publishing, and managing services that enable data-centric applications, such as form 105, to be developed, deployed, managed, and monitored. An exemplary process for registering users to the services of system 200 via platform 300 will be described in more detail in association with FIG. 4. An exemplary process for developing and publishing a data-centric form will be described in more detail in association with FIG. 5.

In some exemplary embodiments, platform 300 provides a user interface, e.g., a web portal or an otherwise networked application, to permit users to access the features and functionalities of platform 300 via, for instance, portal 235 and user equipment 213. User interface module 326 may be configured for exchanging information between user equipment 113 and a web browser or other networked-based application or system. According to one embodiment, user interface module 326 executes one or more graphical user interface (GUI) applications configured to provide users with one or more options for creating, customizing, and managing user profiles, defining data entities and groups of data entities, binding data entities to form components, defining relationships between data entities, defining validation rules for data entities, defining global options for data entities, registering and managing external APIs, registering and managing lookup data, uploading and managing files for a project, downloading files, managing multilingual labels and messages, developing and updating data-centric forms, viewing and editing structures (e.g., projects, forms, es, project schema, form schema, data schema, form components, etc.), viewing and editing parameters (e.g., look-and-feel parameters, data definition parameters, etc.), publishing data entities, publishing forms, managing workspaces and projects, monitoring performance, etc. In some embodiments, user interface module 326 enables users to access, modify, browse, query, etc., profile database 217, their associated databases (such as database 231 or user database 111_1), third-party resources 233, etc., as defined by (or in) one or more user profile parameters and/or policies. In this manner, user interface module 326 may also interface with integration services 113 to realize at least some of the aforementioned features and functions.

According to some exemplary embodiments, user interface module 326 is configured to provide one or more interactive design surfaces (e.g., interactive canvas) to users via, for example, user equipment 213. An interactive design surface may be a GUI displaying a networked application development environment. For instance, an interactive design surface may be realized in a frame, panel, pane, window, etc., portion of a GUI configured to receive and react to user input. In some embodiments, user interface module 326 may operate in association with project management module 322 to provide an interface enabling users to develop, manage, monitor, import, export, etc., workspaces and projects. In various exemplary embodiments, an interactive design surface may be (or include) a WYSIWYG editor configured to enable users to generate and modify aspects of a data-centric application (e.g., form 105) in a manner that resembles the appearance of the aspect/application when presented or otherwise executed as part of a finished product, such as part of a web page configured to gather information via a form.

In some exemplary embodiments, the user interface module 326 may enable users to build and manipulate a form through basic user inputs, e.g., gesture-based inputs (e.g., drag-and-drop inputs, selection inputs, etc.) and parameter inputs (e.g., text inputs defining names, descriptions, look-and-feel parameters, etc.) to affect what data a form gathers and how the form presents itself to gather the data. Accordingly, user interface module 326 may operate in combination with various other modules of platform 300, such as at least one of data modeling module 310, form building module 314, publishing module 316, controller 308, memory 320, etc., to automatically generate and dynamically modify (hereinafter, collectively referred to as "generate") computer code underlying a project as an application is being developed using, for instance, the WYSIWYG editor. The underlying code may be automatically generated to enable a deployed application to operate in association with (and toggle between) different operational environments and behaviors, such as different operating systems, screen configurations (e.g., sizes, orientations, etc.), platforms, form styles (e.g., all-in-one, accordion, card-style, grid-style, tabbed, windowed, etc.), application architectures (e.g., local, client-server, cloud, hybrid, etc.), and/or the like. In association therewith, user interface module 326 may be further configured to provide an interactive design surface capable of simulating execution of a deployed application in a particular environment, e.g., simulate execution of an application in a browser of an accessing device, such as a desktop computer, mobile handset, tablet, etc. In some exemplary embodiments, selectable GUI components may be provided via user interface module 326 to enable users to quickly select, view, and simulate form operation according to at least some of the different environments and behaviors. As such, users of platform 300 may not only optimize the operational efficiency of an application in different deployment scenarios, but also the look-and-feel of an application according to different use environments and constraints.

The interactive design surface (e.g., the WYSIWYG editor, other component of user interface module 326, and/or other component of platform 300) may be configured to reference and utilize one or more rules, policies, data (e.g., profile data, business data, historical data, inferred data, etc.), and/or machine learning models to automatically generate and optimize computer code in response to interaction with the interactive design surface. The rules, policies, data, and/or machine learning models may be stored to, for instance, at least one of the rules database and user database (e.g., user database 111_1), or any other suitable storage location of (or accessible to) platform 300, such as profile database 217, database 231, third-party resources 233, etc. As such, users may easily develop and maintain processes of an organization at an application level without extensive knowledge of the underlying computer code. It is contemplated, however, that user interface module 326 may also include at least one script editor enabling users to write, view, and edit computer code underlying an application or an aspect associated therewith. For instance, the script editor may enable users to manually write, view, and edit APIs, database queries, form schema, data schema, project schema, etc.

In some exemplary embodiments, user databases, such as user database 111_1, may include an archive database and a running database. The archive database and the running database may be logical divisions of a user database, e.g., user database 111_1, or physically different databases that together form at least a portion of a user database, such as user database 111_1. The archive database may provide libraries of previously generated (and, thereby, reusable) data entities, groups of data entities, form components, blocks, block groups, forms, etc., that may be utilized to develop or update a current project. The running database may include data associated with current projects being developed, modified, and/or published. In this manner, various aspects of a form may transition between the archive database and the running database as a project is being developed and/or executed. For instance, a user may "check-out" a project to implement changes within their control, and, as such, aspects of the project may transition from archive database to running database, or vice versa. As another example, a user may "check in" (or "release") a project from their control, and, in this manner, aspects of the project may transition from running database to archive database, or vice versa. Accordingly, one or more structures of databases 111 and 231 may be utilized to control access and editing of a project.

According to various exemplary embodiments, data modeling module 310 may operate in conjunction with user interface module 326 to enable users to define and organize data for a project. For instance, data modeling module 310 enables data entities to be defined (e.g., user-defined) through one or more input parameters, such as name, description, label, read-type, data type, transient nature, dependency, lookup type, etc. Some of these input parameters may be text-based and/or selection-based inputs. Data types (whether primitive or non-primitive) may include, but are not limited to, Booleans, characters, bytes, shorts, images, integers, longs, floats, doubles, strings, arrays, classes, interfaces, etc. Data modeling module 310 may utilize the input parameters to generate a data model, e.g., data schema, defining the data entities. In some exemplary embodiments, the data schema may include the input parameters stored as nested objects in a structure of the data model, such as a JSON document tree, an XML, element tree, etc. To this end, the data schema may be utilized by user interface module 326 to generate selectable components for a GUI that enables users to add a data entity to a project as will become more apparent below.

To this end, data modeling module 310 may cause, at least in part, underlying computer code to be generated or used to support form 105 such that instances of data collected from targets 107 via form 105 may be stored as nested values in a storage structure according to a structure of the data model, e.g., according to the structure of a data schema generated in association with data modeling module 310 based on the formation/specification of the data model by a user. Such data storage may be referred to as "abstract data" storage. In some embodiments, the "abstract data" may be stored according to the data model/data schema in, for instance, at least one of a JSON document tree, an XML, element tree, and the like. The storage of the data model and instances of collected data to a corresponding database, e.g., user database 111_1, may be effectuated via one or more predefined, automatically-implemented APIs of platform 300. Additionally, data modeling module 310 may cause, at least in part, underlying computer code to be generated or used to support form 105 such that instances of data collected from targets 107 via form 105 are stored to corresponding locations of a structured database, such as corresponding rows in an SQL database table. Such data storage may be referred to as "concrete data" storage. The storage of the concrete data to a corresponding database, e.g., user database 111_1, may be effectuated via one or more additional predefined, automatically-implemented APIs of platform 300. These additional APIs may map at least one of the nested objects of the data model, and, thereby, instances of the "abstract data," to corresponding locations in the structured database. Further, these APIs may be backend database agnostic.

According to various embodiments, the aforementioned APIs may be customer-defined and registered to (and, thereby, learned by) application development platform 300 as will become more apparent below. In some exemplary embodiments, these APIs may be generated based on one or more user specifications of "abstract data" variables to associate or map to "concrete data" variables. User interface module 326 may operate in association with one or more other components of platform 300 to present the associations to a user for editing via an interactive design surface of a GUI. For instance, a GUI may provide a first list of "abstract data" variables in a first pane and a second list of "concrete data" variables in a second pane. In this manner, users may make selections in the first and second lists of variables to create associations/mappings between the first and second lists of variables. Based on the selected associations, API module 302 and raw data management module 324 may operate in association with one or more other components of platform 300 to generate underlying code to effectuate storage of collected data instances in not only an "abstract data" storage, but also a "concrete data" storage.

As an example of a data type definition, a user may define first, middle, and last name processing variables as separate data entities. In this manner, data modeling module 310 may be accessed to group a plurality of data entities into at least one data group. For instance, a user may group the separate first, middle, and last name data entities into a name group. As will become more apparent below, the grouping of individual data entities may be performed via one or more drag-and-drop commands. To this end, some drag-and-drop commands may facilitate data entity copying, movement, and binding, as will become more apparent below.

Data modeling module 310 may operate in concert with form building module 314 to bind, for instance, form components in association with a data entity or group of data entities. For instance, users may specify a form component to gather information (e.g., one or more pieces of collectable data) associated with a data entity via form 105. Form components may include one or more static and/or dynamic field objects, such as, but not limited to, barcodes, buttons, cards, checkboxes, circles, content areas, date/time fields, decimal fields, signature fields, dropdown lists, email submit buttons, flash fields, grids, HTTP submit buttons, images, image fields, lines, list boxes, numeric fields, paper forms barcodes, password fields, print buttons, radio buttons, rectangles, reset buttons, sub-forms, tables, text, text fields, etc. Various attributes (or parameters) of the form components may be specified and linked to the data entities, such as constraints, colors, layouts, sizes, shapes, tooltips, etc. As such, data modeling module 310 and form building module 314 may operate to allow users to specify not only what data is to be collected, but also how the data is to be collected and the visual appearance of the manner in which the data is to be collected. To this end, form schema may be automatically generated and mapped to (or include) the data schema of an associated data entity once linked. As such, when a data entity or group of data entities is added to a project, not only the data schema, but also the form schema may added to the project, e.g., project schema.

According to some exemplary embodiments, data modeling module 310 in association with user interface module 326 may enable users to define relationships between data entities and groups of data entities (also referred to as "data groups"). For instance, users may specify how one or more data entities update one or more other data entities. In some embodiments, calculations may be created, modified, and/or selected to build relationships between data entities and data groups. Also, data modeling module 310 and user interface module 326 may operate in concert with data validation module 312 to specify and/or utilize validation rules for a data entity, such as whether or not a data entity is a required variable, a minimum length for data entry, a maximum length for data entry, a pattern for data entry, etc. To this end, data validation module 312 may operate in association with raw data management module 324 to enable third-party APIs to validate input data to form 105. For instance, a user may register an address verification API of a third-party, e.g., the United States Postal Service, via user interface module 326. In this manner, platform 300 may operate in association with integration services 113 to learn the API such that, in the aforementioned example, form 105 may enable verification of input addresses, enable automatic population of zip codes based on at least some input address information, and allow for standardized address representation, and the like. Data modeling module 310 and form building model 314 may also operate individually or collectively to enable users to specify one or more global options for data entities, data groups, and form components bound to the data entities or data groups, such as read only parameters, printable states, default component layout parameters (e.g., variables affecting margins, padding, etc.), etc.

In some exemplary embodiments, data modeling module 310 may operate in association with user interface module 326 to enable users to manage multilingual labels and messages associated with data entities. In this manner, users may be afforded any suitable 118N option, property, and/or control plugin. For instance, users may define language specific settings and formats governing how data is represented by and/or entered into a form. In addition, data modeling module 310 may operate in association with user interface module 326 to enable users to register and manage lookup data associated with a data entity. For instance, a data entity for gathering state information may be linked to a dropdown form field with one or more selectable options for entering the state information. The selectable options may be managed via a lookup manager of data modeling module 310. In some instances, the selectable options may be populated via a registered API. Further, data modeling module 310 may operate in association with data validation module 312 to ensure adherence with rules and policies established in association with managing lookup data and multilingual labels and messages. As such, data entities (and, thereby, forms including data entities) may be created, customized, and localized for one or more languages, cultures, and permissible entries. To this end, logic may be added to one or more data entities such that different rules and policies are dynamically applied based on information received as part of gathering information via a form.

Once a user is finished creating data entities and data groups, data modeling module 310 may be configured to publish or otherwise make the data entities and data groups available for use in developing an application, such as form 105. The publication of the data entities and data groups may be controlled based on a selection made in a GUI and/or based on information stored to, for instance, profile database 217 or any other suitable storage location or memory of (or accessible to) platform 300. In this manner, the data entities and data groups may be made available to certain workspaces, projects, and/or users associated with a particular account or organization, or may be shared with other users and organizations of the services of system 200 such that the creation and dissemination of data entities and data groups may be crowd-sourced. In this manner, larger sized libraries of data entities and data groups may be made available to users of the services of system 200. Further, the publication of the data entities and data groups may cause user interface module 326 to provide users with one or more interactive GUI objects that may be selected (e.g., dragged-and-dropped on an interactive design surface) during a form or block building process. For example, interactive GUI objects corresponding to published data entities, data groups, and previously configured blocks of forms may be provided as part of a visual representation of a project schema.

Accordingly to various exemplary embodiments, selection of an interactive GUI object corresponding to a published data entity, data group, or block may cause form building module 314 to configure an application, e.g., form 105, with one or more form components bound to the associated data entity, data group, or data entities/data groups of a block. As part of configuring the application with those form components bound to the selected GUI object, form building module 314 may not only reference and incorporate at least some data schema associated with the selected GUI object into a project (e.g., project schema), but may also reference and incorporate at least some form schema bound (e.g., mapped) to the data schema to control the visual representation of the form components via an interactive design surface and generation of computer code underlying the application. Accordingly, dissimilar to conventional processes in which a user interface of an application is manually scripted and data is then linked to the user interface via additional manual scripting, at least some exemplary embodiments enable users to simply select what data needs to be gathered by an application and be seamlessly presented with a user interface to accomplish the task with underlying computer code being automatically generated by platform 300.

Form building module 314 may also operate in conjunction with user interface module 326 to enable users to customize form, block, and/or form component features (e.g., content, layout, attributes, styles, positions, conditions, event handlers, validations, relationships, etc.) once an interactive design surface is configured with those form components bound to the data entities, data groups, blocks, forms, etc., selected for incorporation in an application being developed. Based on one or more rules, policies, data entity parameters, user profiles, etc., customization may override default configurations only in that particular project or may be allowed to affect the default configurations themselves. Form building module 314 may also operate in association with user interface module 326 and data modeling module 310 to enable users to modify, and, thereby, customize aspects of a data entity or data group bound to at least one form component already incorporated in a project. As before, based on one or more rules, policies, data entity parameters, user profiles, etc., modifications to a data entity or data group after incorporation in a project may be limited to the particular project or may affect the default configuration of the data entity or data group itself.

Figure 39A:
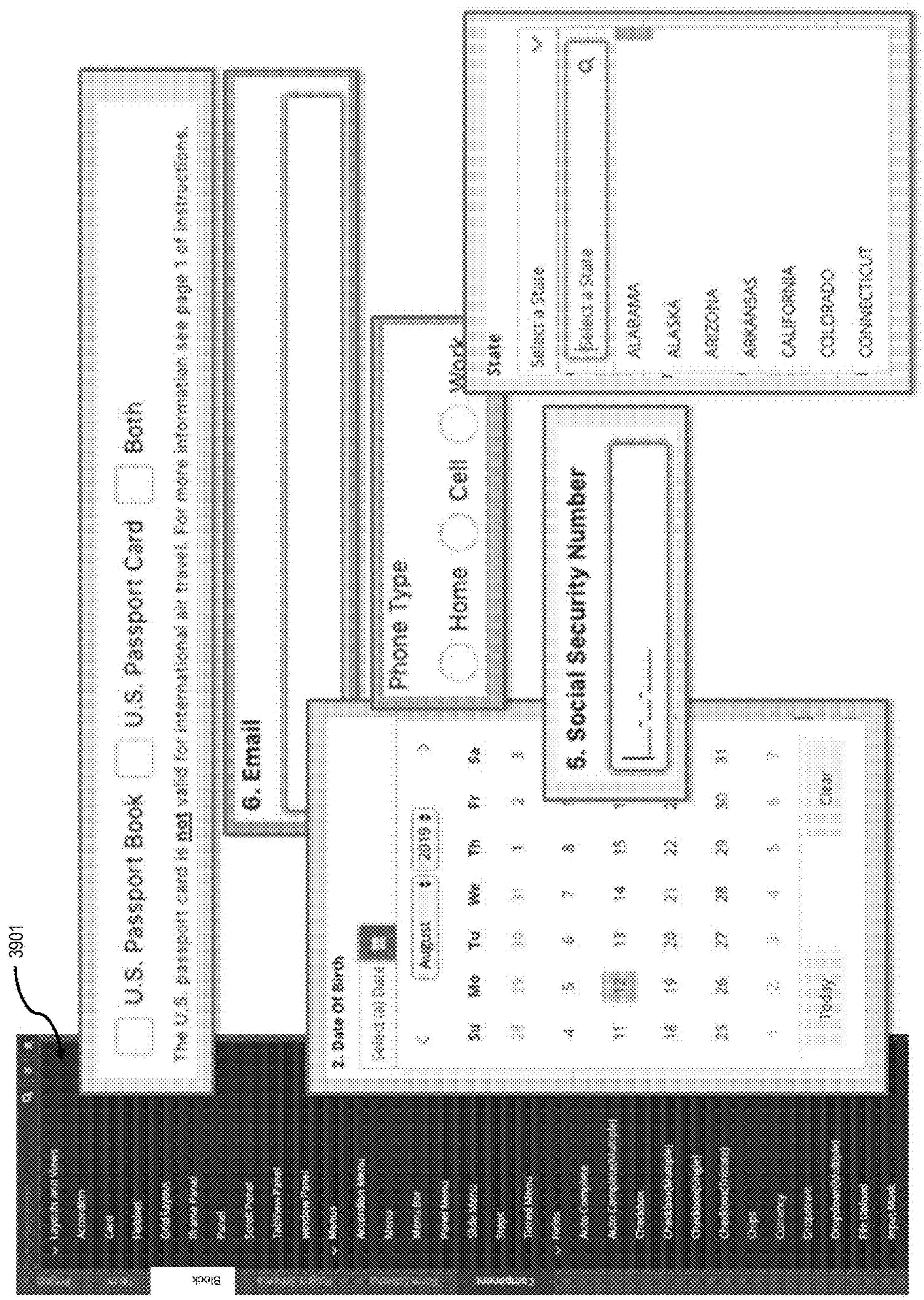
Figure 39B:
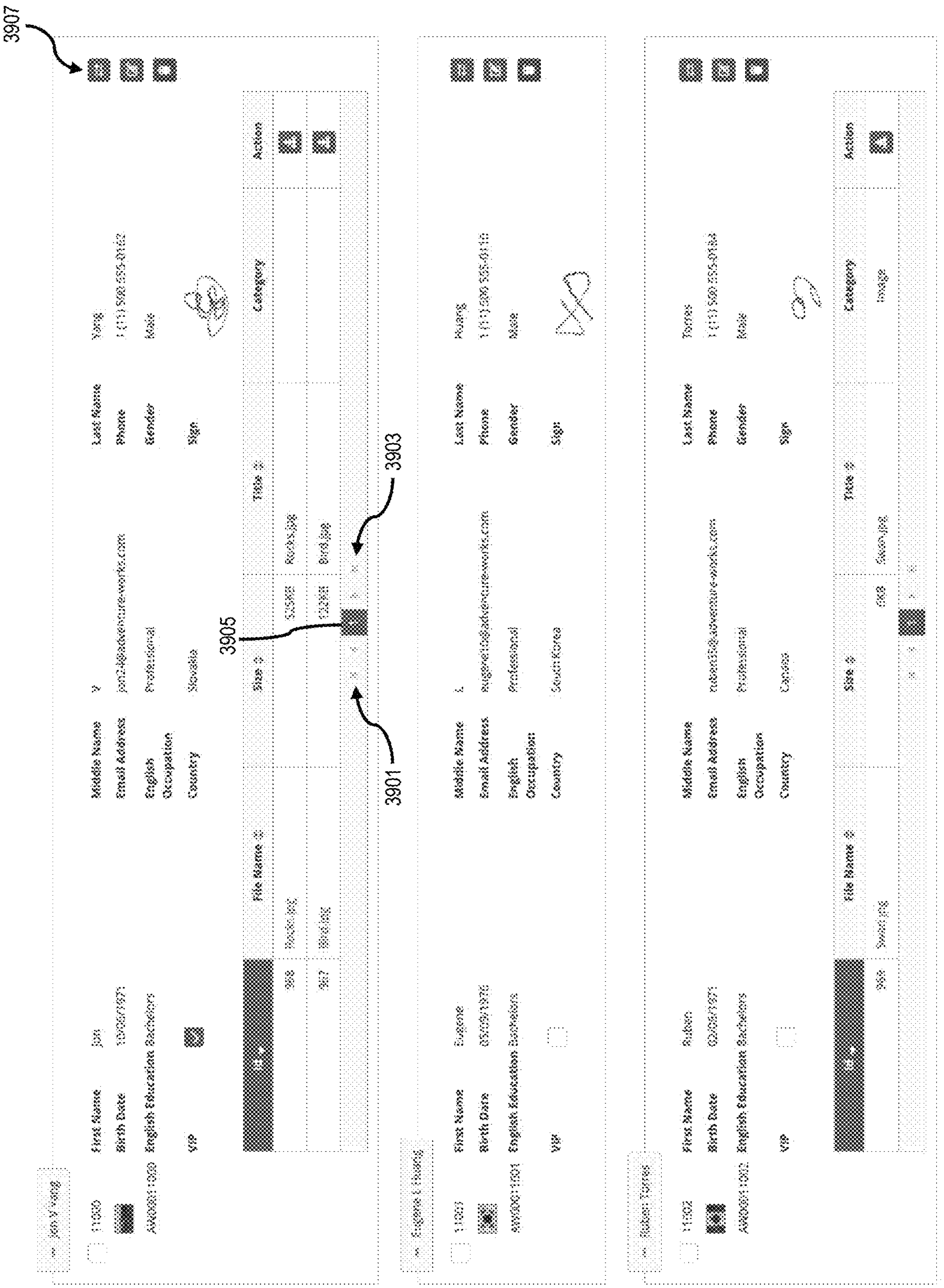
Figure 39C:
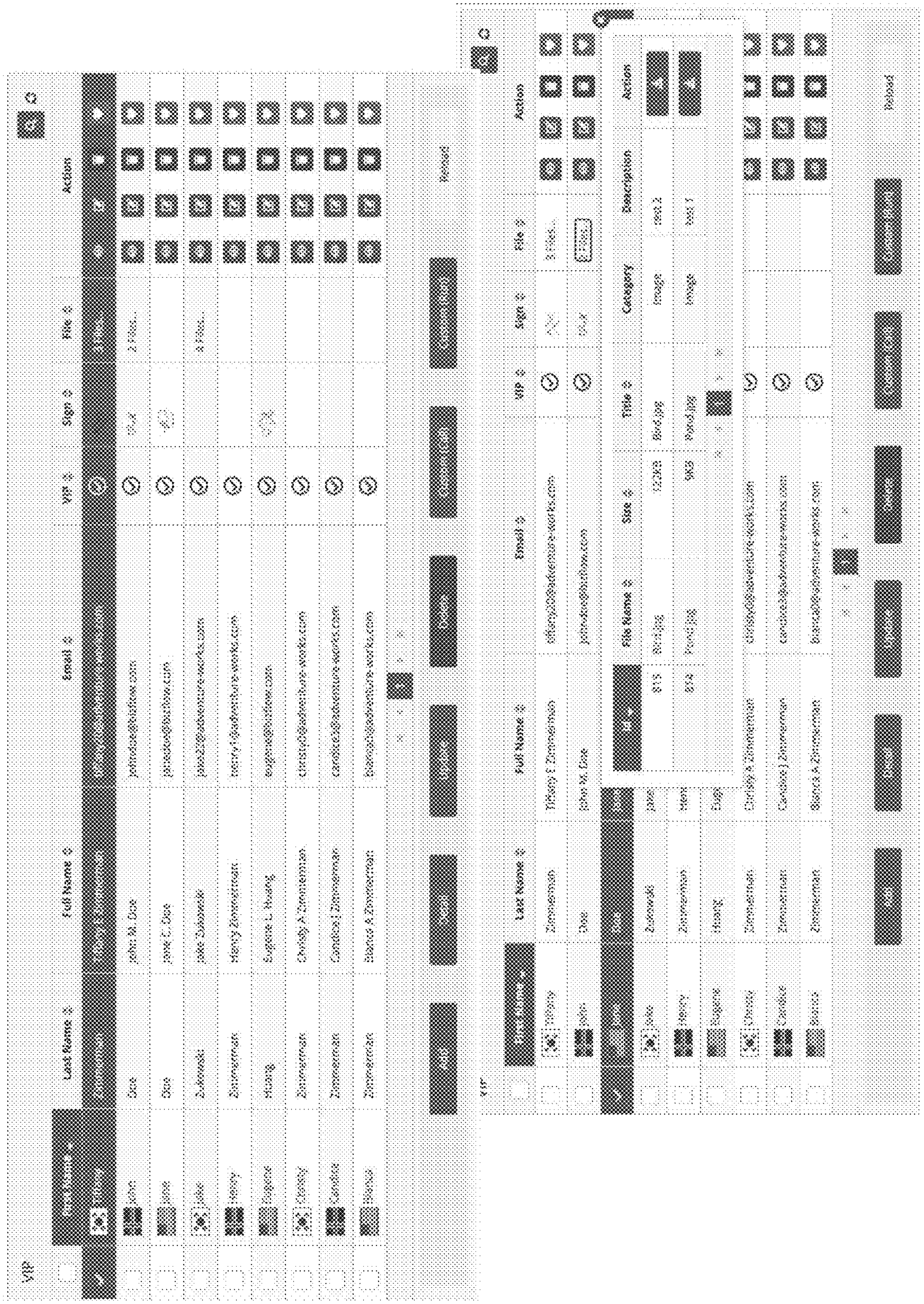

In some exemplary embodiments, form building module 314 may operate in conjunction with user interface module 326 to enable users to generate dynamic forms, blocks, and/or form components that allow multiple instances of similar data entities and/or data groups to be retrieved from a storage location (e.g., user database 111_1) and presented to users or targets via a form, such as form 105. It is also contemplated that modifications made to the instance presentation may be utilized to update the instances of the data entities and/or data groups stored to the storage location. Instance presentation may be effectuated in any suitable manner, such as in at least one of a card-style layout, grid-style layout, and the like. Exemplary card-style layouts are shown in FIG. 39B. Exemplary grid-style layouts are depicted in FIG. 39C. To this end, the instance presentation may be presented as a complete listing (or presentation) or may be made navigable, e.g., scrolled, toggled, paginated, and/or the like, via any suitable navigational control, such as arrow buttons, page buttons, scroll bars, etc. For instance, FIG. 39B illustrates exemplary left and right arrow buttons 3901 and 3903 enabling users to navigate left and right through multiple instance presentation of data groups, as well as depicts exemplary paginated presentation of multiple instance presentation of data groups that may be navigated through via selection of a corresponding page button 3905 of the presentation. In some embodiments, form building module 314 may allow multiple instance presentations to be toggled between different layouts, such as between card-style layouts and grid-style layouts, via toggle buttons 3907.

According to various exemplary embodiments, form building module 314 may be configured to generate and dynamically update project schema, form schema, and/or data schema for an application as it is being developed based on user selections and modifications of one or more data entities, data groups, blocks, forms, etc., incorporated, removed, or modified in a project. Moreover, form building module 314 may enable dynamic grid layout development so that an application may dynamically adapt to user behavior and/or operating environment conditions. As such, form building module 314 and user interface module 326 may enable users to develop dynamic, data-centric forms, such as form 105, including at least one block having at least one form component bound to at least one data entity.

According to some exemplary embodiments, API module 302 and raw data management module 324 may operate in conjunction with user interface module 326 to enable users to register, manage, and test external APIs, such as APIs made available via third-party resources 233. Further, as previously described, API module 302 may utilize one or more techniques (e.g., pre-established APIs, user-selections, etc.) to establish connections between "abstract data" instances collected (or to be collected) via a data-centric networked application (e.g., form 105) and "concrete data" storage locations in, for instance, user database 111_1 or any other suitable storage location. To this end, API module 302 and raw data management module 324 may operate in association with data modeling module 310, data validation module 312, form building module 314, publishing module 316, project management module 222, user interface module 326, and integration services 113 to enable external APIs (whether first-party APIs or third-party APIs) to be defined in association with data entities and/or blocks of a form. Further, project management module 322 may operate in association with user interface module 326 and integration services 113 to enable users to upload, download, and manage files associated with a workspace, project, and/or form. For instance, users may be enabled to upload and download abstract and/or concrete data in one or more file formats, e.g., CSV, JSON, XML, spreadsheet table (e.g., Microsoft Excel table), etc.

User interface module 326 may operate in conjunction with publishing module 316 to publish (or otherwise deploy) an application, such as form 105. Upon publication in response to user selection to create a form, an executable application and files associated therewith may be automatically generated and stored to, for example, a user database (e.g., user database 111_1), form server (e.g., form server 205_1), and/or any other suitable storage location or memory of or accessible to platform 300. The application and files via, for instance, a form server (e.g., form server 205_1) and a firewall (e.g., firewall 219) may be accessible to anyone with shared access to the application, such as users specified in information stored to a user profile of profile database 217, or may be published for general public access via, for instance, a form server (e.g., form server 203 or 207) or third-party resource 233. In some exemplary embodiments, user interface module 326 may operate in conjunction with publishing module 316 to publish a data model to a project to make a data entity bound to a corresponding form component available for incorporation into the project. In this manner, publication of the data model to a project may cause, at least in part, a GUI to be modified (e.g., augmented) with one or more selectable components corresponding to those data entities and data groups of the data model that are bound to corresponding form components. The selectable components of the GUI may be provided as part of a representation of the data model via the GUI, such as part of a tree representing project schema, form schema, and/or data schema of a project.

Load balancing and performance module 318 may operate in association with user interface module 326, management server 215, and/or integration services 113 to enable users to monitor real-time performance of APIs, published forms, data services of databases, third-party services of third-party resources 233, basic services (e.g., login/logout services), and/or the like. To this end, load balancing and performance module 318 may be configured to generate reports, e.g., real-time logs, historical logs, etc., which may be viewed via user interface module 326 and/or transmitted to user equipment 213, stored in a database, or otherwise made available to users, e.g., messaged to a user via electronic mail, communicated via a third-party resource 233, etc. The reports may be provided to users in pushed and/or pulled fashions. For example, reports may be generated and pushed to users according to an established schedule, occurrence of a specified event, etc. As another example, user interface module 326 may be configured to provide a GUI for requesting generation of a report in an on-demand fashion and downloaded to a specified location. In some instances, load balancing and performance module 318 may operate in association with at least one of user interface module 326, management server 215, and integration services 113 to enable users and/or a provider of the services of system 200 to specify rules and polices for managing loads (e.g., processes, network traffic, etc.) delegated to one or more components of platform 300.

In order to provide selective access to the features and functionality of platform 300, platform 300 may also include authentication module 304 for authenticating (or otherwise authorizing) users to platform 300. It is contemplated that authentication module 304 may operate in concert with communication interface 306 and/or user interface module 326. That is, authentication module 304 may verify user provided credential information acquired via communication interface 306 and/or user interface module 326 against corresponding credential information stored in a user profile of, for instance, profile database 217. By way of example, the credential information may include "log on" information corresponding to a username, password, coded key, and/or other unique identification parameter, such a personal identification number (PIN). In some exemplary embodiments, the credential information may include any one, or combination of, a birth date, an account number (e.g., bank, credit card, billing code, etc.), a social security number (SSN), an address (e.g., work, home, internet protocol (IP), media access control (MAC), port, etc.), or telephone listing (e.g., work, home, cellular, etc.), as well as any other form of uniquely identifiable datum, e.g., biometric code, voice print, etc. Users may provide this information via user equipment 213, such as by spoken utterances, dual-tone multi-frequency signals (DTMF), packetized transmission, etc. In some exemplary embodiments, unobtrusive security may be provided by positively identifying and screening users based on one or more of the aforementioned credentials, which may be seamlessly provided as part of user equipment 213 communicating with platform 300, such as a unique IP or MAC address. Other unobtrusive measures can be made available via specific voice prints, biometrics, etc.

Additionally, platform 300 may include one or more controllers (or processors) 308 for effectuating the aforementioned features and functionality, as well as one or more memories 320 for permanent and/or temporary storage of one or more of the aforementioned data, forms, blocks, form components, criteria, information, metrics, attributes, parameters, policies, reports, variables, etc. Communication interface 306 provides for communication between platform 300 and various components of system 200 via, for instance, at least one of networks 227 and 229, such as between platform 300 and at least one of user equipment 213, portal 235, firewalls 219, 221, 223, and 225, form servers 203, 205, 207, and 209, databases 111, 217, and 231, a rules database, management server 215, and third-party resources 233. As such, communication interface 306 has knowledge of the protocols and other information to enable platform 300 to communicate with the various other components of system 200.

Figure 4:
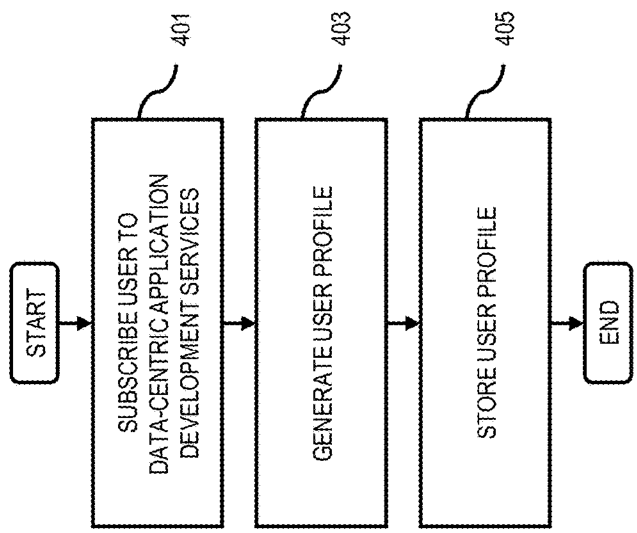
FIG. 4 is a flowchart of a process for registering users to data-centric networked application development services according to one or more exemplary embodiments.
Figure 6:
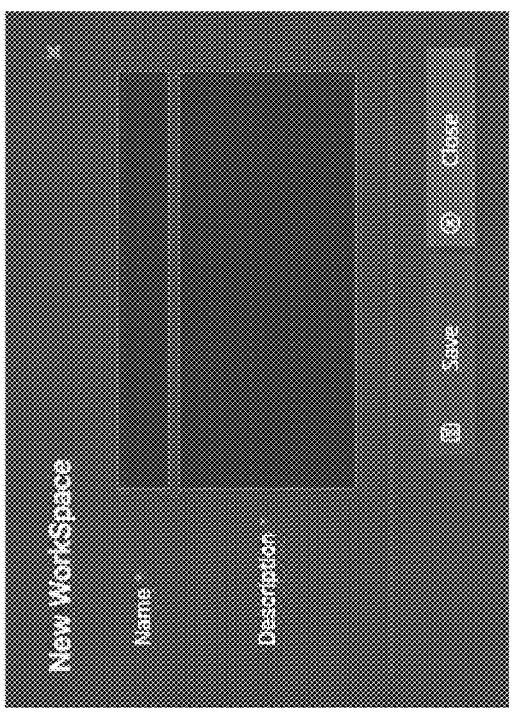
FIGS. 6, 7, 8, 9, 10, 11, 12, 13, and 14 are diagrams of some user interfaces to create and manage workspaces, projects, forms, and blocks according to various exemplary embodiments.
Figure 7:
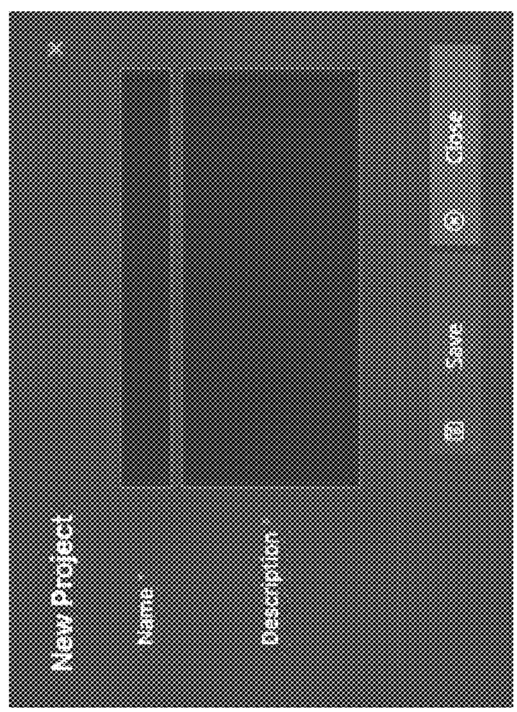
Figure 8:
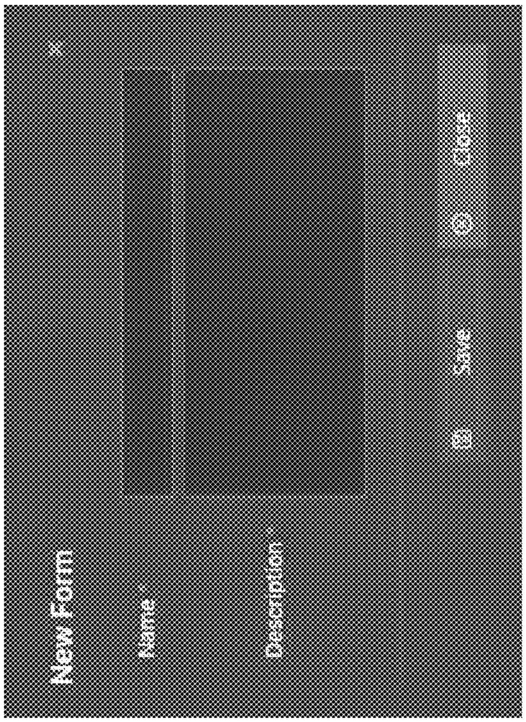
Figure 9:
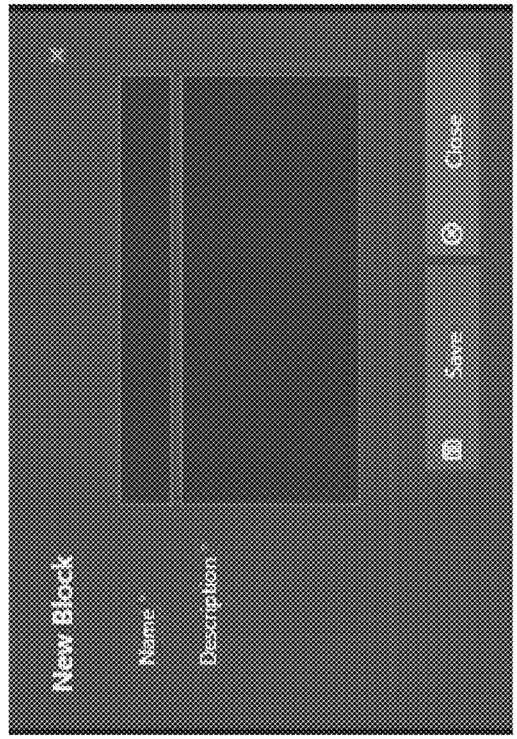

FIG. 4 is a flowchart of a process for registering users to data-centric networked application development services according to one or more exemplary embodiments. For illustrative purposes, the process is described with reference to FIGS. 1-3. It is noted that the steps of the process may be performed in any suitable order, as well as combined or separated in any suitable manner.

At step 401, platform 201 subscribes a user (or organization) to the services of system 200. For descriptive and illustrative convenience, it will be assumed that platform 201 subscribes user 103 to the services of system 200. That being said, user 103 may represent an organization, and, thereby, may be responsible for subscribing the organization and associated individuals of the organization to the services of system 200. In an embodiment, user 103 may subscribe utilizing any suitable user equipment 213 capable of processing and transmitting information over one or more of networks 227 and 229. For example, user 103 may interact with one or more input interfaces (e.g., a keyboard, pointing device, interactive voice response (IVR) interface, touch panel, etc.) of, for example, one or more of user equipment 213 to activate software resident on (or accessible to) the device, such as a GUI and/or networked application that interfaces with (or is implemented by) platform 201 and/or portal 235, such as at least one of applications 109*a* to 109*c*. As another example, user 103 may interact with a voice portal (not shown) interfacing with (or implemented by) platform 201 and/or portal 235, wherein speech synthesis and voice recognition techniques may be utilized to prompt the user for various information and to reduce spoken utterances of the user and/or other signals (e.g., dual tone multi-frequency signals) associated with the user to one or more corresponding inputs. As such, user 103 may register as a new subscriber to the services of system 200 and may obtain sufficient authentication information for establishing future sessions with platform 201 and/or portal 235. For instance, user 103 may be provided with one or more unique uniform resource locators for accessing portal 235, and, thereby, accessing the features and services of system 200. In some exemplary embodiments, registration procedures may prompt the user to identify all associated devices (e.g., user equipment 213) that the user may employ to interact with system 200. It is also contemplated that associated devices may be learned by platform 201 as such devices successfully authenticate with platform 201. In this manner, registered devices may be logically associated with user 103 and their corresponding profile information.

Once registered (or as part of the registration process), platform 201 enables user 103, per step 403, to generate a user profile including, for example, one or more of the above-noted forms of information stored to profile database 217. In certain embodiments, user 103 may also be permitted to correlate their account with one or more user equipment 213, databases, servers, and/or third-party resources, such as one or more databases (e.g., database 111, 231, etc.) for storing information gathered via a developed and published form, one or more servers (e.g., form servers 203, 205, 207, 209, etc.) for publishing forms, one or more third-party resources 233 providing, for instance, APIs, content, etc., that may be utilized in association with developing, managing, monitoring, and/or publishing forms. In this manner, user 103 may specify addressing information (e.g., directory number, electronic serial number, international mobile equipment identifier, machine access control address, mobile directory number, mobile equipment identity, mobile identification number, internet protocol address, port address, and/or any other suitable address information) and/or user authentication information (e.g., username, password, etc.) corresponding to associated user equipment 213, databases, servers, and/or third-party resources 233 not provided and managed by a provider of the services of system 200, but are to be linked or otherwise associated with the user's account. Associated user equipment 213, databases (e.g., database 111, etc.), servers (e.g., form servers 203, 205, etc.), and/or third-party resources 233 may be configured to receive and/or transmit (e.g., exchange) information (e.g., forms, metrics, reports, schema, data, etc.) with portal 235 and/or platform 201.

User 103 may be further allowed to create, customize, and manage one or more user-defined policies for accessing and utilizing the services of system 200. In this manner, the user profile may include the aforementioned user profile information, e.g., username, password, account information, configuration information, and/or the like, as well as user-defined policy parameters enabling users to opt-in or opt-out of receiving information from, for example, platform 201 and/or sharing information with one or more third-party resources 233 and/or other users of the services of system 200. Accordingly, these parameters (or criteria) may be specified to govern the who, what, when, where, and how information is to be received and/or shared, such as one or more of the previously described parameters defining amount, circumstances, frequency, location, mode, subjects, timing, whitelists, blacklists, etc., for receiving and/or sharing information, such as performance reports, logging information, etc.

At step 405, platform 201 stores the generated user profile to, for example, profile database 217. In certain exemplary embodiments, platform 201 may additionally or alternatively store one or more pieces of the user profile information to a list of subscribers to the services of system 200, as well as a list of user equipment 213, databases (e.g., databases 111, 231, etc.), servers (e.g., form servers 203, 205, etc.), third-party resources 233, and/or other account information correlated to at least one of the services of system 200 to profile database 217. Also, platform 201 may additionally (or alternatively) store and/or synchronize this information to at least one other storage location or memory of, for instance, platform 201, user equipment 213, databases (e.g., databases 111, 231, etc.), servers (e.g., form servers 203, 205, etc.), and/or any other suitable storage location or memory of (or accessible to) system 200. Further, it is contemplated that users may directly interact with one or more of these storage facilities and/or memories, such as profile database 217.

Figure 5:
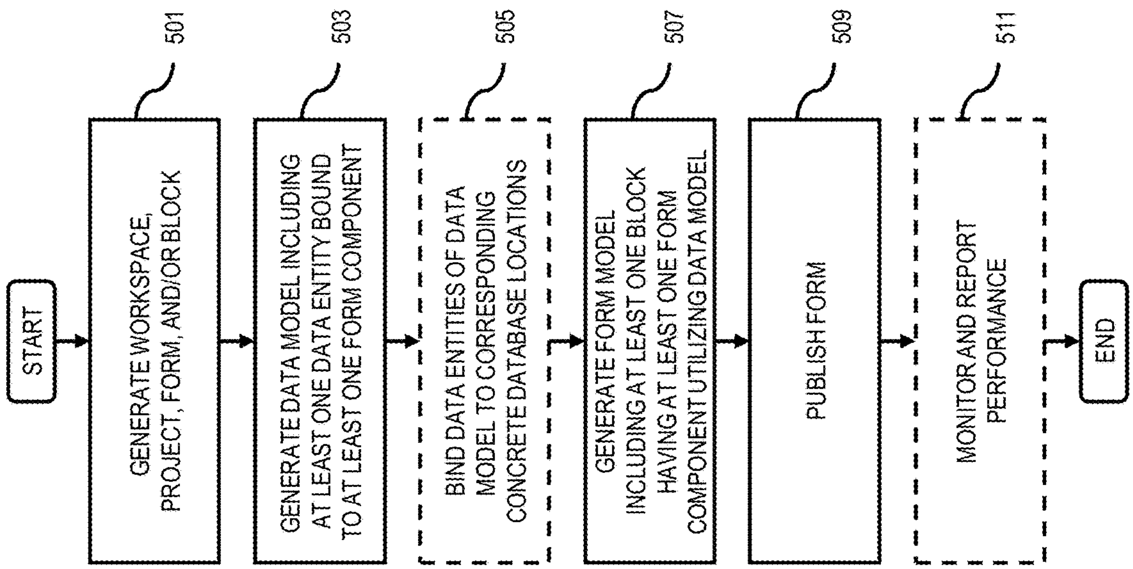
FIG. 5 is a flowchart of a process for developing and publishing a data-centric networked form according to some exemplary embodiments.

FIG. 5 is a flowchart of a process for developing and publishing a data-centric networked form according to some exemplary embodiments. For illustrative purposes, the process is described with reference to FIGS. 1-3. It is noted that the steps of the process may be performed in any suitable order, as well as combined or separated in any suitable manner.

Figure 10:
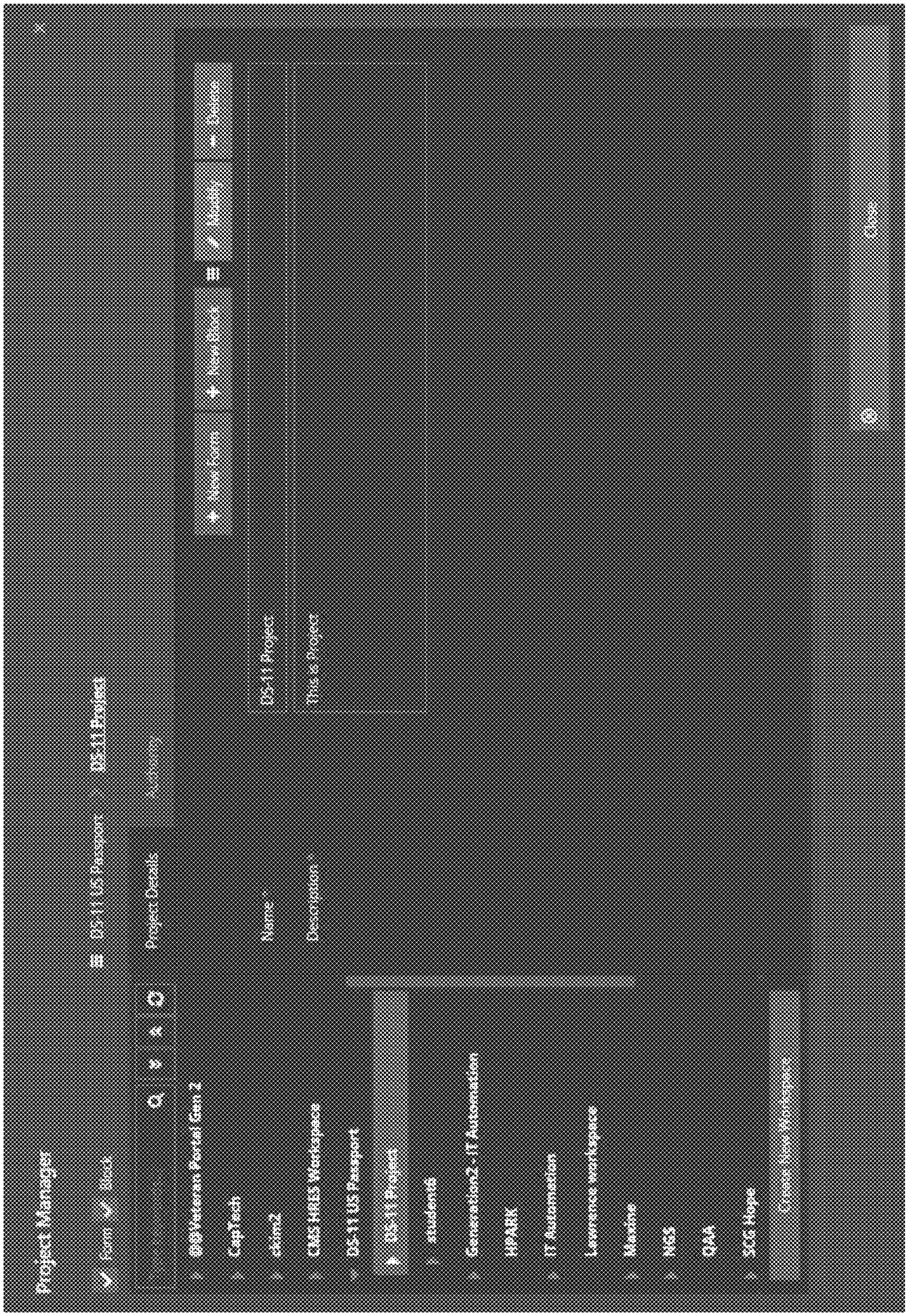
Figure 11:
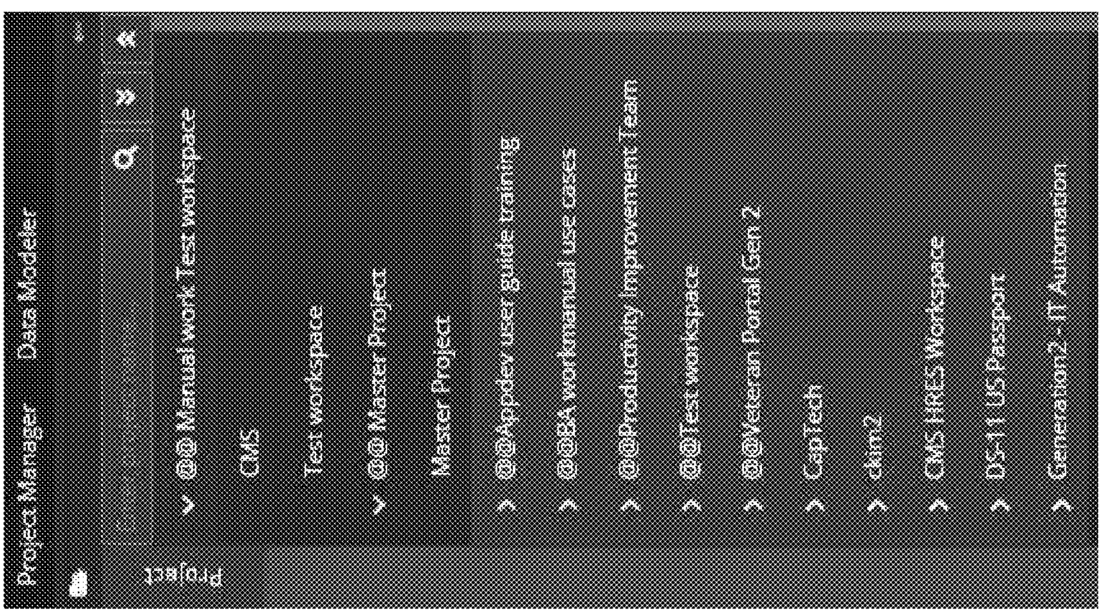
Figure 12:
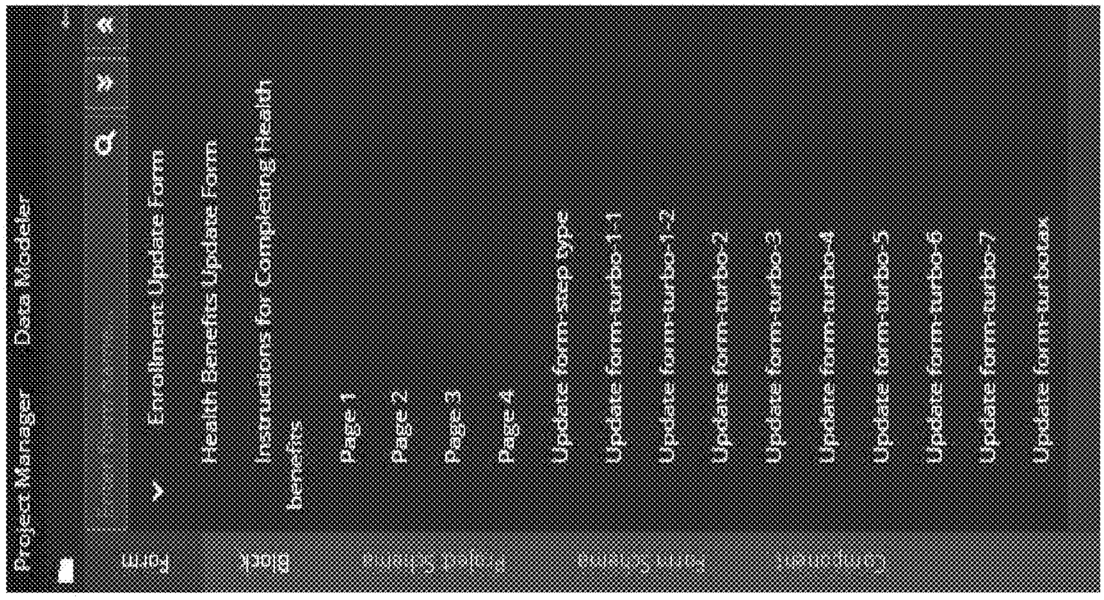
Figure 14:
Figure 13:
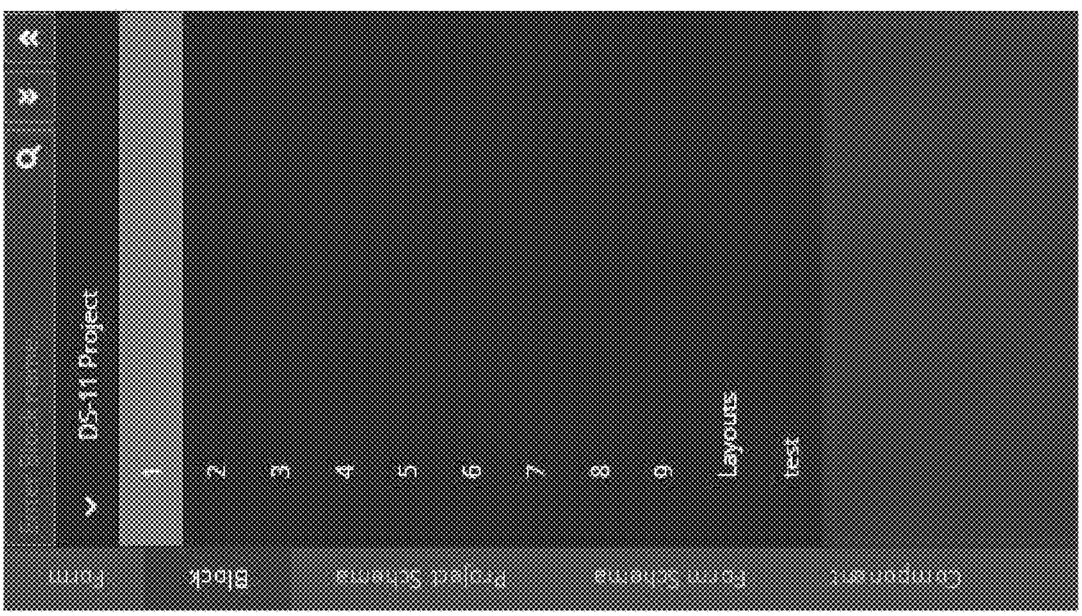

At step 501, user 103 may access platform 300 via portal 235 and, for instance, user equipment 213_1 to generate a workspace, project, form, and/or block using a GUI made available via, for example, user interface module 326. Exemplary user interfaces for creating a new workspace, a new project, a new form, and a new block are respectively shown in FIGS. 6 to 9. As seen in FIGS. 6 to 9, the respective user interfaces enable users to provide a name and a description of the workspace, project, form, and block. Further, "Save" and "Close" buttons are provided to save a created workspace, project, form, or block or cancel a process of saving a new workspace, project, form, or block. An exemplary user interface for managing workspaces and projects, as well as forms and blocks is shown in FIG. 10. It is noted that the user interface of FIG. 10 may serve as a landing user interface (e.g., landing page) to launch at least one of the user interfaces of FIGS. 6 to 9 based on at least one user input, such as user selection of a "Create New Workspace," "+New Project," "+New Form," or "+New Block" button selection. The user interface of FIG. 10 may also provide an interactive representation (e.g., tree view) of accessible workspaces, projects, forms, and blocks capable of being opened, modified, or deleted via selection of, for instance, "Modify" or "Delete" buttons. Similarly, the user interfaces of FIGS. 11 to 14 demonstrate other interactive representations configured to allow browsing and selection of accessible projects, forms, blocks, project schema, form schema, data entities, and form components within a workspace. As seen in FIGS. 11 to 14, the user interfaces include selectable tabs for toggling between accessible projects, forms, blocks, project schema, form schema, and form components of a current workspace.

Figure 15:
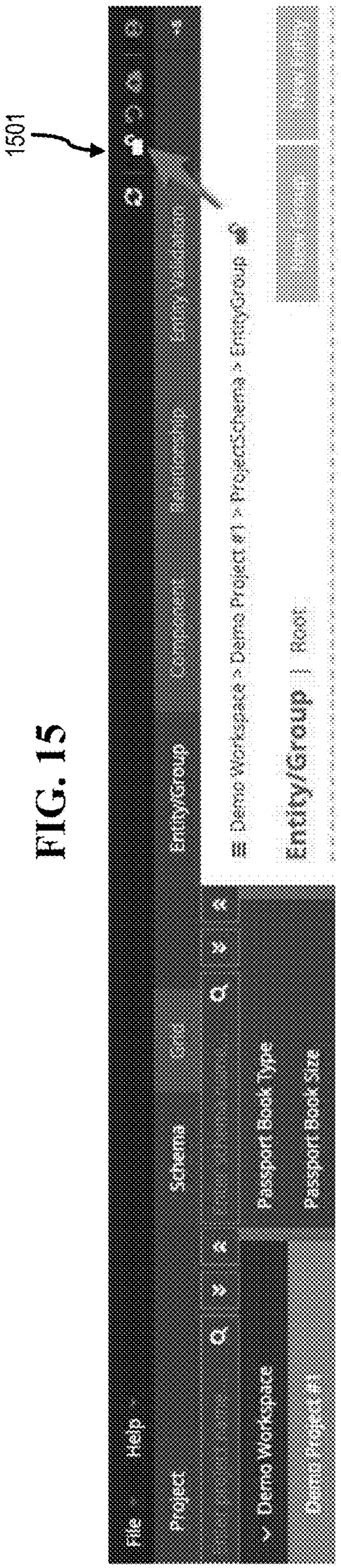
FIGS. 15 and 16 are diagrams of some user interfaces to initiate data modeling and/or form building processes according to various exemplary embodiments.
Figure 16:
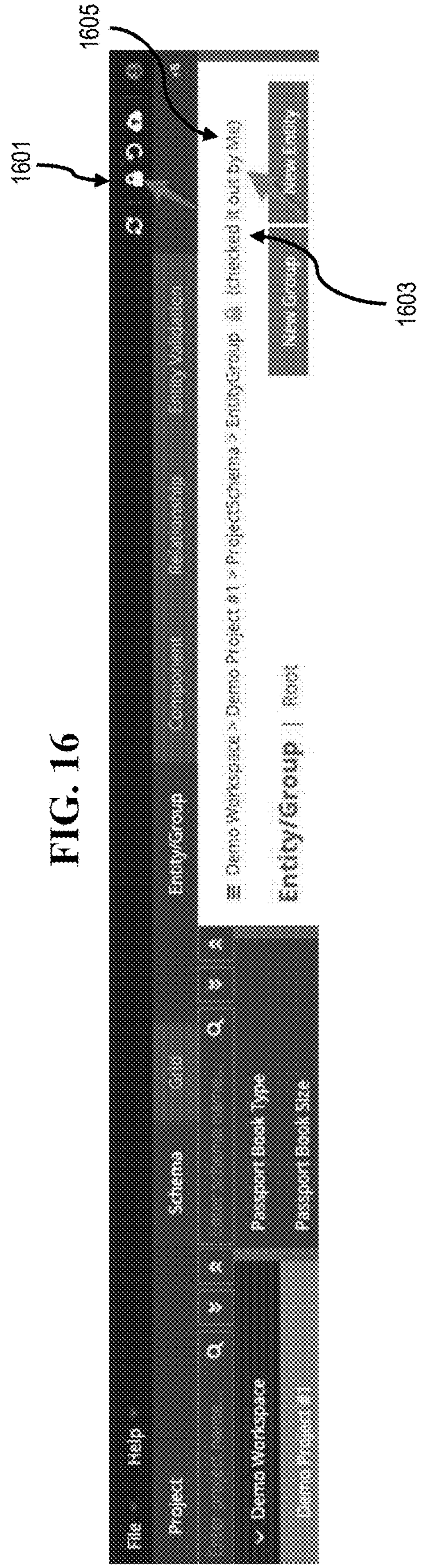

After creating a new workspace, project, form, and/or block, users may generate a data model including at least one data entity bound to at least one form component, per step 503. The data entity may define at least one piece of collectable data that may be gathered via the at least one form component. In some exemplary embodiments, data model generation may be initiated after a user "checks out" a project and may be terminated after a user "checks in" the project. FIGS. 15 and 16 illustrate an exemplary user interface button (e.g., a pad lock) utilized to convey whether or not a project is available for "checking out," and also to effectuate a "check out" or "check in" process when selected. For instance, a locked state 1601 of the pad lock may represent a "checked out" project, whereas an unlocked state 1501 of the pad lock may represent an available project capable of being "checked out." A selection of the pad lock may toggle the state of the project between "checked out" and "checked in" states 1601 and 1501. In some embodiments, a status 1603 of being "checked out" may be displayed along with a name 1605 of the user who has "checked out" a project or an aspect thereof. An exemplary process and associated user interfaces for generating a data model including at least one data entity bound to at least one form component will be described in more detail in association with FIGS. 17 to 28.

Figure 17:
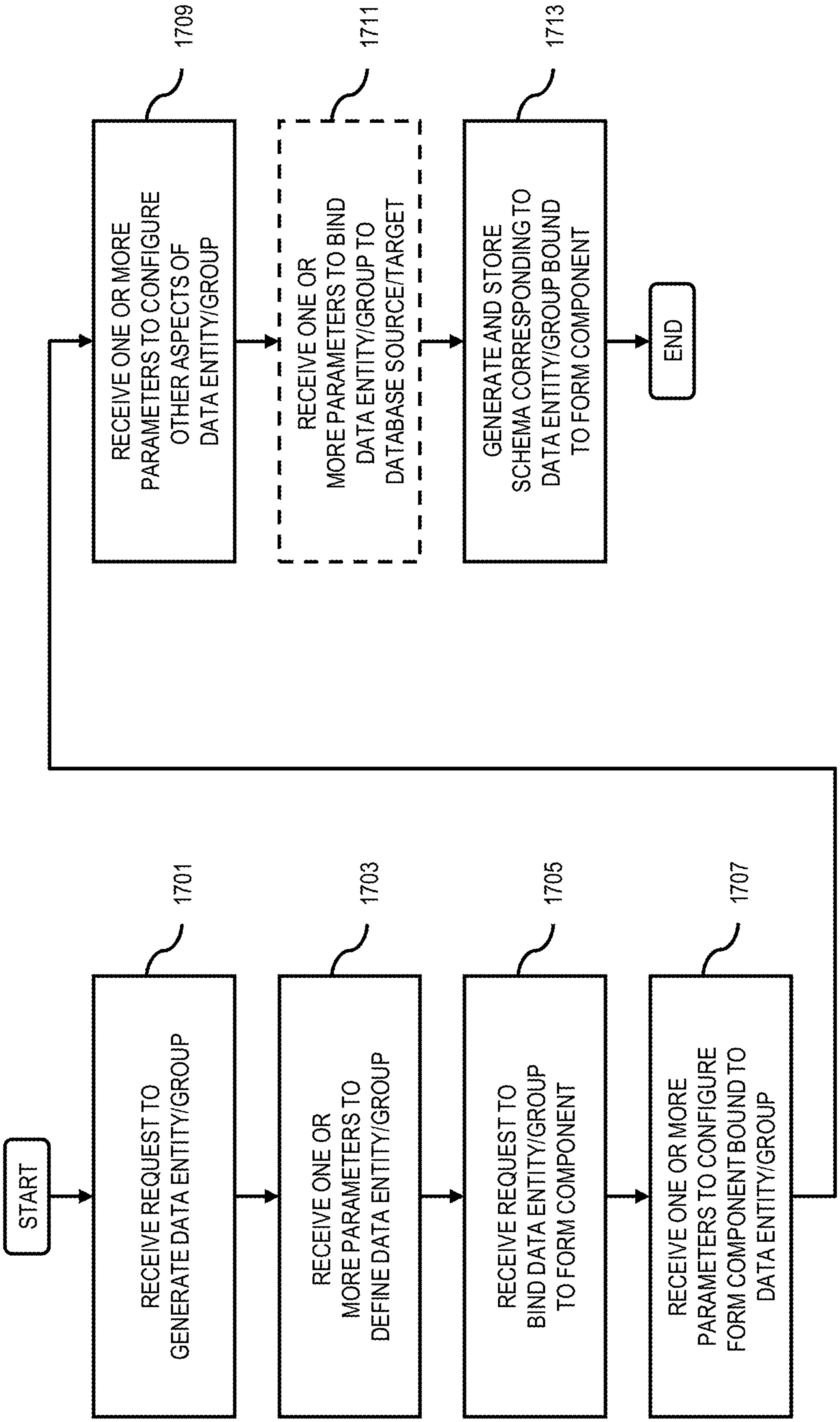
FIG. 17 is a flowchart of a process for defining a data entity according to some exemplary embodiments.

FIG. 17 is a flowchart of a process for defining a data entity according to some exemplary embodiments. For illustrative purposes, the process is described with reference to FIGS. 1-3. It is noted that the steps of the process may be performed in any suitable order, as well as combined or separated in any suitable manner.

Figure 18:
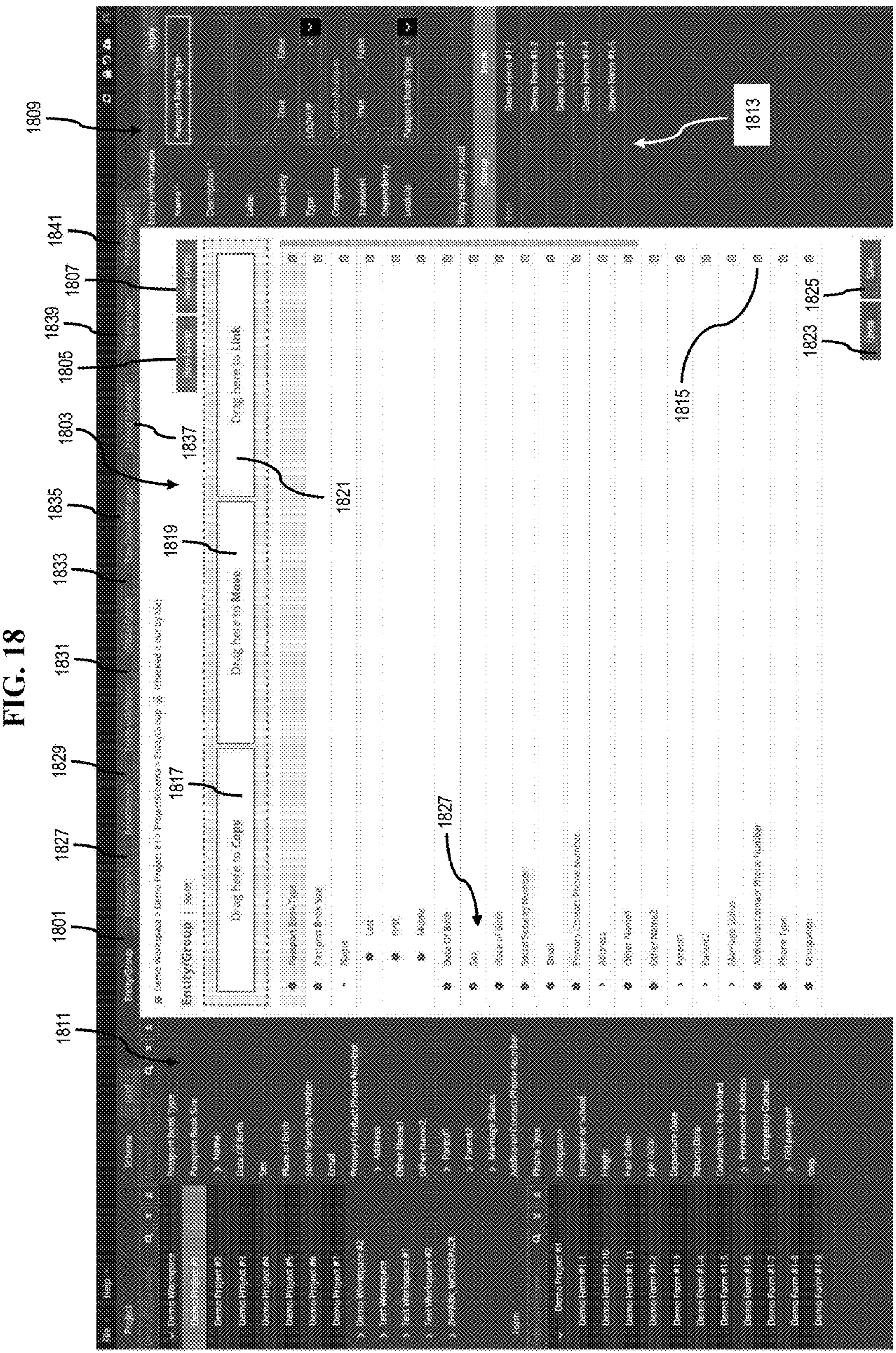
FIGS. 18, 19, 20, 21, 22, 23, 24, 25, 26, 27, and 28 are diagrams of some user interfaces for generating a data entity or group of data entities according to various exemplary embodiments.

At step 1701, platform 300 may receive via user interface module 326 and, for instance, user equipment 213_1, a request to generate a data entity or data group including a plurality of data entities. An exemplary user interface for initiating generation of a data entity or data group is shown in FIG. 18. As seen in FIG. 18, an "Entity/Group" tab 1801 may toggle an interactive design surface 1803 of the user interface to enable a new data entity or group to be created via, or instance, respective "New Entity" button 1805 and "New Group" button 1807. Based on user selection of the "New Entity" button 1805 or "New Group" button 1807, a pane 1809 at, for instance, a right side of the interactive design surface 1803 may toggle between providing various GUI objects for receiving one or more parameters to define a data entity or data group, such as in association with step 1703. Enlarged versions of exemplary dynamic panes of the user interface of FIG. 18 for receiving the one or more parameters are shown in FIGS. 19 and 20.

Figure 19:
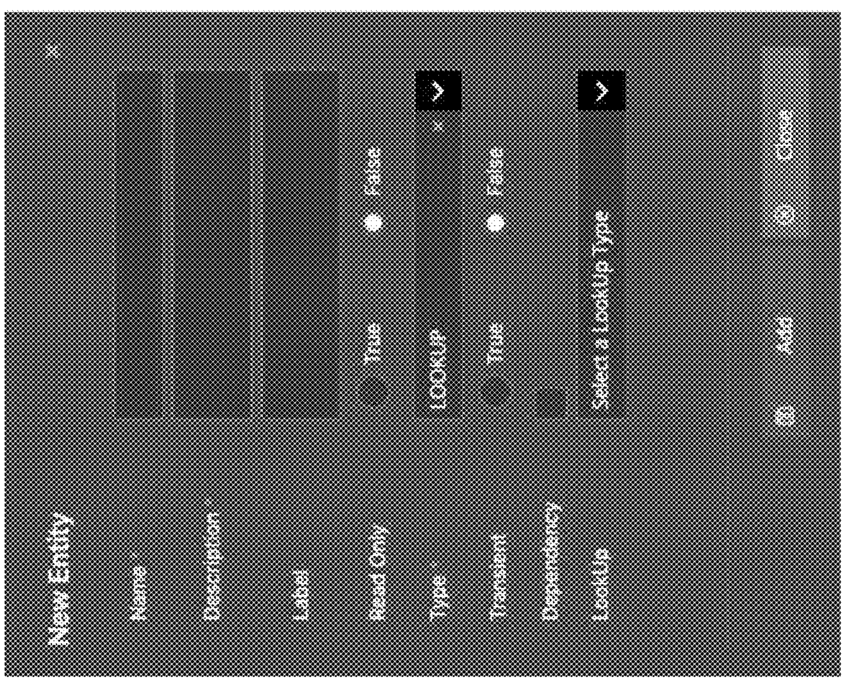
Figure 20:
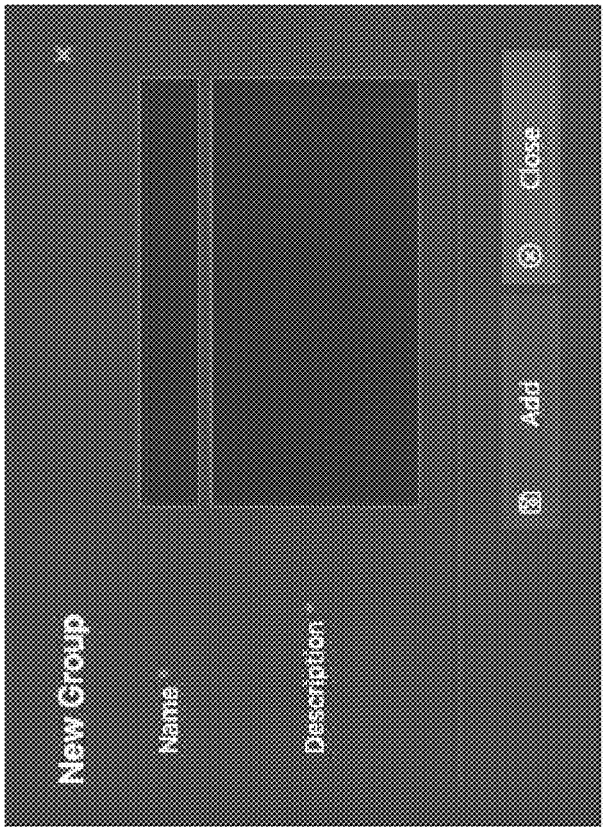

For example, the dynamic pane shown in FIG. 19 may include GUI objects for receiving parameters in association with generating a data entity, such as name, description, label, read-type, data type, transient nature, dependency, and lookup type parameters. The dynamic pane shown in FIG. 20 may include GUI objects for receiving parameters in association with generating a data group, such as name and description. Further, "Add" and "Close" buttons are provided to add a created data entity or group to a data model or cancel a process of adding a new data entity or group model. As will become more apparent below in association with FIGS. 44 and 45, modifications to the data model, e.g., addition of a data entity or data group, may not be available to a project until published. As seen in FIG. 18, an expandable list 1811 of created data entities and data groups may be viewed and may provide various GUI objects or controls for viewing historical use and removing an associated data entity or group from a project. For instance, selecting a data entity or group in the list may provide another dynamic pane 1813 (e.g., historical use information associated with a selected data entity or data group) at, for instance, the right lower side of the user interface of FIG. 18. A trash can GUI object 1815 may be selected to remove a data entity or data group from a data model. In addition, "Drag here to Copy," "Drag here to Move," and "Drag here to Link" GUI objects 1817, 1819, and 1821 may be provided to copy, move, and/or link a data entity and data groups to a form component. The GUI may also include "Undo" and "Save" buttons 1823 and 1825 to rollback or save changes made to a data model.

Figure 21:
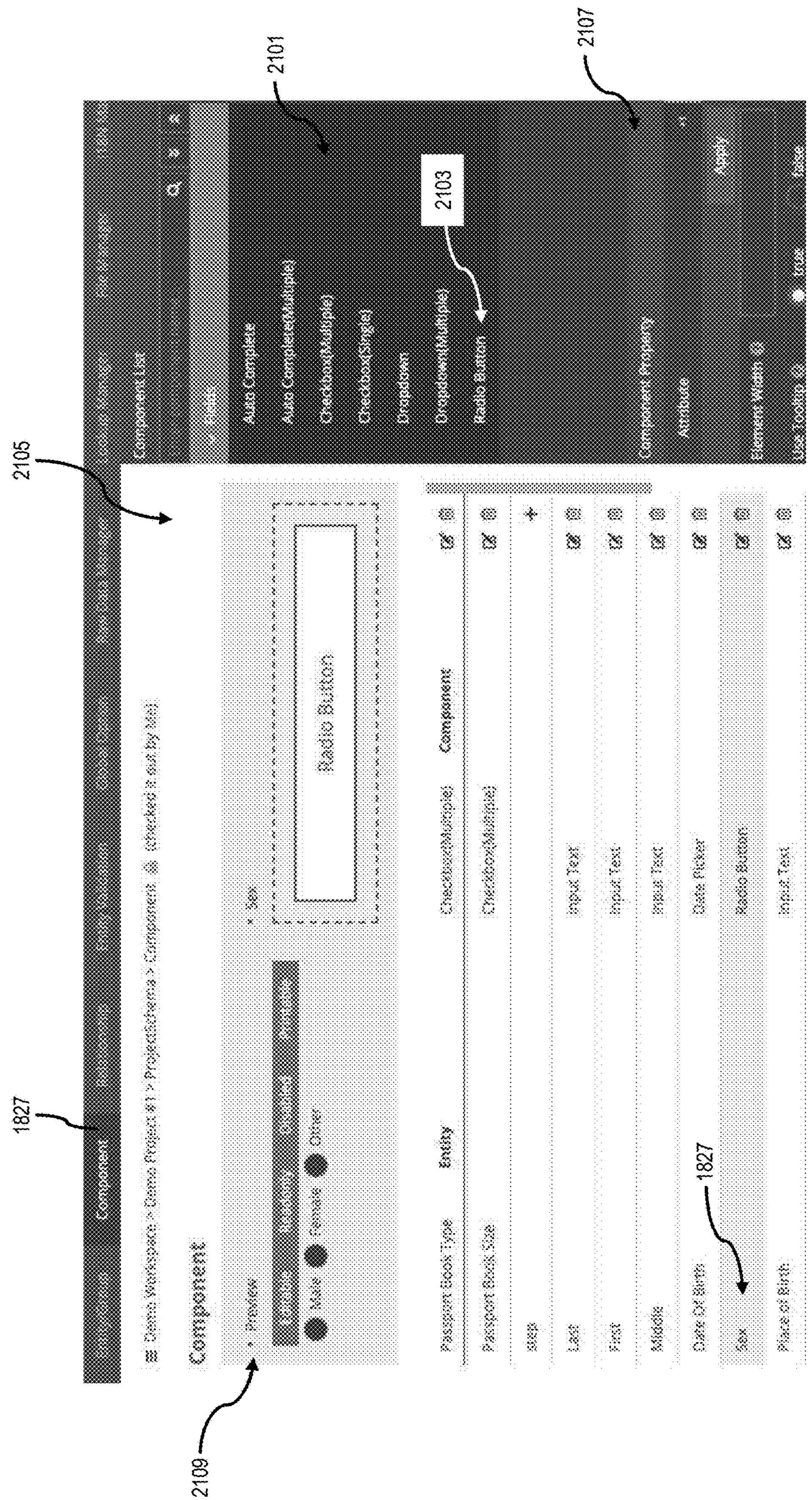
Figure 22:
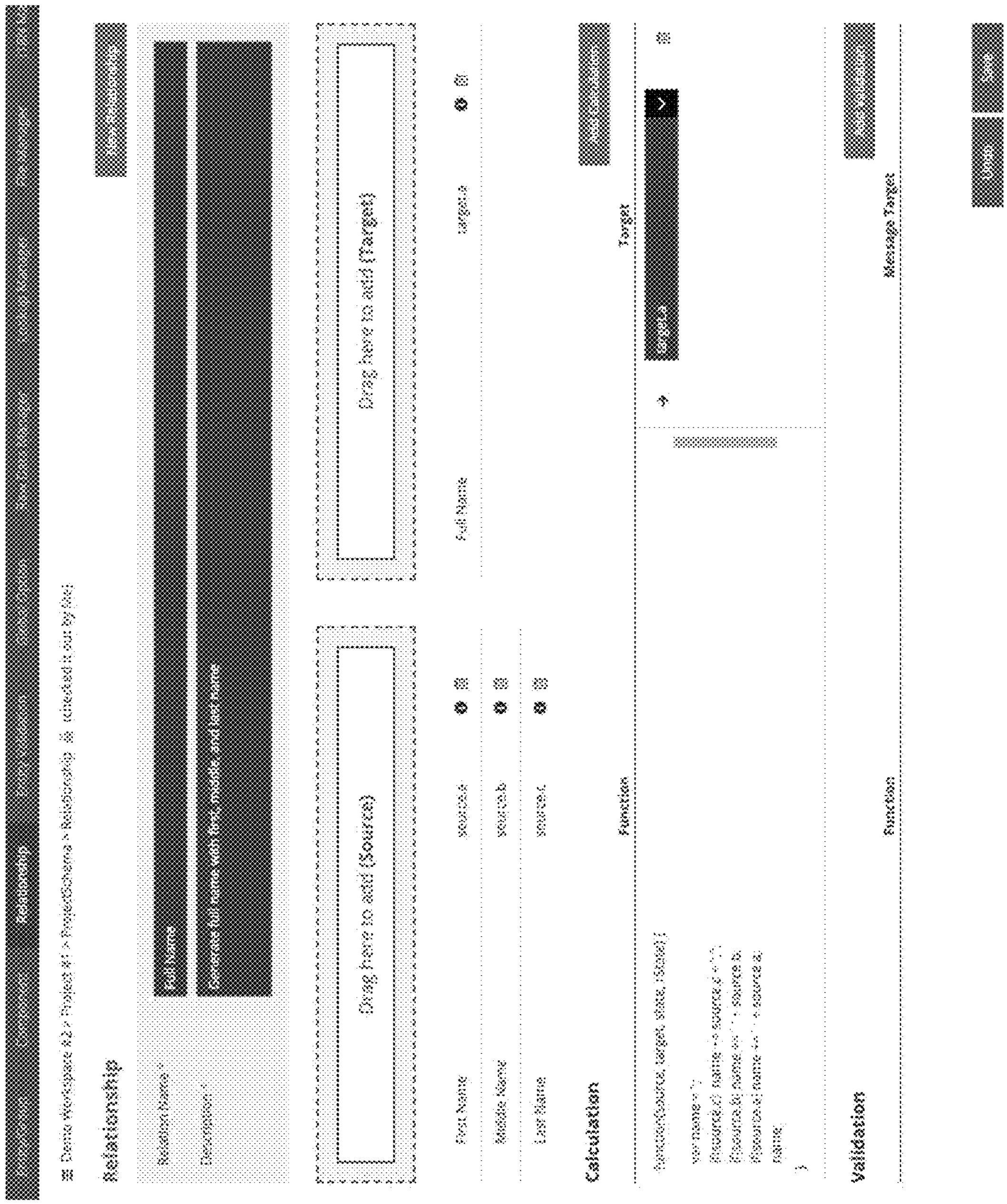
Figure 23:
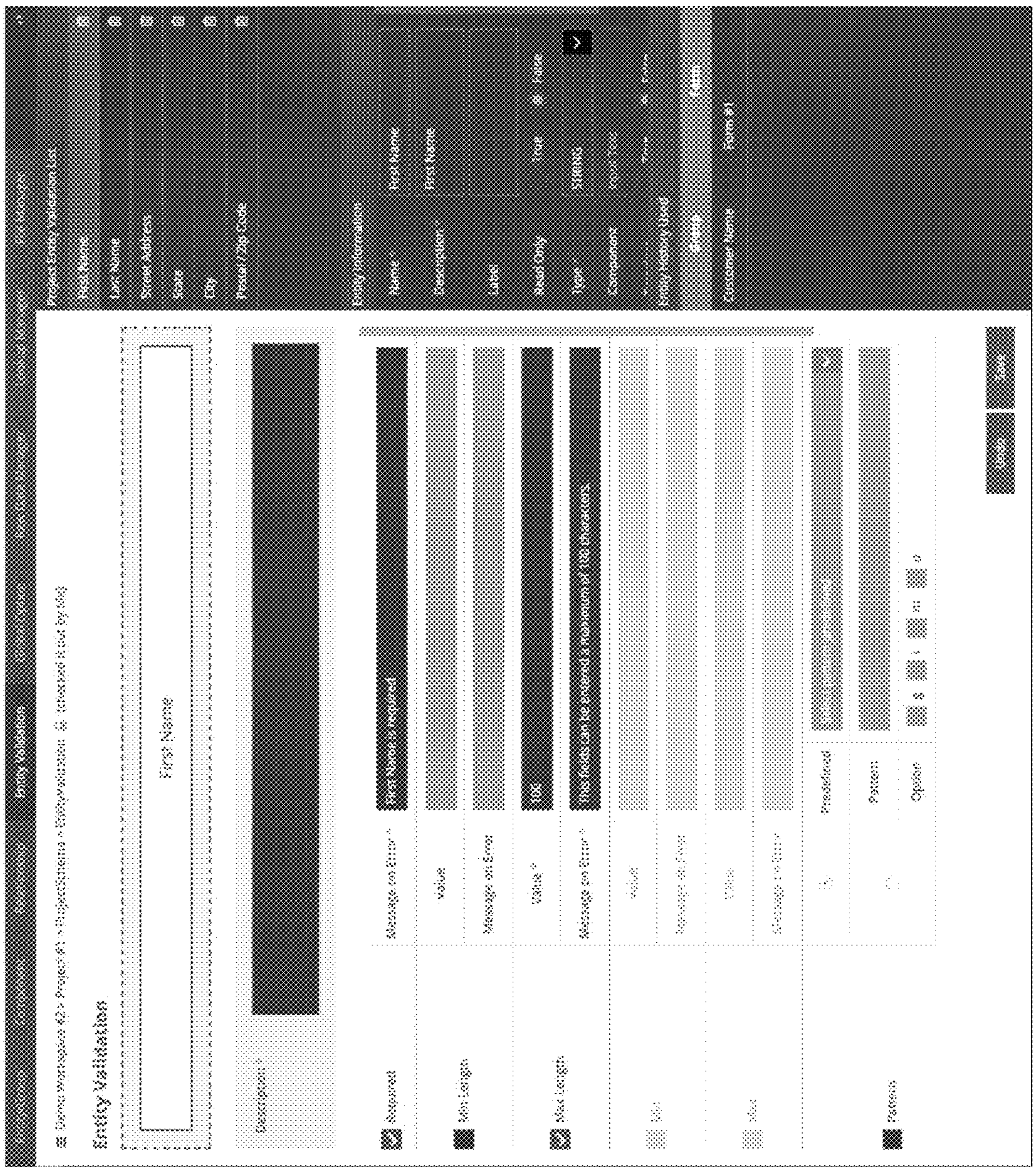
Figure 24:
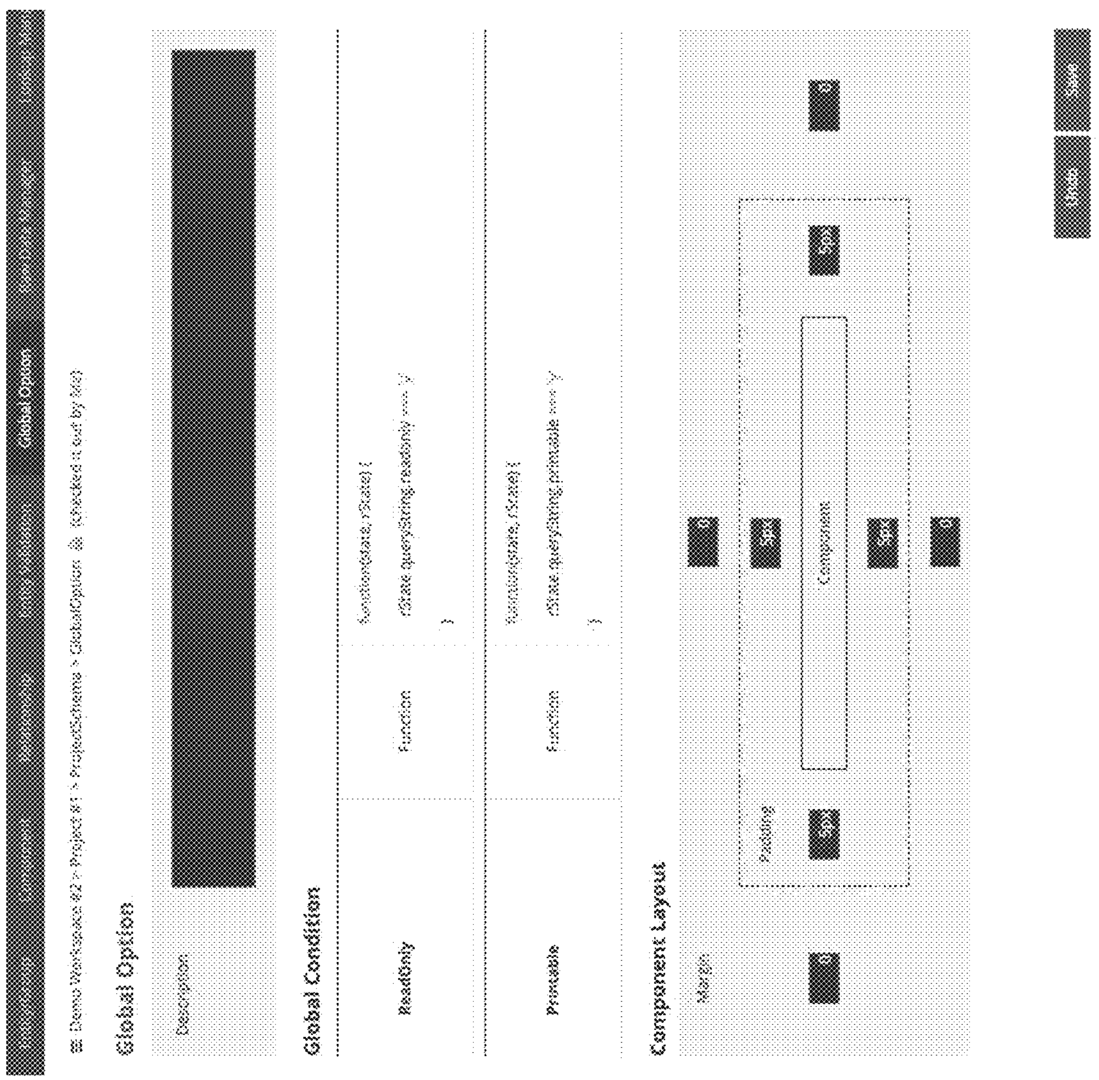
Figure 25:
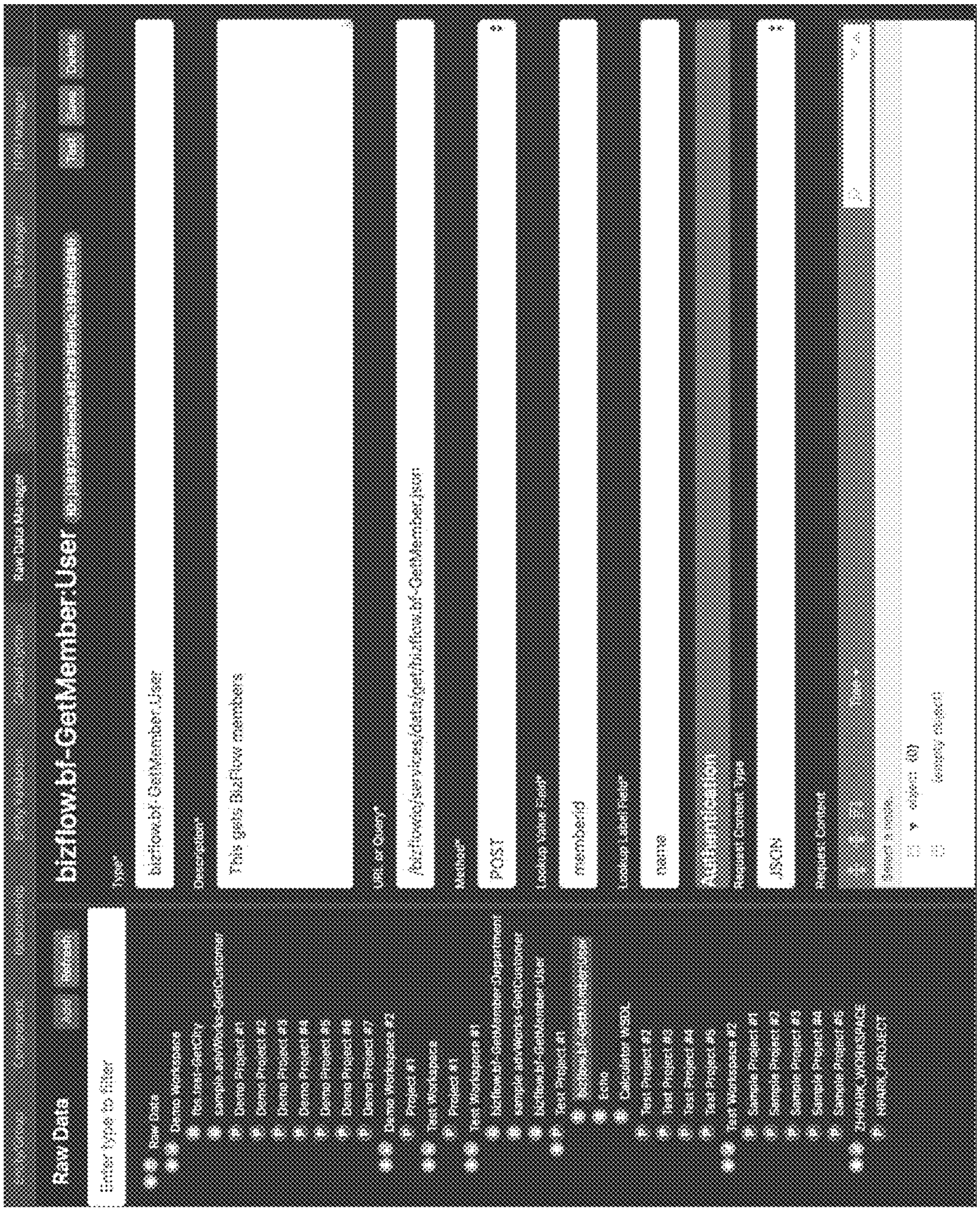
Figure 26:
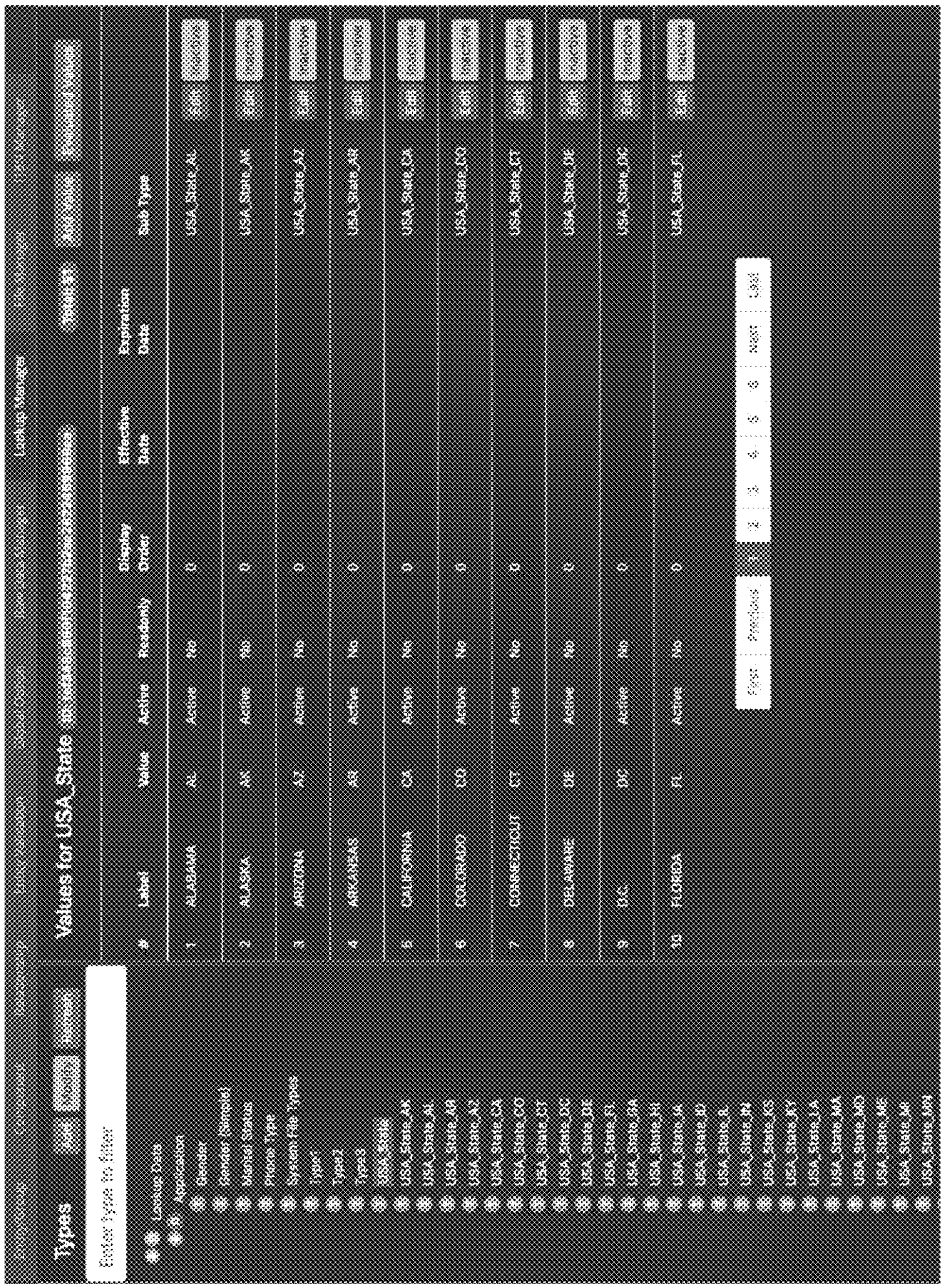
Figure 27:
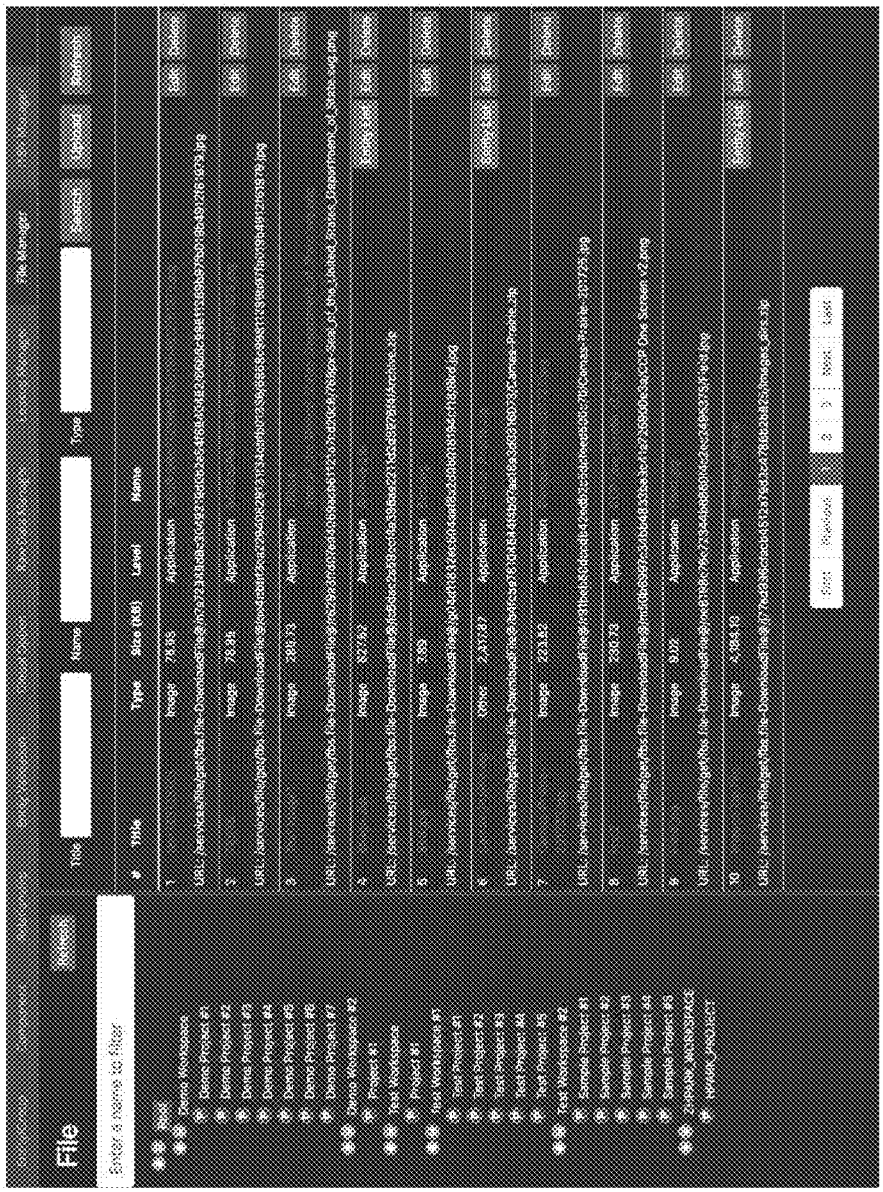
Figure 28:
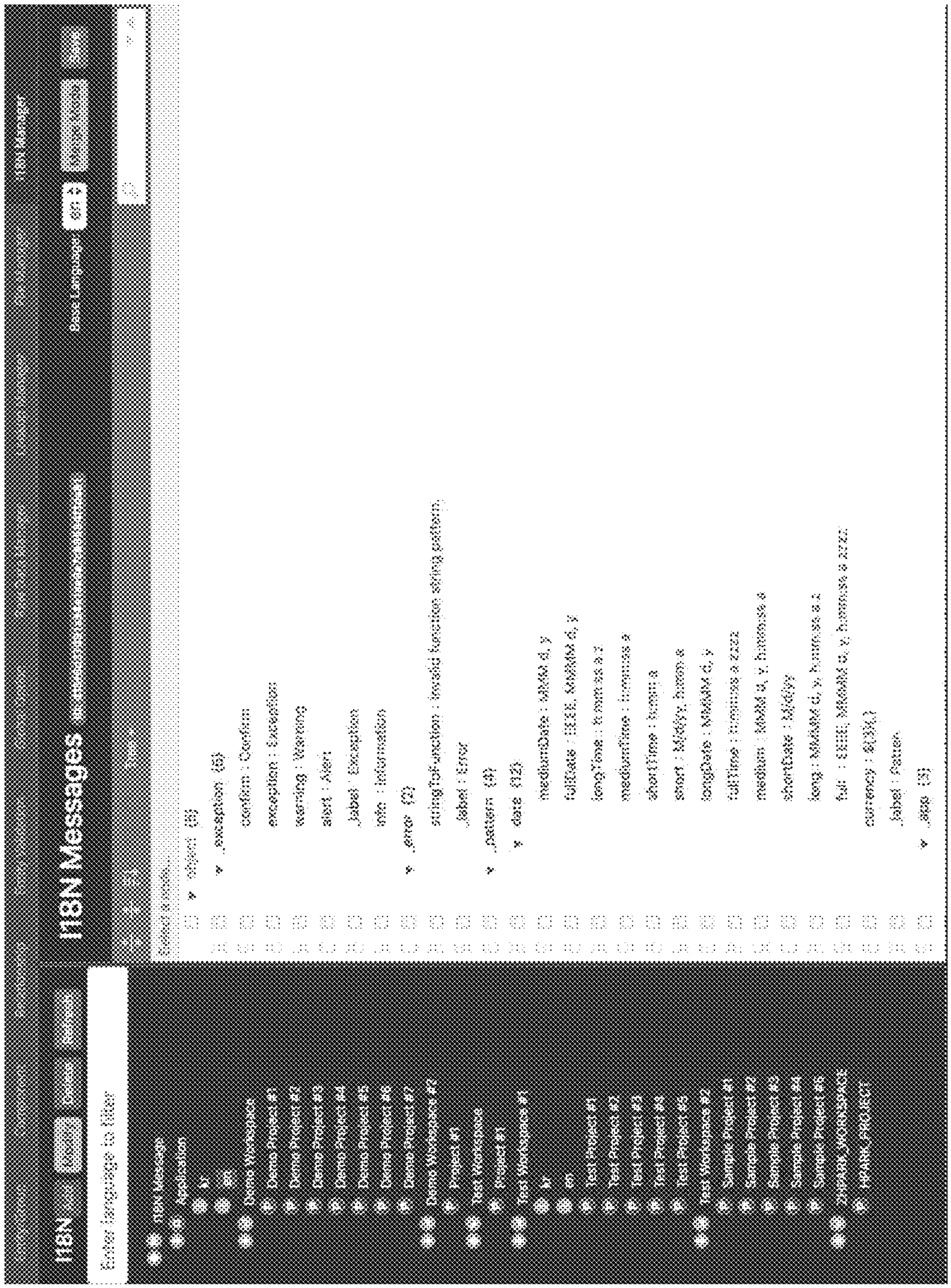

Referring back to FIG. 17, platform 300 may receive, per step 1705, a request to bind a data entity or data group to a form component. For instance, as seen in the user interface of FIG. 18, a "Component" tab 1827 may toggle an interactive design surface 1803 of the user interface to enable a selected data entity or data group to be bound to a specified form component, such as one of the previously described form components. An exemplary user interface for binding a form component to a data entity is shown in FIG. 21. In some exemplary embodiments, a dynamic pane 2101 providing a list of available form components that may be bound to a selected data entity may be provided at a right side of the user interface of FIG. 21. As such, a user may select a data entity (e.g., a "Sex" data entity 1827) in a corresponding list of the interactive design surface 1803, and, for example, drag-and-drop a corresponding form component (e.g., "Radio Button" 2103) from a list of components onto the interactive design surface 2105 to bind the corresponding form component to the selected data entity. Various properties, attributes, etc., of the bound form component may be entered, selected, or otherwise established, in step 1707, via one or more dynamic panes 2107 provided at, for instance, the lower right side of the interactive design surface 2105 of FIG. 21. These dynamic panes may change based on the form component being bound to the selected data entity or data group. As such, users may specify what data, what form component, and how the data and form component should appear to gather information via a form. Accordingly, a preview 2109 of a corresponding form component configured to gather information associated with the selected data entity may be provided via interactive design surface 2105 to enable users to better understand the effect of changes made via dynamic panes 2101, 2107, etc. It is noted that formation of the data model may establish default configurations for data entities or data groups and the form components bound thereto.

In association with step 1709, platform 300 may receive one or more other parameters to configured various other aspects of a data entity or data group. For instance, the exemplary user interface of FIG. 22 may be utilized to build relationships between selected data entities or data groups. The exemplary user interface of FIG. 23 may be utilized to define validation rules for selected data entities or data groups. The exemplary user interface of FIG. 24 may be utilized to define global options for selected data entities or data groups. Furthermore, the exemplary user interface of FIG. 25 may be utilized to register and manage external APIs in association with selected data entities or data groups. The exemplary user interface of FIG. 26 may be utilized to register and manage lookup data in association with selected data entities or data groups. The exemplary user interface of FIG. 27 may be utilized to upload and manage files for a project and provide support to download a file in, for instance, a compressed format, e.g., ZIP format. It is also contemplated that a user interface may be provided to manage multilingual labels and messages in association with selected data entities or data groups, or in association with other aspects of a form. As seen in FIG. 18, the user interface may include a plurality of tabs, e.g., an "Entity/Group" tab 1801, a "Component" tab 1827, a "Relationship" tab 1829, an "Entity Validation" tab 1831, a "Global Option" tab 1833, a "Raw Data Manager" tab 1835, a "Lookup Manager" tab 1837, a "File Manager" tab 1839, and an "I18N Manager" tab 1841, to enable the interactive design surface 1803 of the user interface to toggle amongst at least the user interfaces of FIGS. 18 and 21-28.

Averting back to FIG. 17, platform 300 may receive, at step 1711, one or more parameters binding selected aspects of data entities or data groups and/or their associated form components to various corresponding database locations for storing concrete data. This is an optional step of the process of FIG. 17, and, as such, may be performed as part of step 505 in the process of FIG. 5, or not performed at all. In other words, step 505 may also be an optional step of the process of FIG. 5. In instances when the data entities are not bound to corresponding database locations, instances of pieces of collectable data captured via form 105 may be stored as nested values in a structure of the data model as "abstract data." In some exemplary embodiments, a conventional script editor may be provided for users to manually write computer code to form the links, e.g., map at least one of the parameters in the data model to a corresponding database location. In certain exemplary embodiments, predefined APIs and/or user selections may be automatically employed by platform 300 to map and store instances of pieces of collectable data as abstract data and/or as concrete data, as well as to organize the storage of the collected data according to the data model defined by user 103. At step 1713, platform 300 may dynamically generate and store data schema corresponding to a configured data entity or data group bound to a form component, and, in some embodiments, at least one database location. Although described as a terminal step, platform 300 may dynamically generate, modify, and store the data schema as a data entity or data group is being configured through the various steps of the process of FIG. 17.

Referring back to FIG. 5, once a data model has been created, users may generate, at step 507, a form model including at least one data entity bound to a corresponding form component utilizing the data model, such as via gesture-based interaction with at least a representation of the data model made available via at least one user interface component. An exemplary process and associated user interfaces for generating and customizing a form or block will be described in more detail in association with FIGS. 29, 30, 31 to 38, and 39A-39C.

Figure 29:
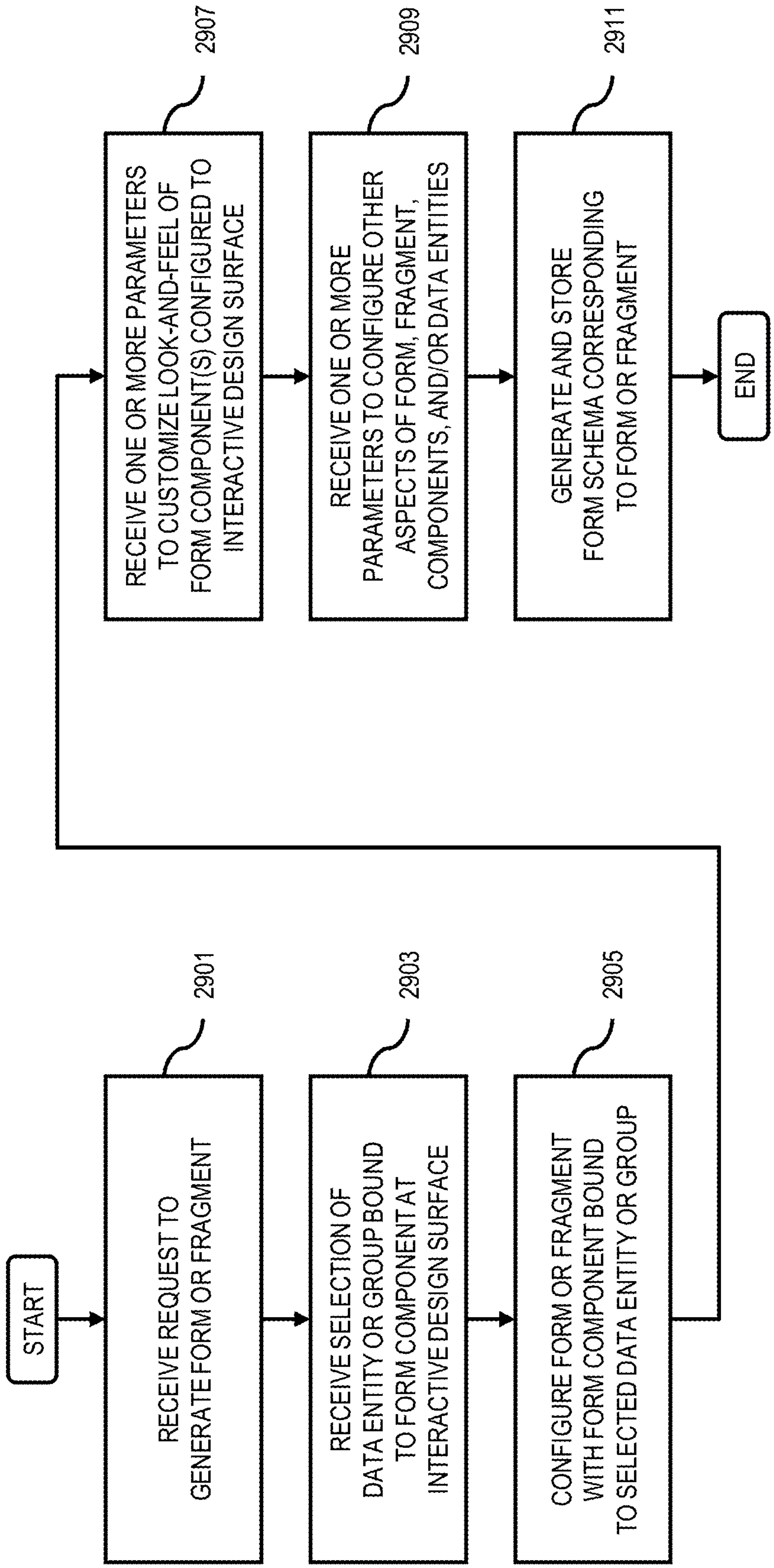
FIG. 29 is a flowchart of a process for generating and storing a data-centric form or block according to some exemplary embodiments.

FIG. 29 is a flowchart of a process for generating and storing a data-centric form or block according to some exemplary embodiments. For illustrative purposes, the process is described with reference to FIGS. 1-3. It is noted that the steps of the process may be performed in any suitable order, as well as combined or separated in any suitable manner.

Figure 30:
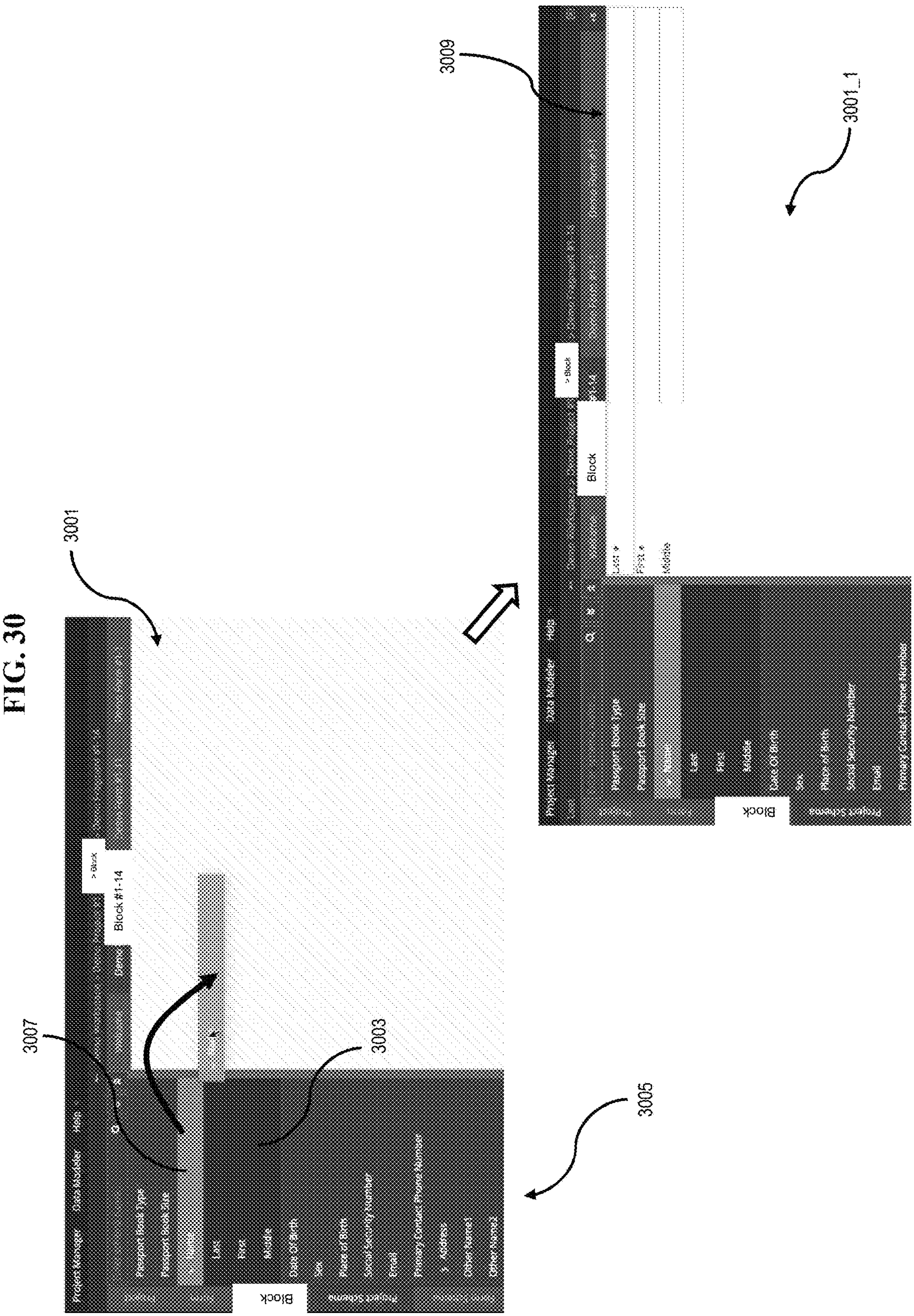
FIGS. 30, 31, 32, 33, 34, 35, 36, 37, 38, 39A, 39B, and 39C are diagrams of some user interfaces for building forms and blocks according to various exemplary embodiments.

At step 2901, platform 300 may receive a request to generate a form or block, such as a request received via the "+New Form" or "+New Block" buttons of the user interface of FIG. 10. As mentioned in association with FIGS. 8 and 9, platform 300 may receive a name and a description of the form or block. In response to the request to generate the form or block, platform 300 may present, via user interface module 326, a user with an interactive design surface 3001 to incorporate a data entity, data group, and/or at least one previously developed block or form into the current form or block. In this manner, the data entities, data groups, and previously developed blocks and forms may be reusable aspects of the project and/or incorporated into at least one other project. An exemplary user interface including interactive design surfaces 3001 and 3001_1 are shown in FIG. 30. The user interface includes an expandable, interactive list 3003 of data entities and data groups capable of being incorporated into the form or block made available in a dynamic pane 3005 as part of a visual representation of project schema, as well as includes an interactive design surface 3001 presented in a central area of the user interface adjacent to the dynamic pane 3005.

In step 2903, platform 300 may receive a selection of a data entity or data group from the interactive representation. For instance, a user may drag-and-drop an interactive GUI object 3007 representing, for example, a "Name" data group including "Last," "First," and "Middle" name data entities, at the interactive design surface 3001 of the user interface of FIG. 30. In response to receiving the request, form building module 314 may configure (per step 2905) the interactive design surface 3001, e.g., a block 3009 of form 105, with those form components bound to the selected data entity or data group, such as configure the interactive design surface 3001_1 with "Last," "First," and "Middle" name textboxes and associated labels shown at the lower right side of FIG. 30. As part of configuring the interactive design surface 3001_1 with those form components bound to the selected data entity or data group, form building module 314 may automatically generate and/or modify form schema and project schema, as well as cause platform 300 to automatically generate underlying computer code to support data collection and storage (e.g., abstract and/or concrete data storage) via the configured form components.

Figure 31:
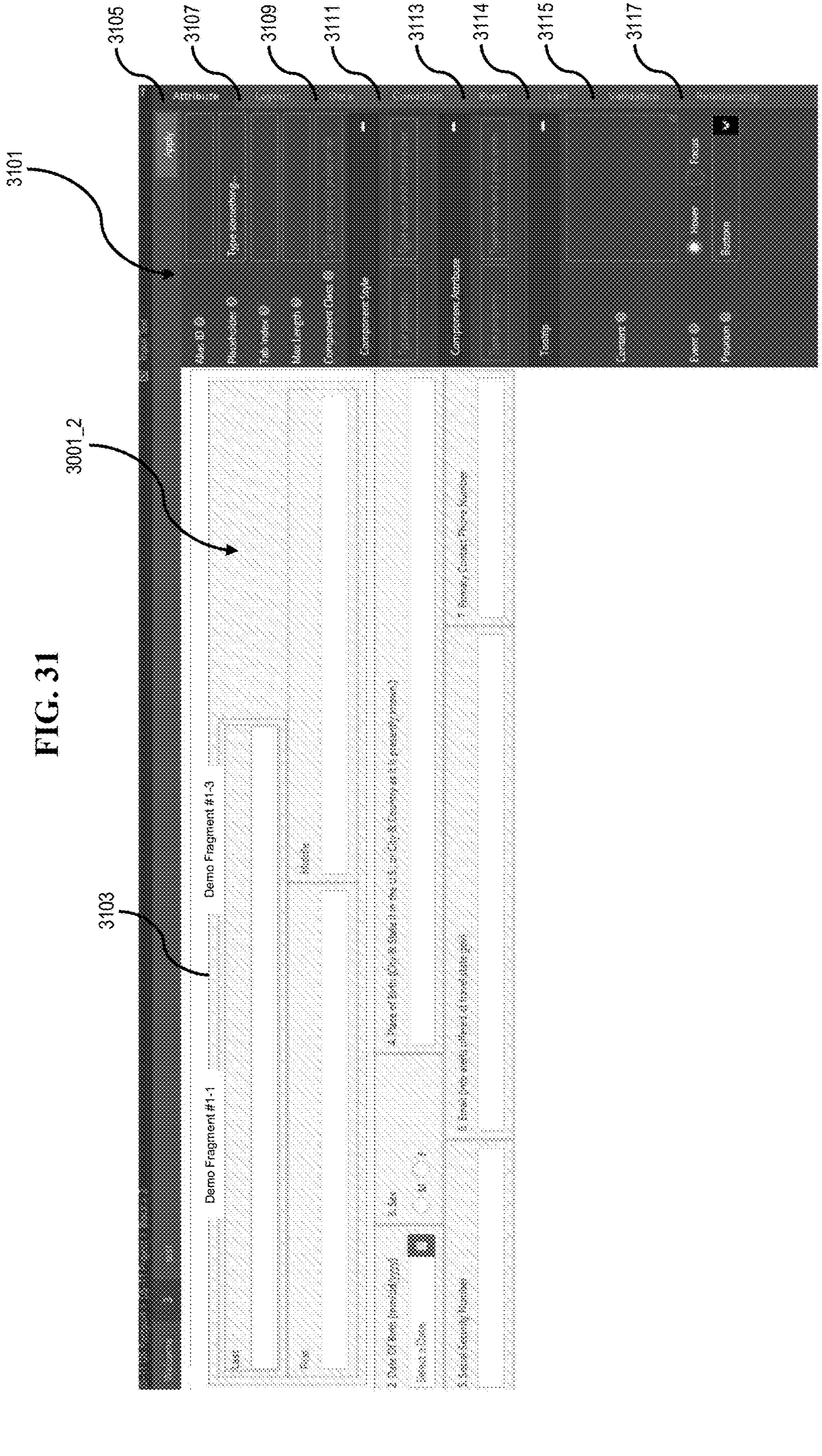
Figure 32:
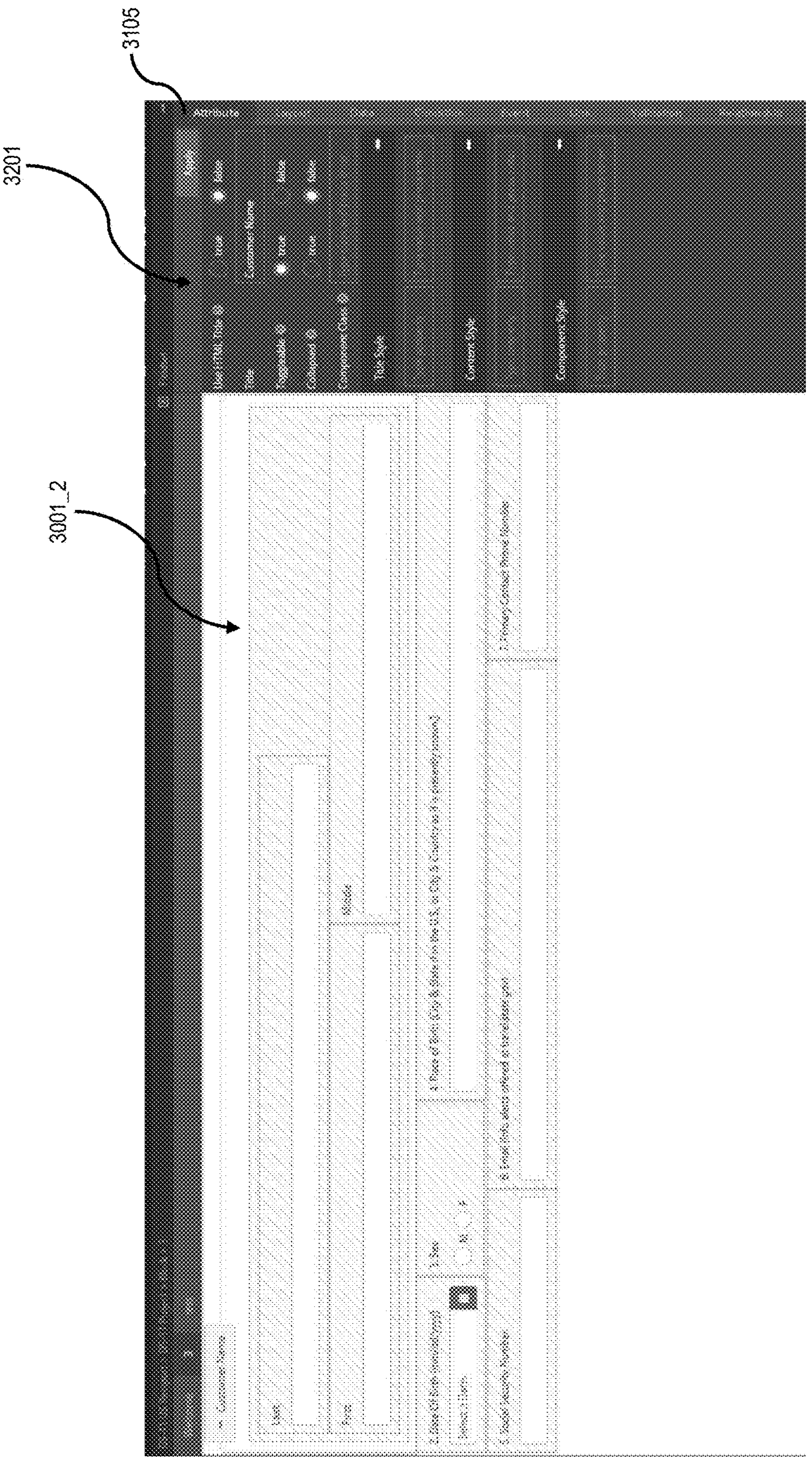
Figure 33:
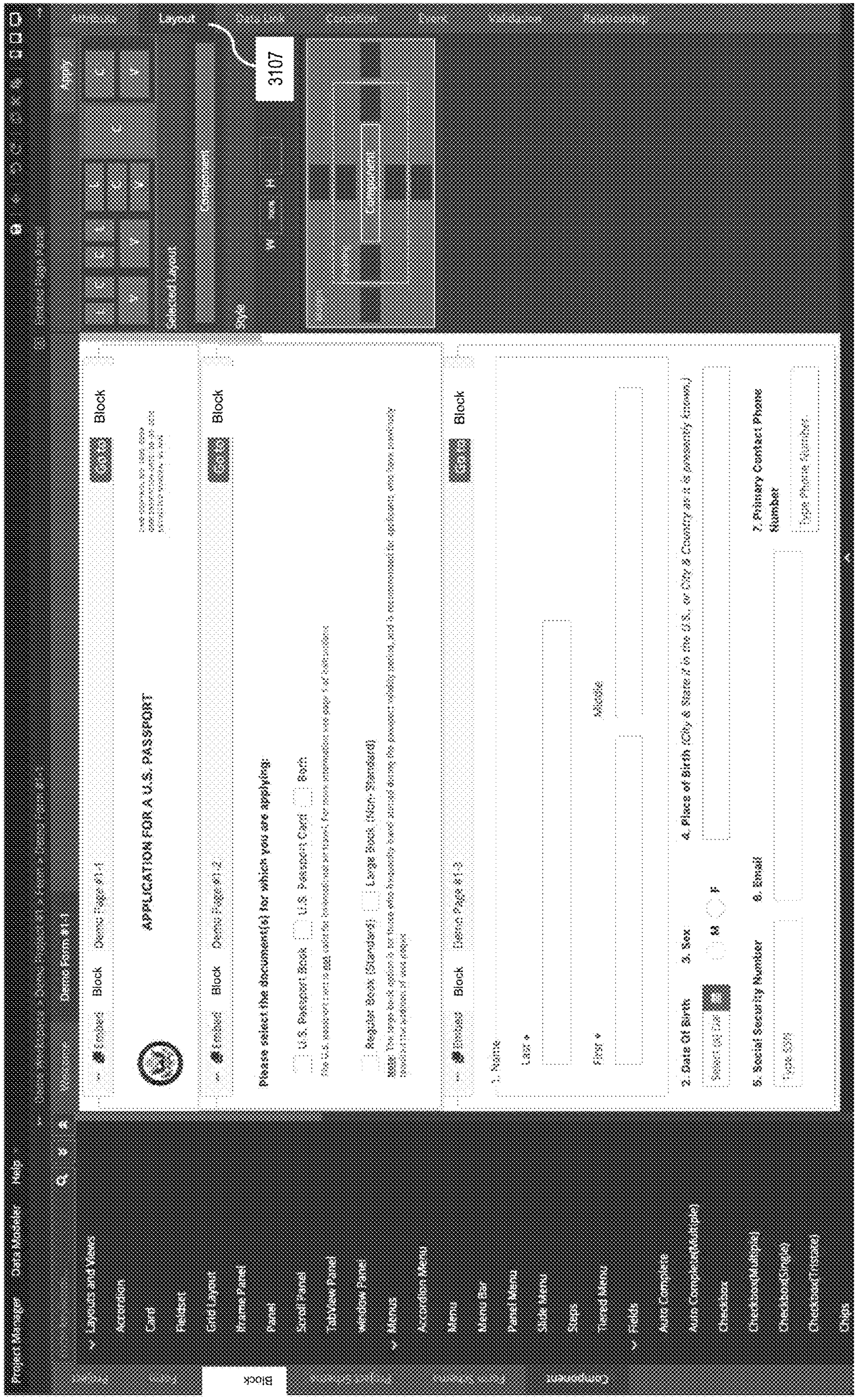
Figure 34:
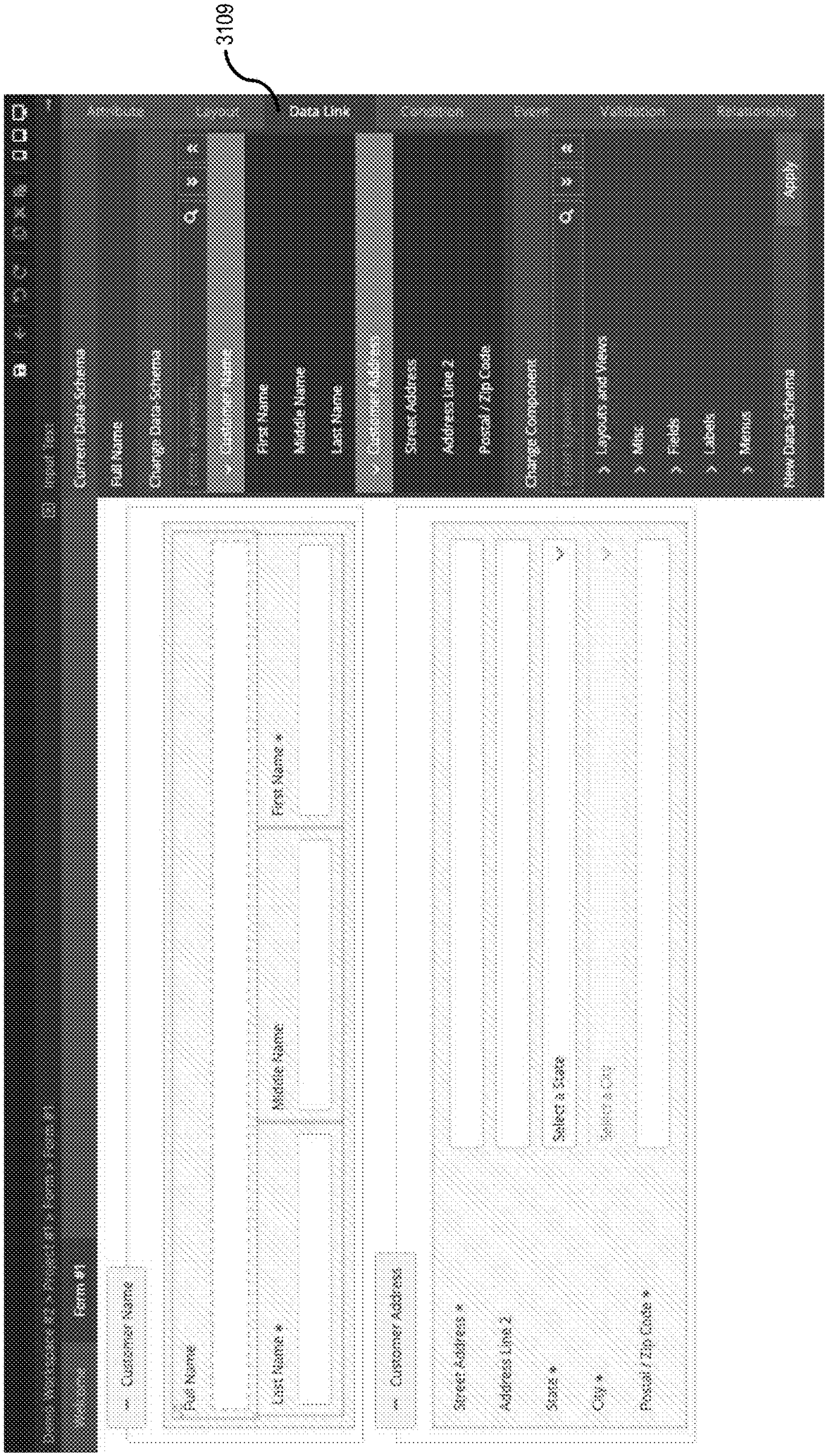
Figure 35:
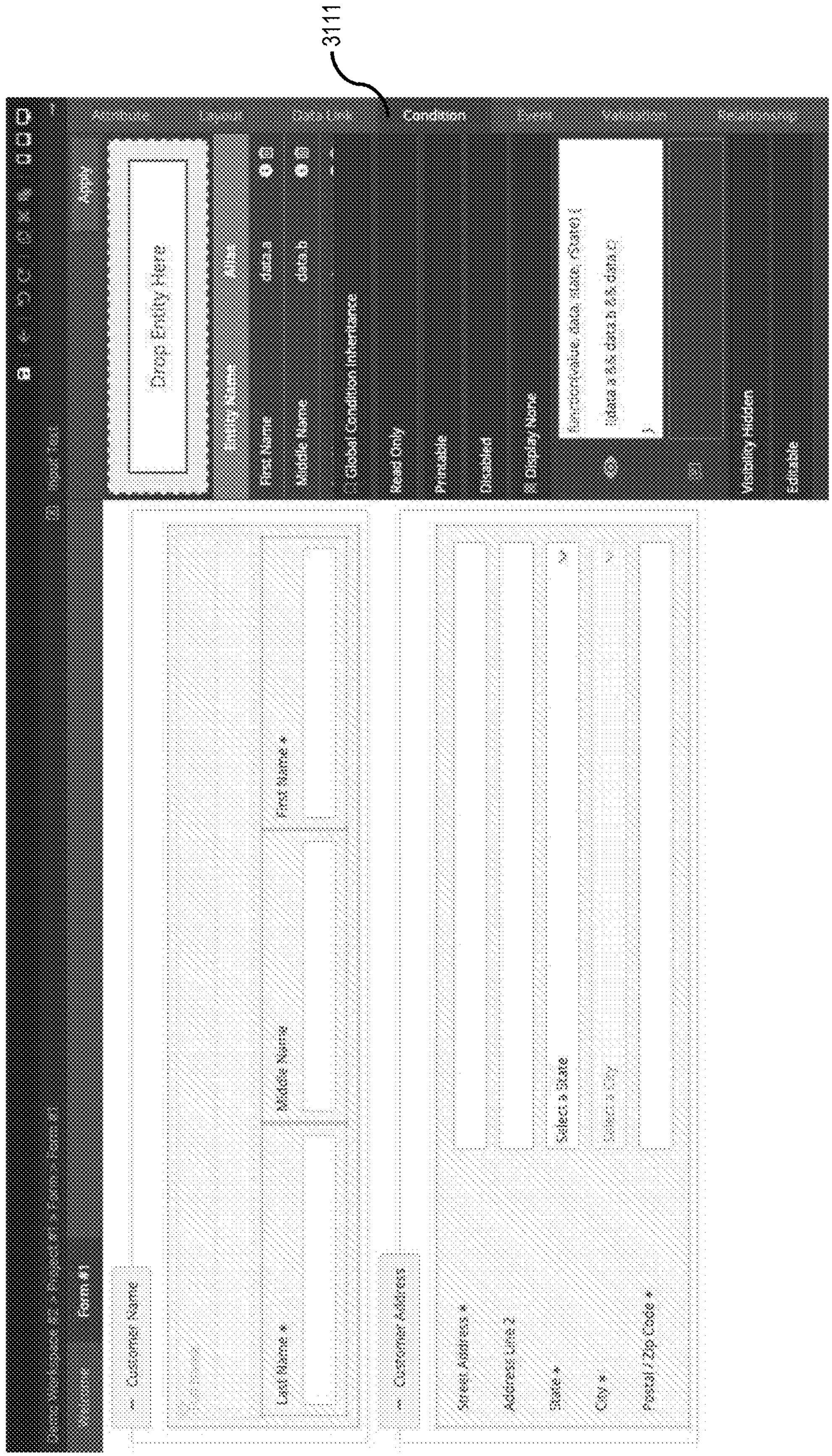
Figure 36:
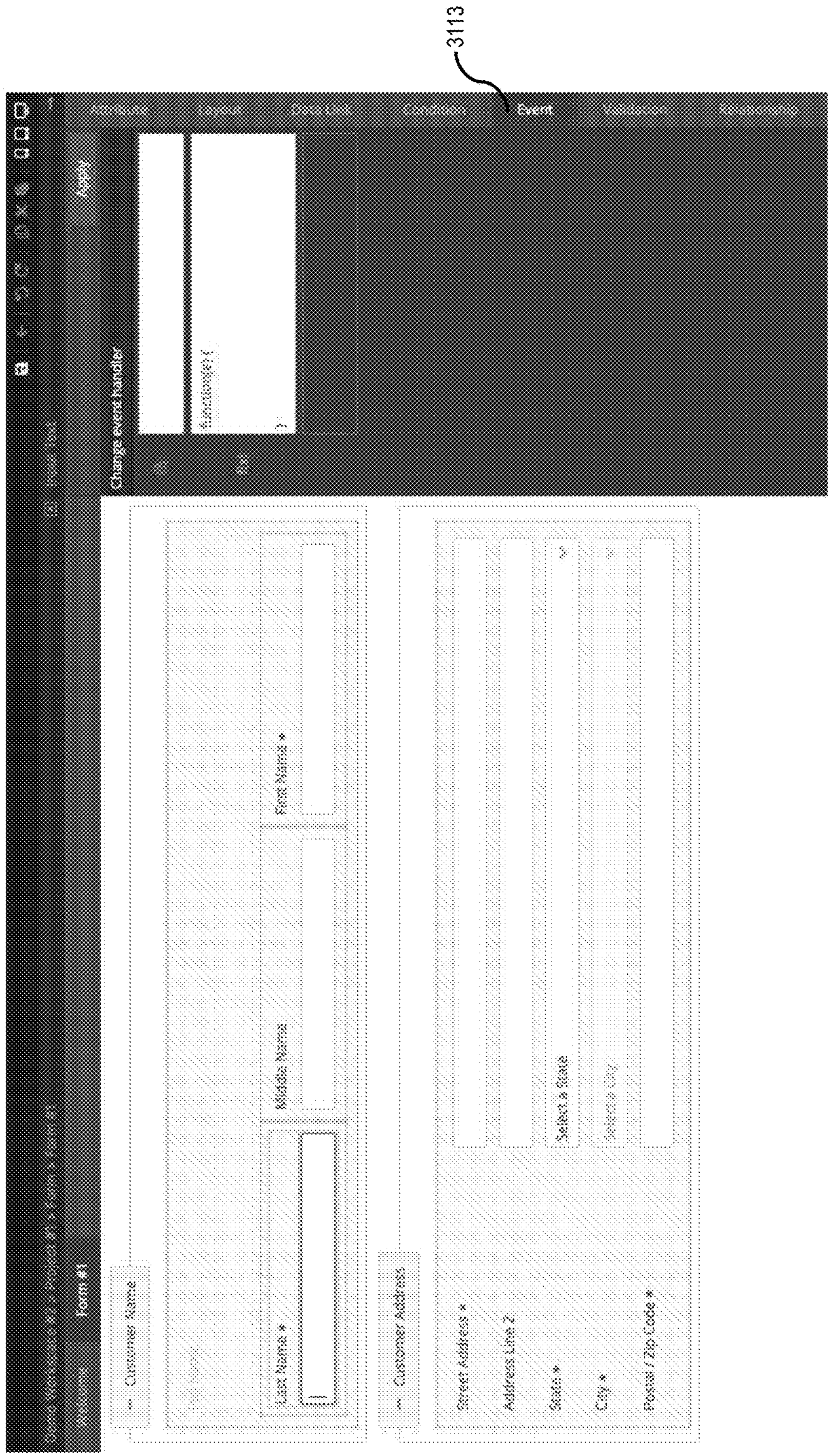
Figure 37:
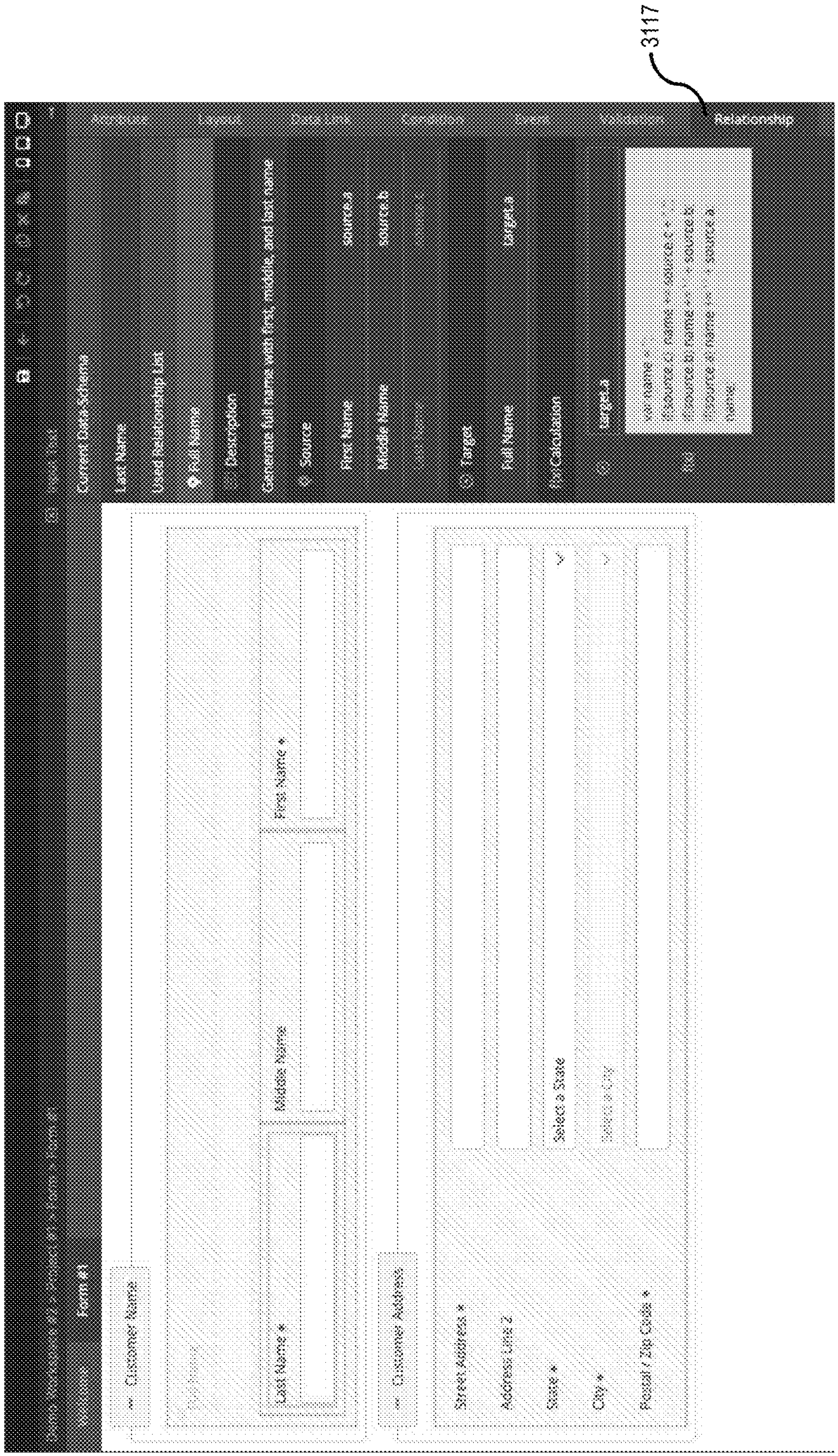
Figure 38:
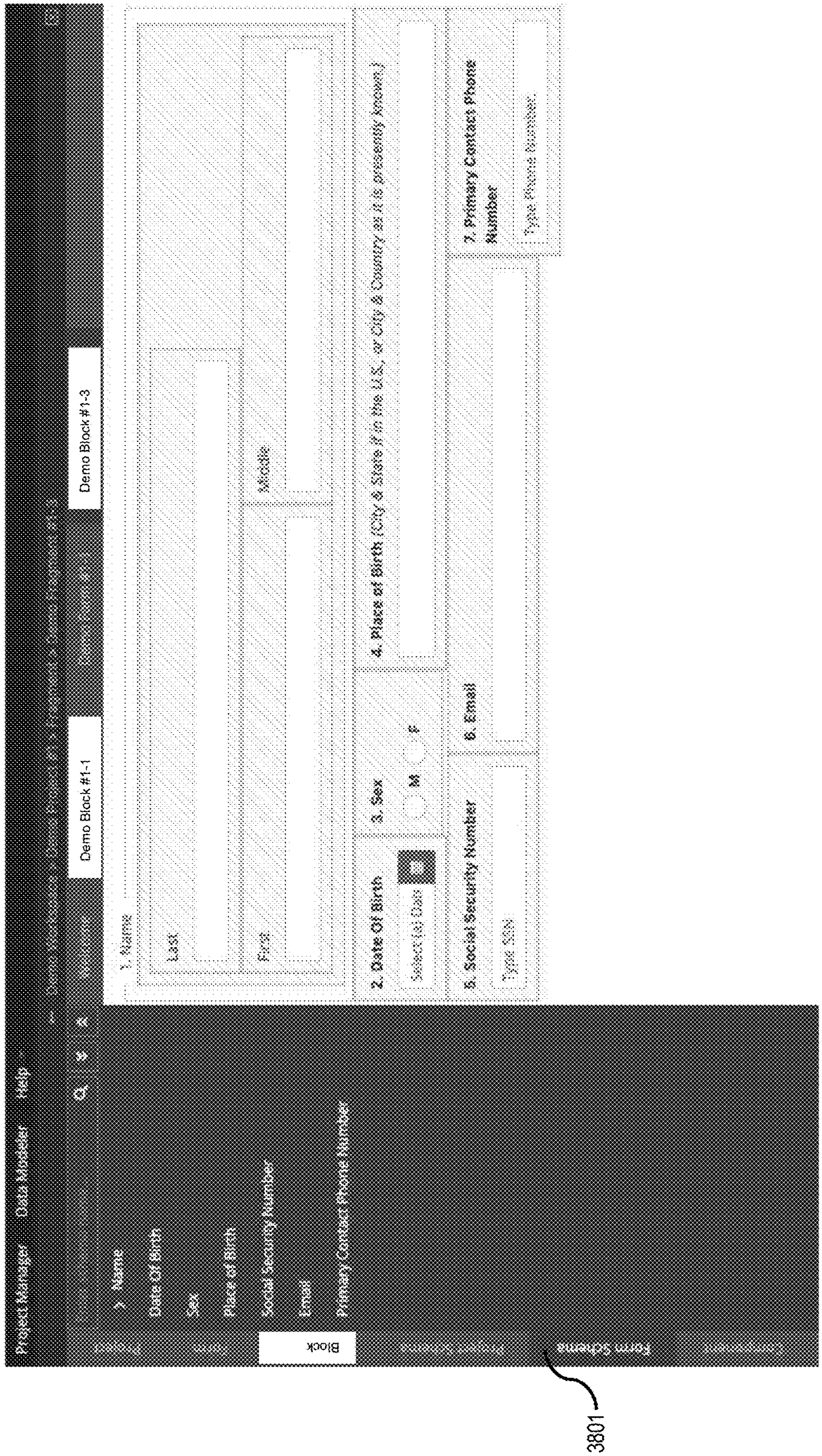

In association with step 2907, platform 300 may receive one or more parameters to customize the look-and-feel of those form components configured to the interactive design surface 3001_1. For instance, the exemplary user interface of FIG. 31 illustrates a dynamic pane 3101 that may be provided adjacent to a right side of the interactive design surface 3001_2 and may be utilized to provide one or more attributes associated with a form component selected at the interactive design surface 3001_2. For instance, selection of the "Last" form component 3103 configured to the interactive design surface 3001_2 of FIG. 31 may cause, at least in part, a dynamic pane 3101 at a right side of the interactive design surface 3001_2 to allow for input of parameters affecting component identification (e.g., alias identification, placeholder, tab index, maximum length, component class, etc.), component style, component attribute, tooltip (e.g., content, event, position, etc.), etc. Generally, however, FIGS. 31 and 32 show exemplary user interfaces including dynamic panes 3101 and 3201 that may be provided adjacent to a right side of the interactive design surface 3001_2 and that may be utilized customize a layout of a form component or block selected at the interactive design surface 3001_2. Selection of a tab at a right side of the dynamic pane 3101 may toggle the dynamic pane 3101 between different parameter input user interfaces. For instance, tabs may be provided for affecting attributes 3105, layouts 3107, data links 3109, conditions 3111, events 3113, links 3114, validation 3115, and relationships 3117 associated with the selected data entity or data group in the interactive design surface 3001_2. FIGS. 31 and 32 show exemplary attribute and layout parameter selections/inputs.

At step 2909, platform 300 may receive one or more parameters to configure, e.g., customize, other aspects of the form, block, form components, and/or data entities configured to an interactive design surface. Exemplary user interfaces including dynamic panes enabling users to customize parameters associated with data entities and data groups, conditions, events, and relationships are shown in FIGS. 34 to 37. Accordingly, form building module 314 may generate and store, per step 2911, form schema corresponding to the developed form or block. A visual representation of the form schema may be viewed and interacted with by users via the "Form Schema" tab 3801 of the user interface of FIG. 38. Other available form components may be added to a form or block via selectable entries made available via a form components list, such as shown in FIG. 39A. FIGS. 39B and 39C include depictions of exemplary card-style and grid-style form components utilized to present multiple instances of similar data types that may be configured in association with an interactive design surface.

Figure 40:
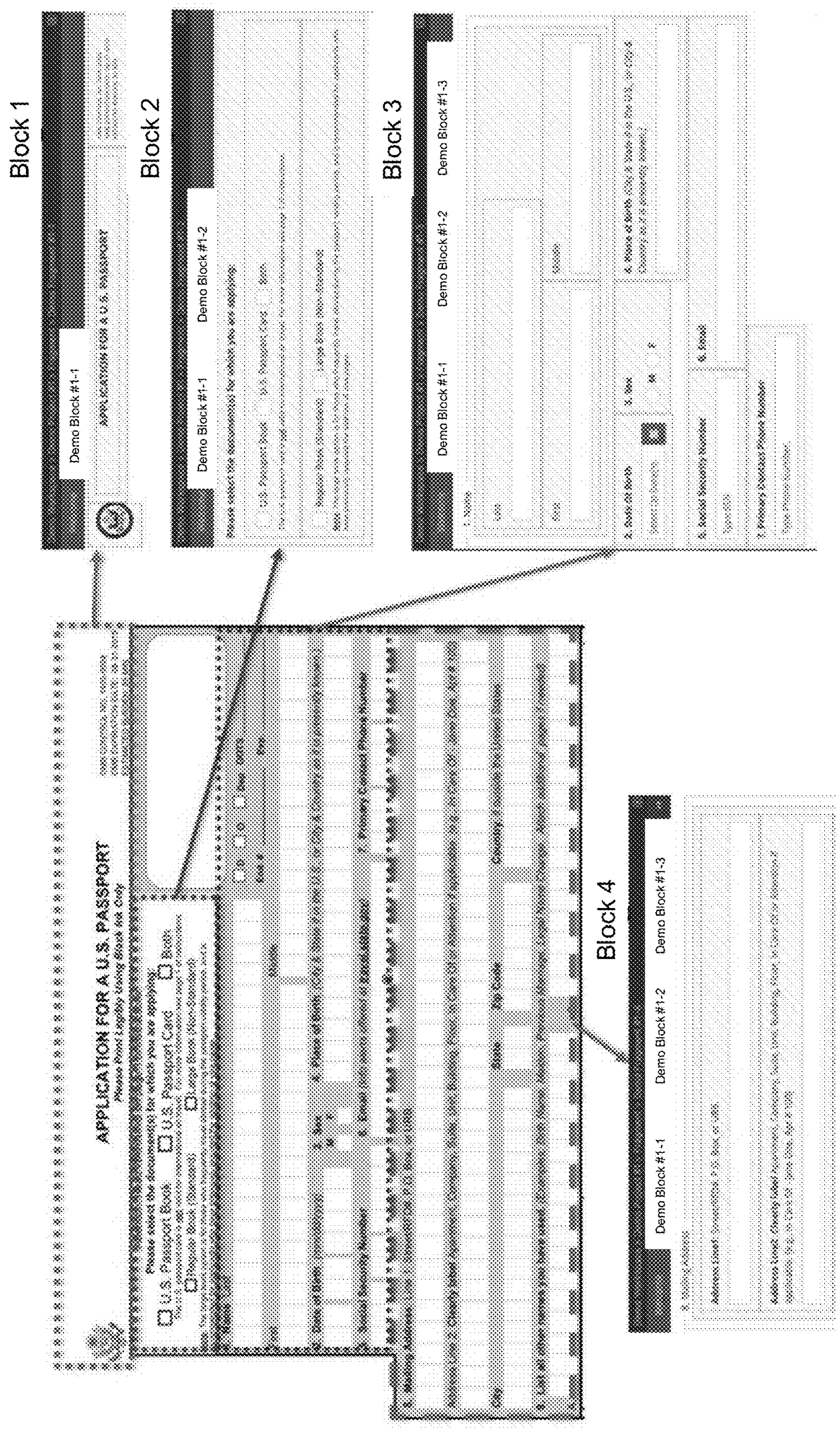
FIGS. 40, 41, and 42 are diagrams of form styles that may be generated and toggled between according to various exemplary embodiments.

As seen in FIG. 40, forms may be developed in a modularized fashion via one or more blocks, such as "Block 1," "Block 2" "Block 3," and "Block 4" of the illustrative "Application for a U.S. Passport" data-centric form of FIG. 40. In this manner, users may drag-and-drop form blocks and form components of form blocks to various locations of a form without affecting (e.g., breaking) the data schema and underlying computer code associated therewith, such as one or more established links between the data entities of the relocated block and database stores (e.g., concrete data storage locations) for receiving instances of pieces of collectable data input via corresponding form components bound to the data entities. That is, in some exemplary embodiments, instances of data collected via a form may be stored as "abstract data," which is not dependent upon the location or other look-and-feel configuration of a form component or block utilized to collect data instances. To this end, because the "abstract data" is separately bound (e.g., mapped) to "concrete data" storage locations, modifications to the form, components, blocks, etc., do not affect the links between the "abstract data" and the "concrete data" storage locations. As such, the services of system 200 enable forms to be easily updated and modified on the fly.

Figure 41:
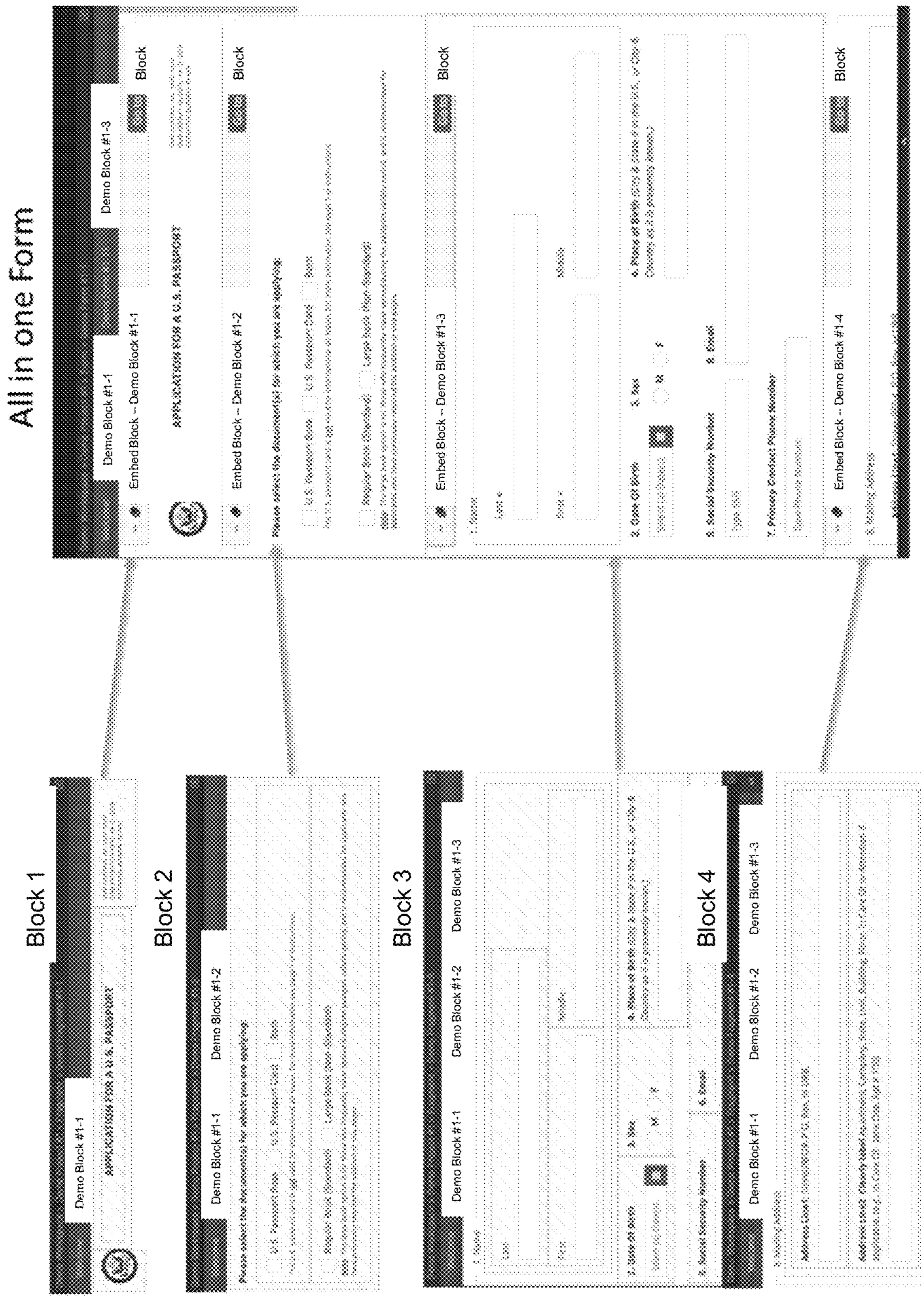
Figure 42:
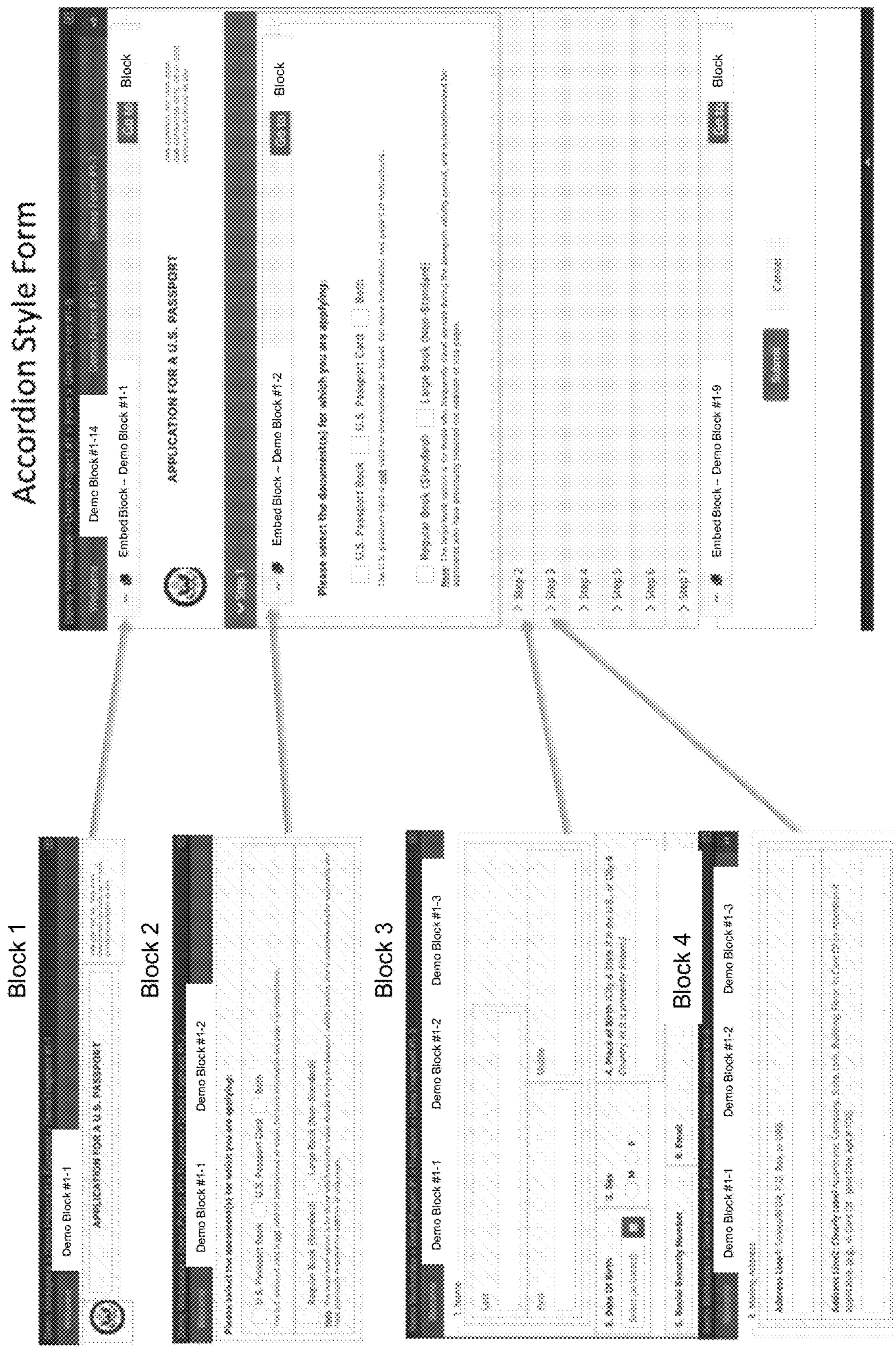

FIGS. 41 and 42 are diagrams of different form styles that may be generated and toggled between according to various exemplary embodiments. For instance, users may configure blocks of a form into an "all-in-one" form style via a selection of a corresponding GUI object, such as illustrated in FIG. 41. Without any significant effort, users may toggle the configuration of the blocks of the form into an "accordion" style form (or any other suitable form style) simply by selecting an associated GUI object. Again, the look-and-feel of the form may be quickly modified and dynamically changed without affecting the data schema and underlying computer code associated therewith. Thus, the services of system 200 enable forms to be even more easily updated and modified on the fly.

Figure 43A:
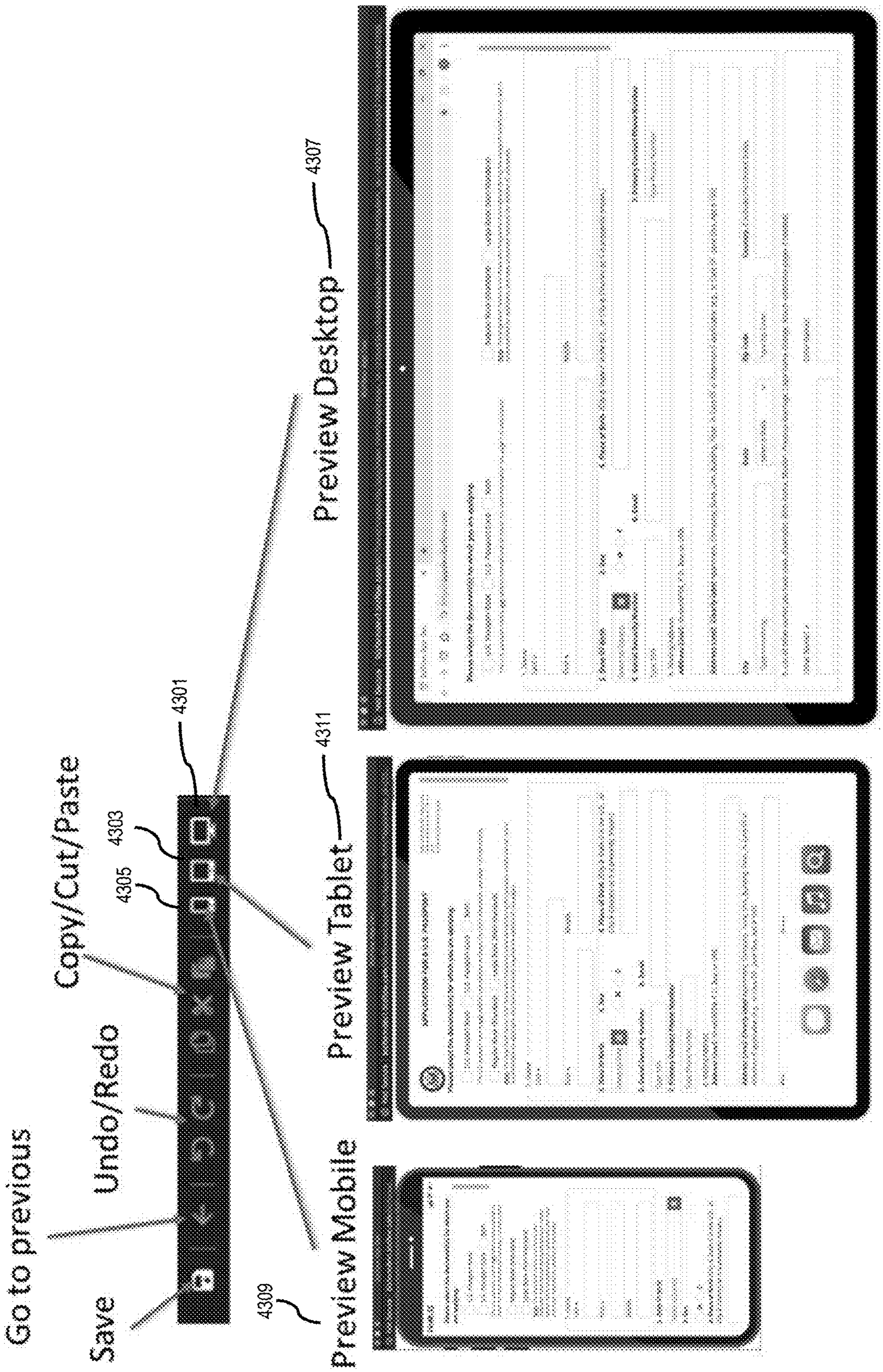
FIGS. 43A and 43B are diagrams of user interfaces for previewing the look-and-feel and operational flow of a form in various development scenarios according to some exemplary embodiments.
Figure 43B:
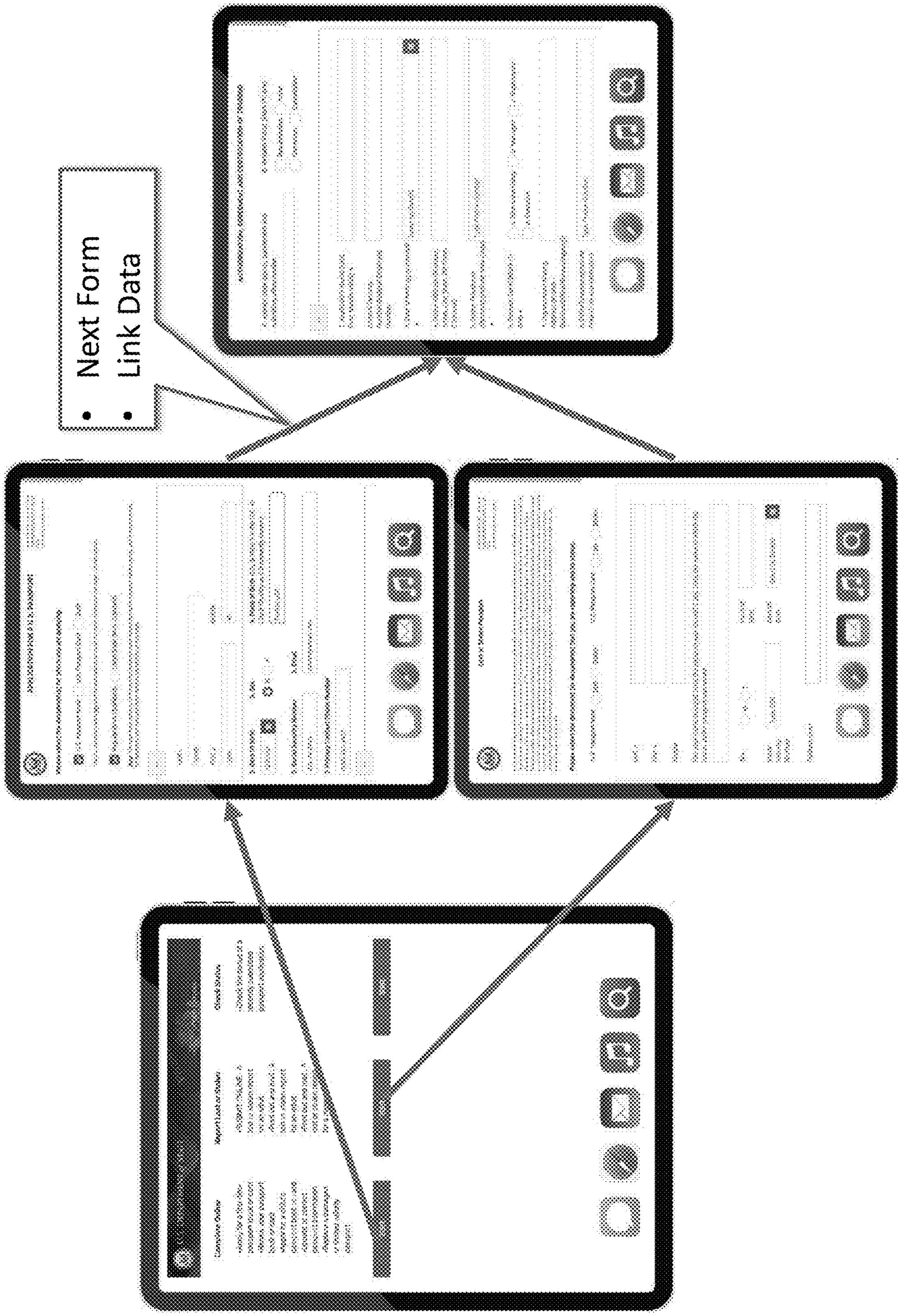

In some instances, a user may desire to simulate execution of an application in a particular environment, e.g., simulate execution of an application in a browser of an accessing device, such as a desktop computer, mobile handset, tablet, etc. An exemplary user interface is shown in FIG. 43A, in which selectable GUI objects 4301 to 4305 respectively corresponding to, for example, a desktop computer environment 4307, a mobile handset environment 4309, and a tablet environment 4311 are provided for interaction. As such, user interface module 326 may enable users to quickly select, view, and simulate form operation according to various selectable environments and user behaviors. As seen in FIG. 43B, user interface module 326 may simulate execution of an application (e.g., form 105) in a browser of a tablet environment and may enable users to see the operational flow of various stages of an application, such as various states of a form as progress is made through the form and information is input by a user. As such, users of platform 300 may not only optimize the operational efficiency of an application in different deployment scenarios, but also the look-and-feel of an application according to different use environments and constraints.

Referring once again to FIG. 5, users may publish their data-centric form in association with step 509, and monitor and receive reports regarding performance of a published data-centric form at step 511, which may be optional. An exemplary process and associated user interface for publishing a data model to a project or a form to a network node will be described in more detail in association with FIGS. 44 and 45, whereas an exemplary process and associated user interface for state rollbacks will be described in more detail in association with FIGS. 46, 47A, and 47B. Although the user interfaces of FIGS. 45, 47A, and 47B are associated with data model publishing and data model state rollbacks, the processes and user interfaces of FIGS. 45, 47A, and 47B are also applicable to form publishing and form state rollbacks.

Figure 44:
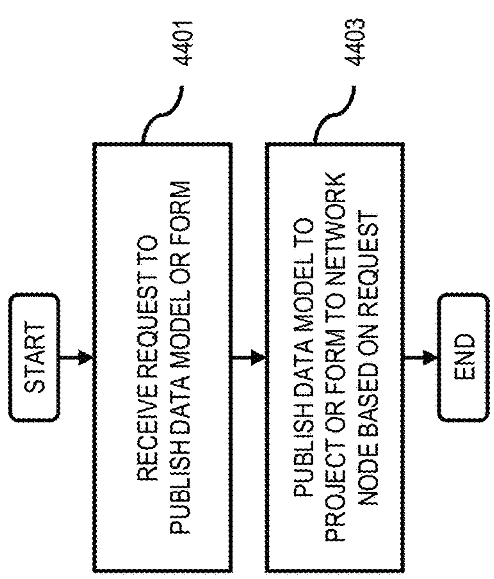
FIG. 44 is a flowchart of a process for publishing a data model to a project or a form to a network node according to various exemplary embodiments.
Figure 45:
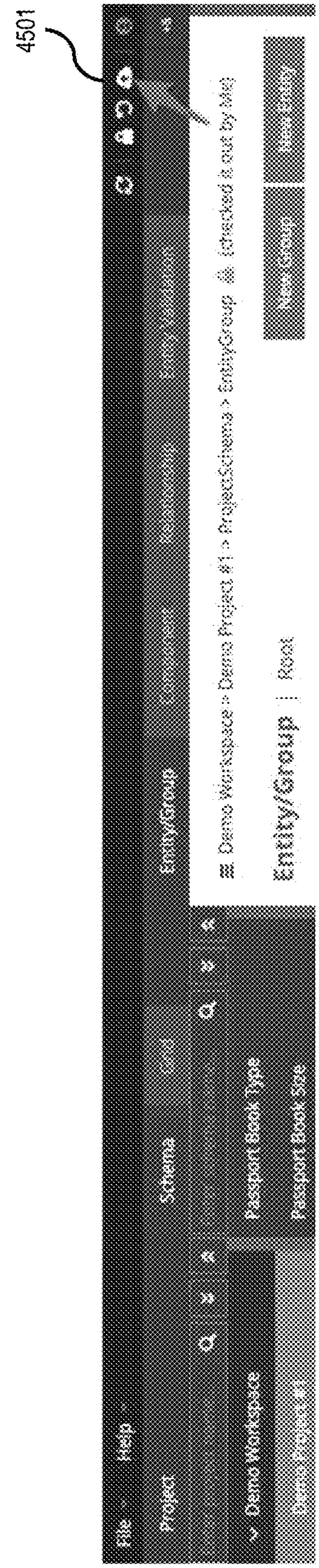
FIG. 45 is a user interface for publishing a data model to a project according to some exemplary embodiments.

FIG. 44 is a flowchart of a process for publishing a data model to a project or a form to a network node according to various exemplary embodiments. FIG. 45 is a user interface to facilitate publishing of a data model to a project according to some exemplary embodiments. For illustrative purposes, the process of FIG. 44 is described with reference to FIGS. 1-3. It is noted that the steps of the process may be performed in any suitable order, as well as combined or separated in any suitable manner.

In step 4401, platform 300 may receive a request to publish a data model after at least one data entity has been defined or publish a form to a network node, such as form server 205_1. In association with publishing a data model, FIG. 44 illustrates an exemplary user interface button (e.g., cloud button 4501) utilized to request platform 300 to publish the data model to, for example, a current project. For instance, a user may simply click the cloud button 4501 of the user interface of FIG. 45 to publish the data model to a current project. In a similar fashion, a corresponding button may be provided to publish a form to a network node. As such, platform 300 via, for instance, publishing module 316 publishes the data model to the current project based on the request, per step 4403. For instance, publishing module 316 may cause, at least in part, a GUI to be modified (e.g., augmented) with one or more selectable components (or objects) to enable at least one data entity of the data model to be added to a block of a data-centric form. In association with publishing a form, publishing module 316 may package one or more application modules and files to enable install and operation of a data-centric form of a current project on or in association with a network node, e.g., form server 205_1. The application modules and files may be transmitted to a particular location based on information stored to, for example, profile database 217 or any other suitable storage location or memory of (or accessible to) platform 300. In a similar fashion, the data model may be made available to one or more projects based on information stored to profile database 217 and/or rules of a business rules database.

Figure 46:
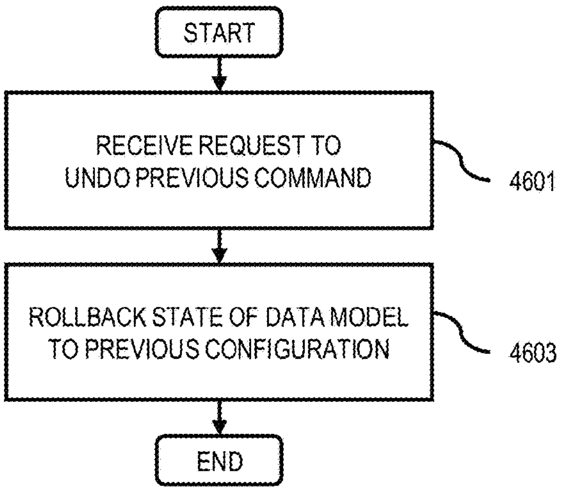
FIG. 46 is a flowchart of a process for rolling back a configuration of a data model or form to a previous state according to various exemplary embodiments.
Figure 47A:
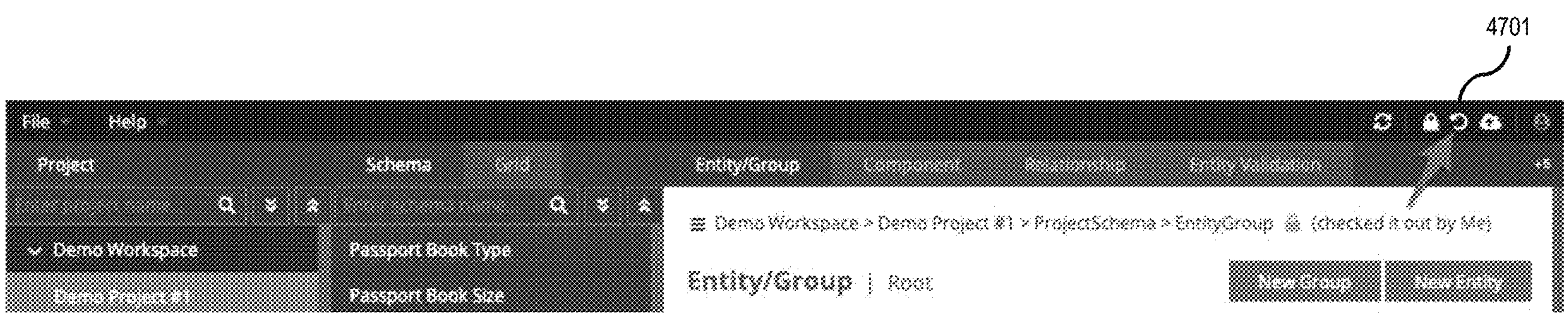
FIGS. 47A and 47B are user interfaces to facilitate a configuration rollback of a data model to a previous state according to some exemplary embodiments.
Figure 47B:
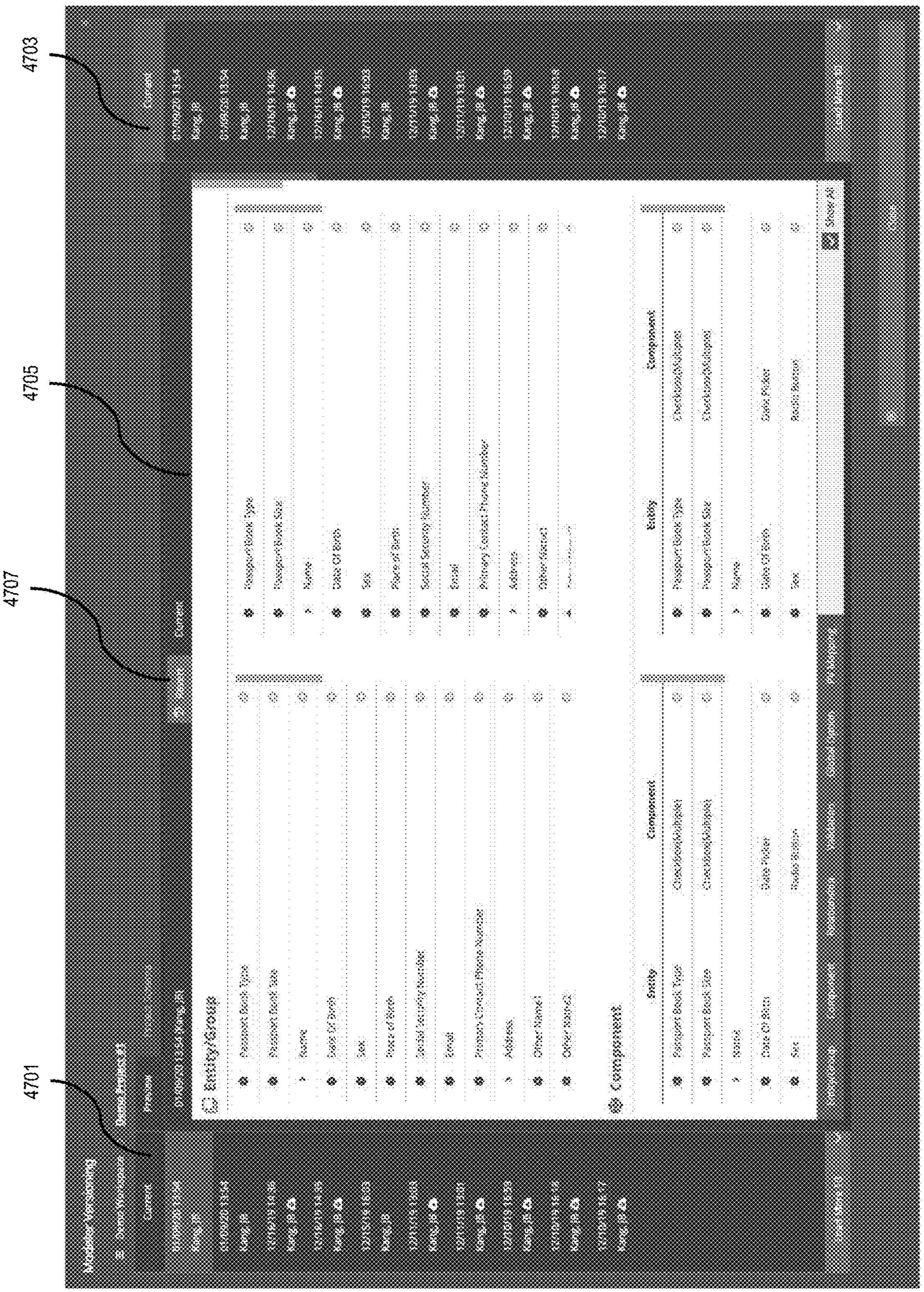

FIG. 46 is a flowchart of a process for rolling back a configuration of a data model or form to a previous state according to various exemplary embodiments. FIGS. 47A and 47B are user interfaces to facilitate a configuration rollback of a data model to a previous state according to some exemplary embodiments. For illustrative purposes, the process of FIG. 46 is described with reference to FIGS. 1-3. It is noted that the steps of the process may be performed in any suitable order, as well as combined or separated in any suitable manner.

In step 4601, platform 300 may receive a request to rollback (or undo) of a configuration state of a data model or a data-centric form, such as form 105. FIG. 47A illustrates an exemplary user interface button (e.g., counterclockwise rotating arrow button 4701) utilized to request platform 300 to rollback a configuration state of a data model. For instance, a user may simply click the counterclockwise rotating arrow button 4701 of the user interface of FIG. 47A to rollback a configuration state of the data model to a previous version. In some instances, multiple versions may be available and one of the versions may be selected for rollback, such as illustrated in association with FIG. 47B. For example, the user interface of FIG. 47B provides a dynamic panes 4701 and 4703 of versions of a data model, as well as a preview pane 4705 to view changes that would be made if a rollback from a "current" version of a data model to a "previous" version of a data model were effectuated. In some exemplary embodiments, if multiple versions of a data model exist, selection of counterclockwise rotating arrow button 4701 in the user interface of FIG. 47A may cause the user interface of FIG. 47B to be presented and enable users to select and preview a desired "previous" version of a data model for rollback form a "current" version of the data model. In this manner, a rollback may be effectuated via selection of a "REVERT" button 4707. As such, any computer code modifications made by platform 300 in association with an undesired input of a user to a data model or form may be rolled back to a previous state, per step 4603.

Figure 48:
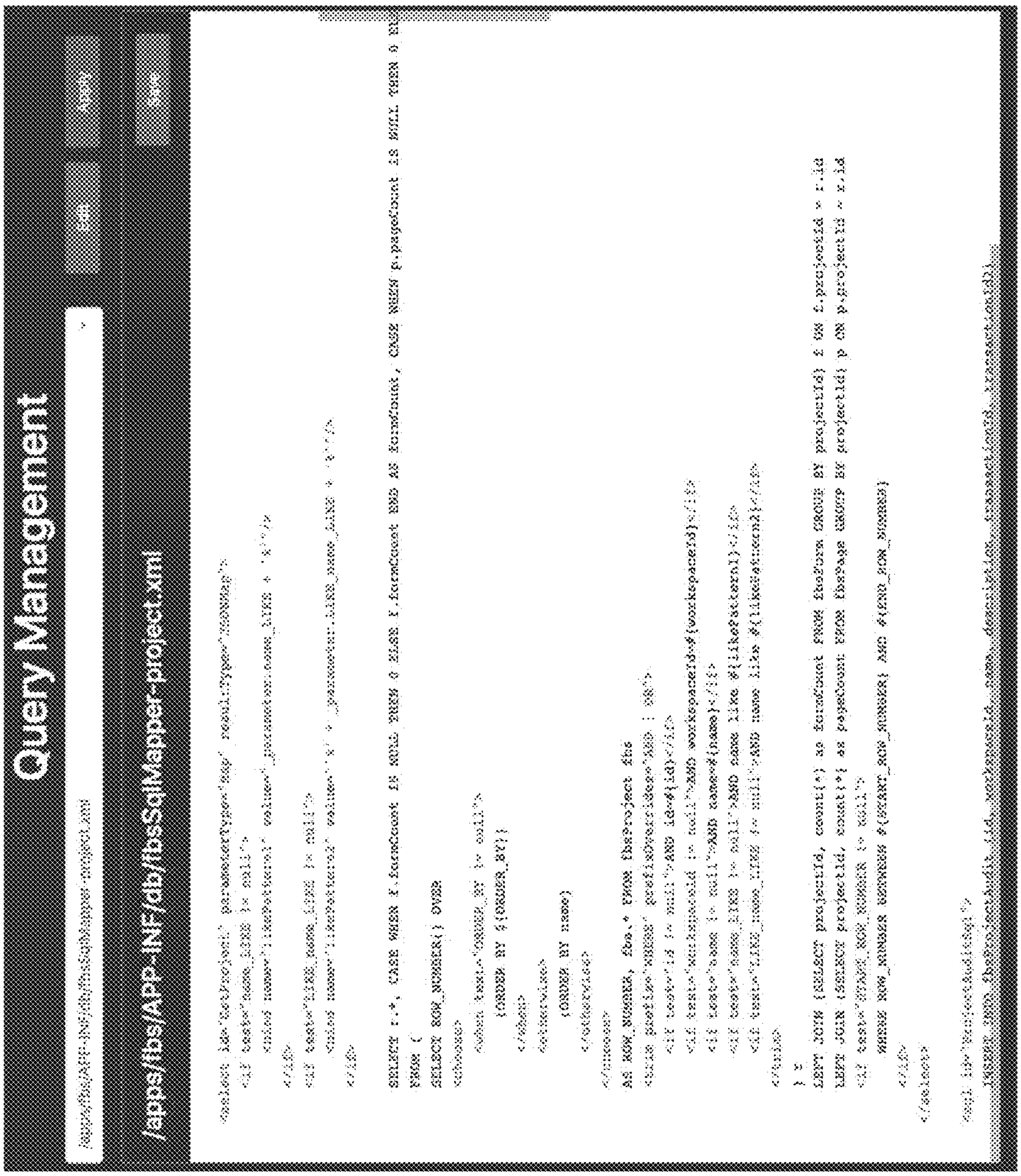
FIG. 48 is a diagram of a user interface for query management according to some exemplary embodiments.
Figure 49:
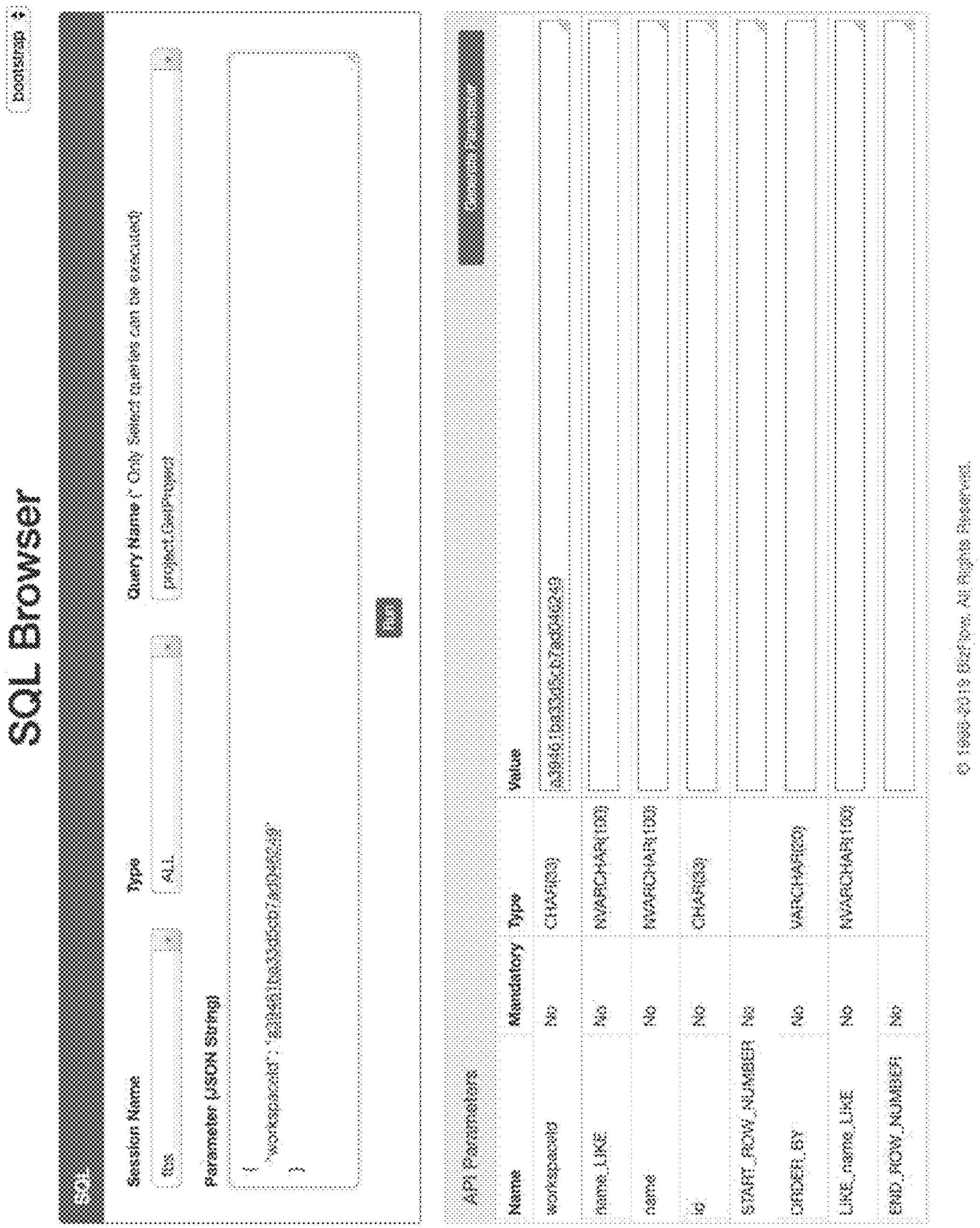
FIGS. 49 and 50 are diagrams of user interfaces for database browsing according to various exemplary embodiments.
Figure 50:
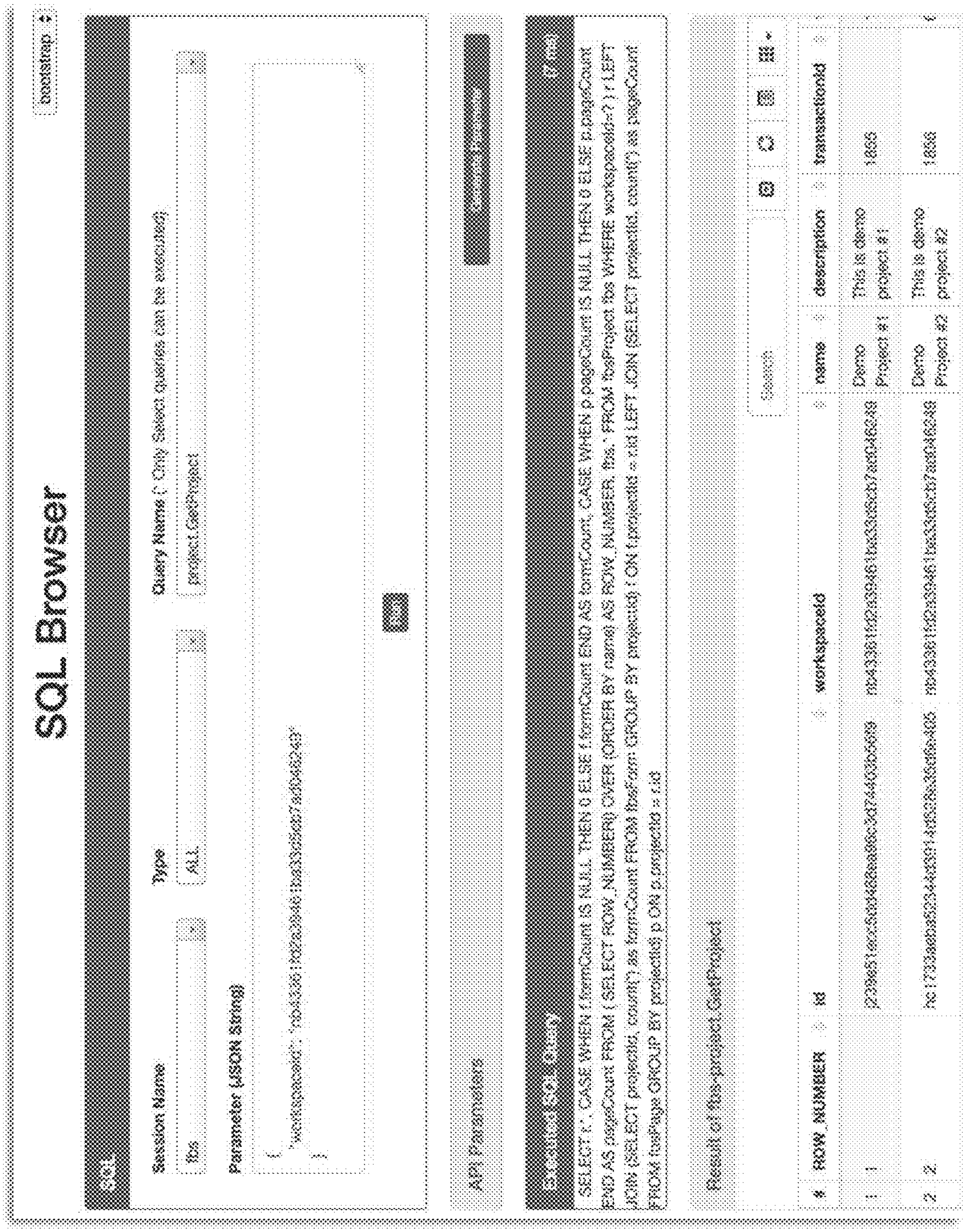
Figure 51:
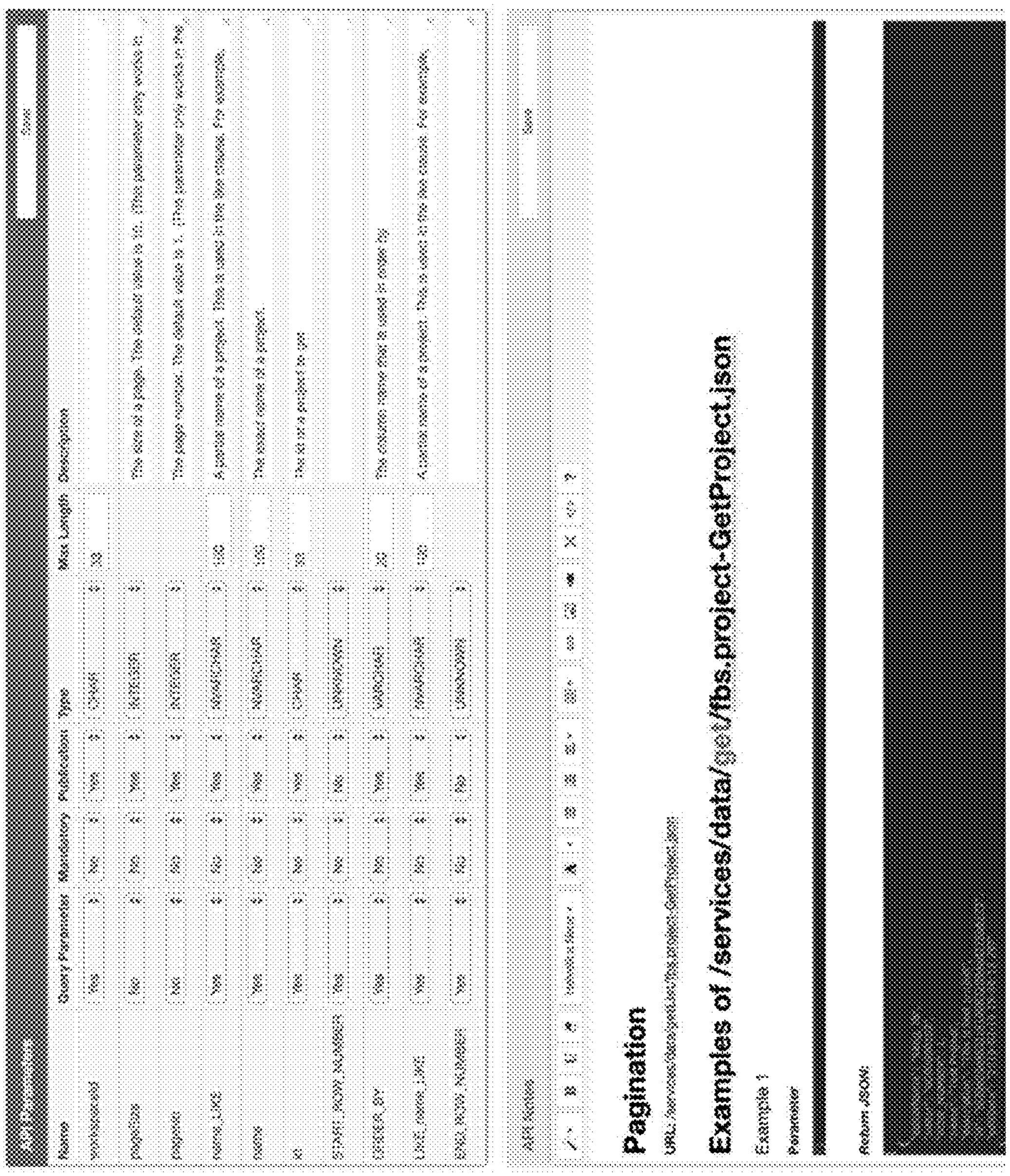
FIGS. 51, 52, 53, and 54 are diagrams of user interfaces for accessing and reviewing application program interface documentation according to various exemplary embodiments.
Figure 52:
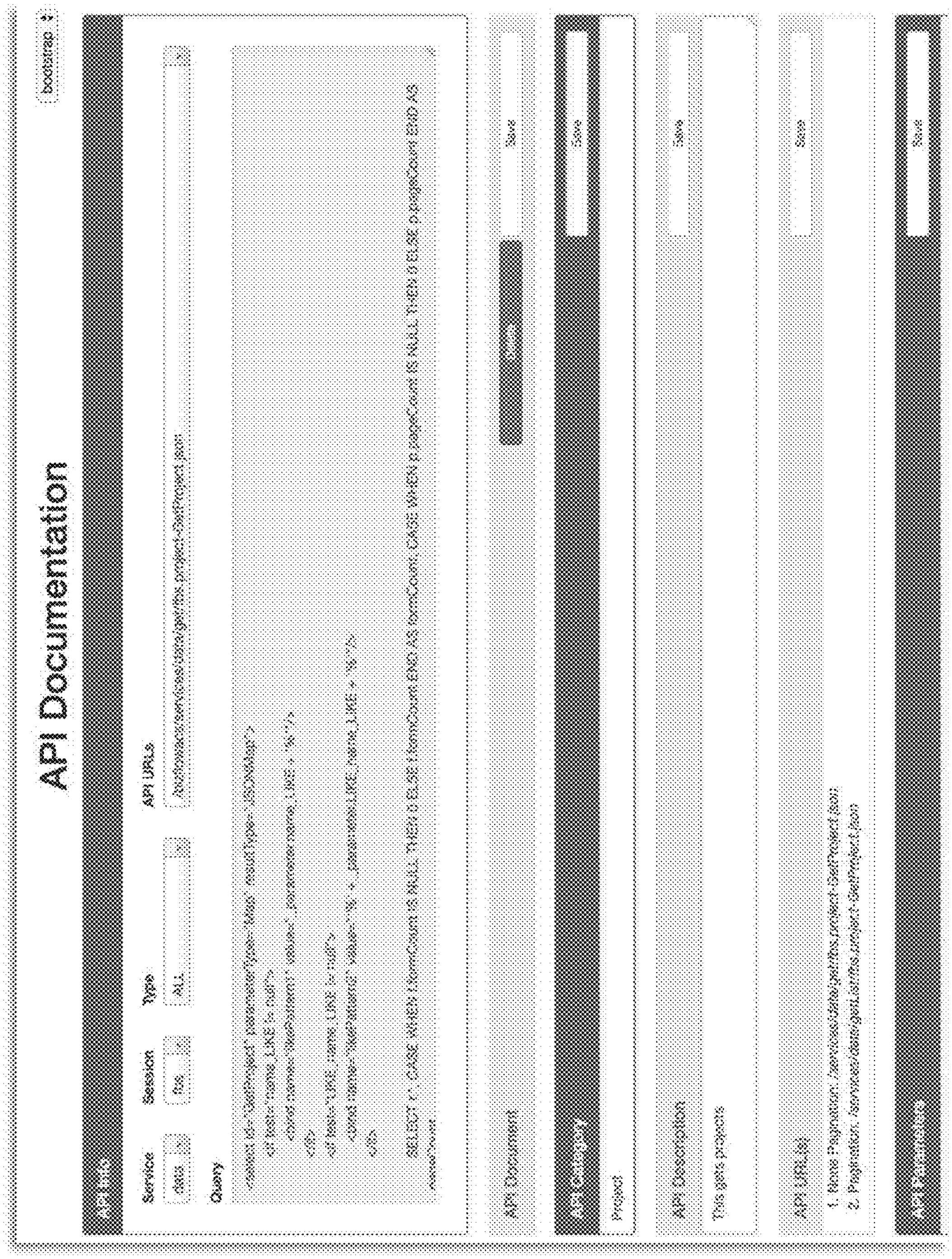
Figure 53:
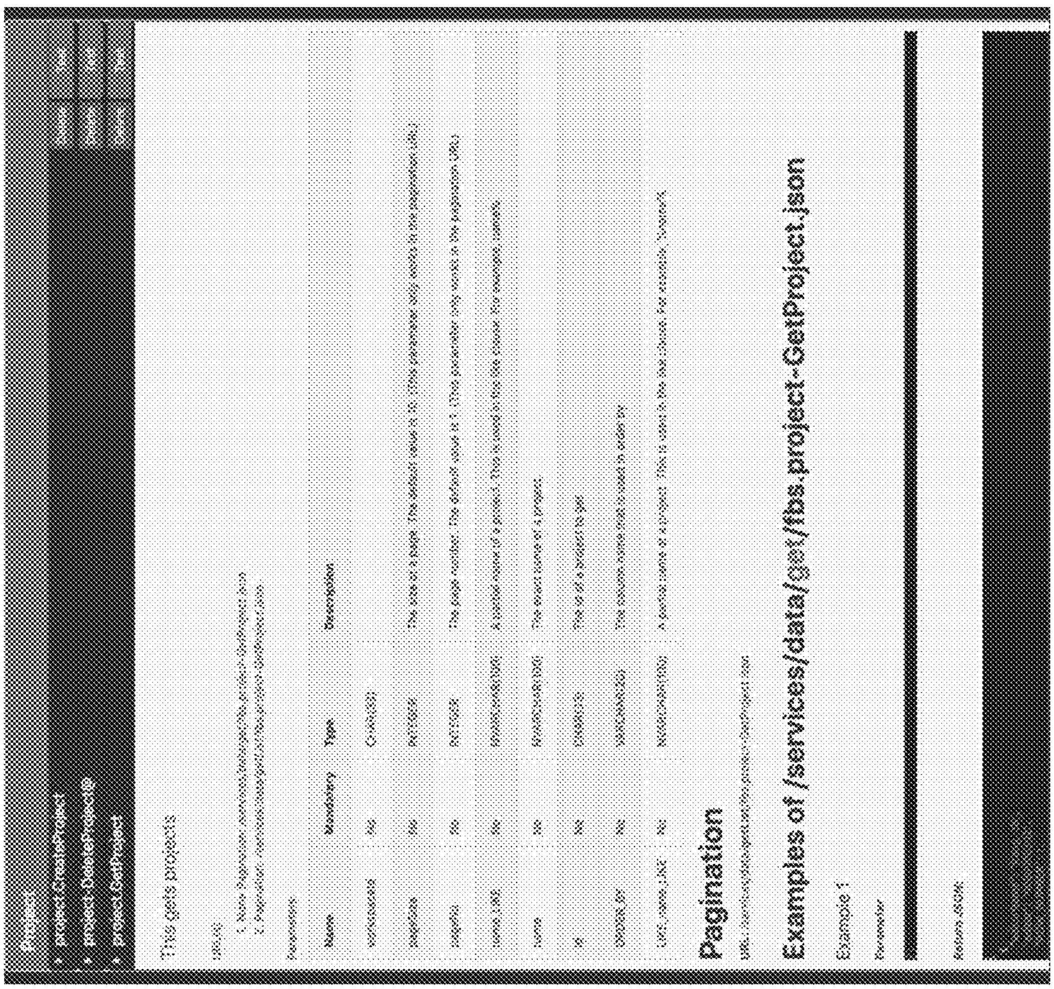
Figure 54:
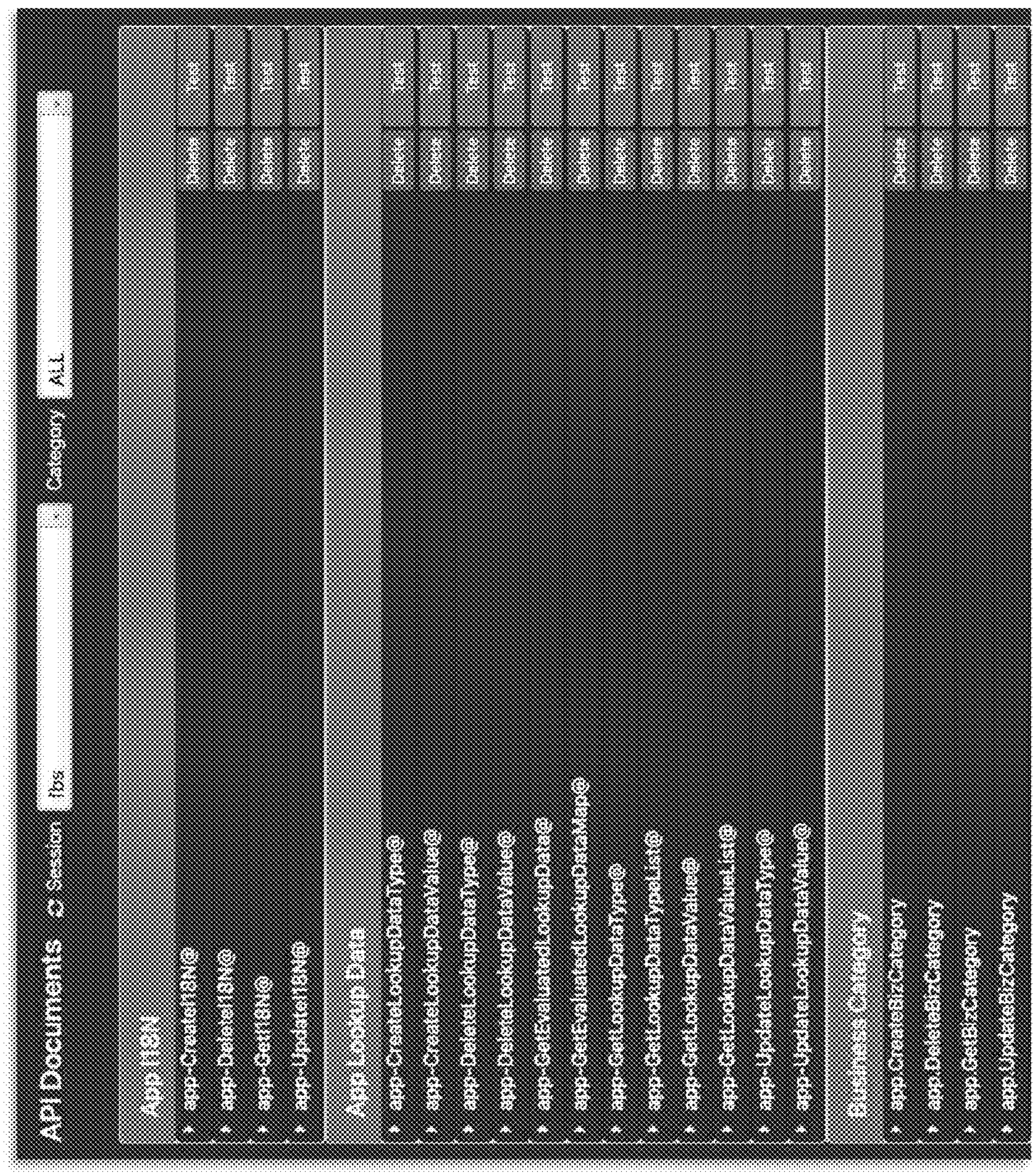
Figure 55:
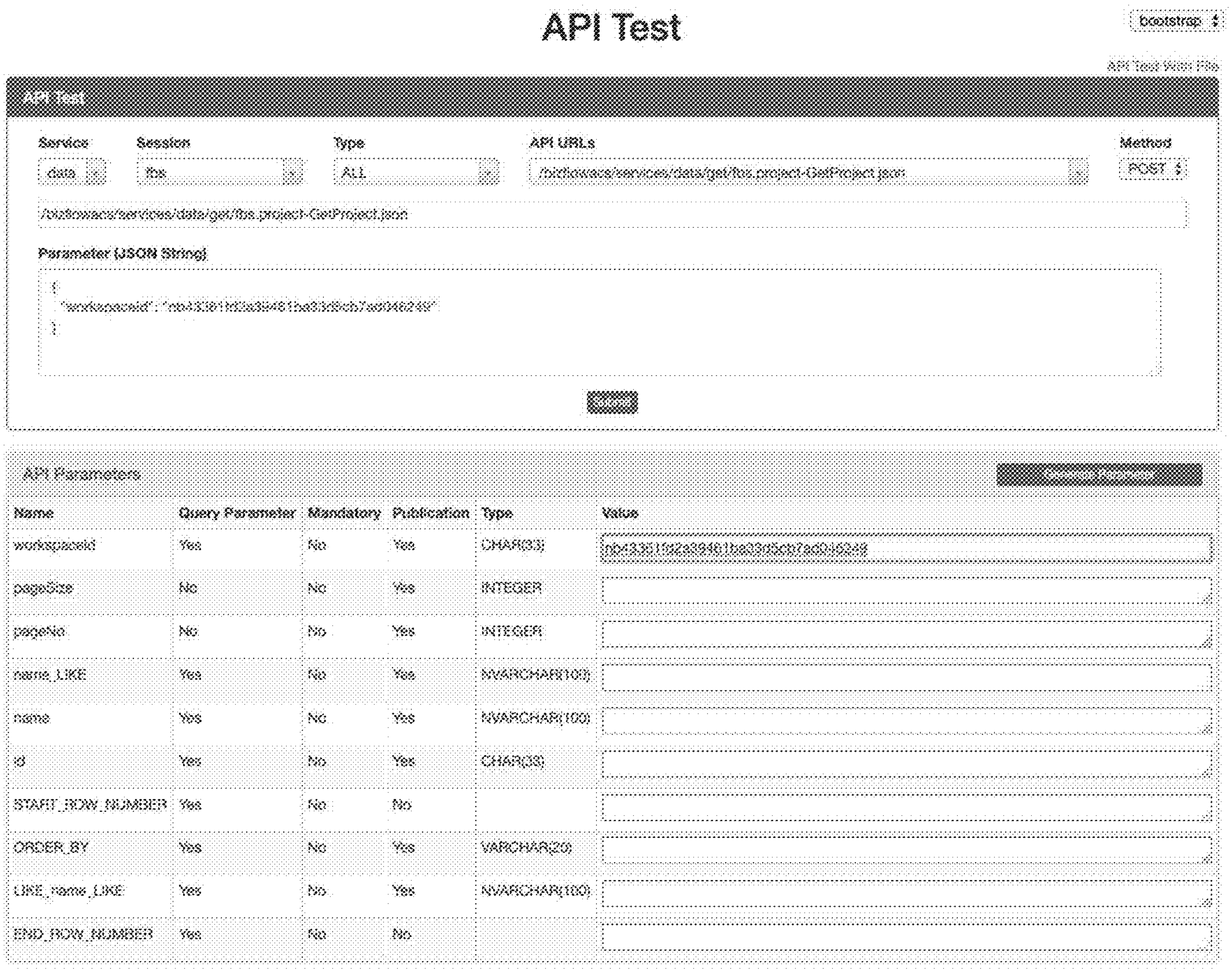
FIGS. 55 and 56 are diagrams of user interfaces for application program interface testing according to various exemplary embodiments.
Figure 56:
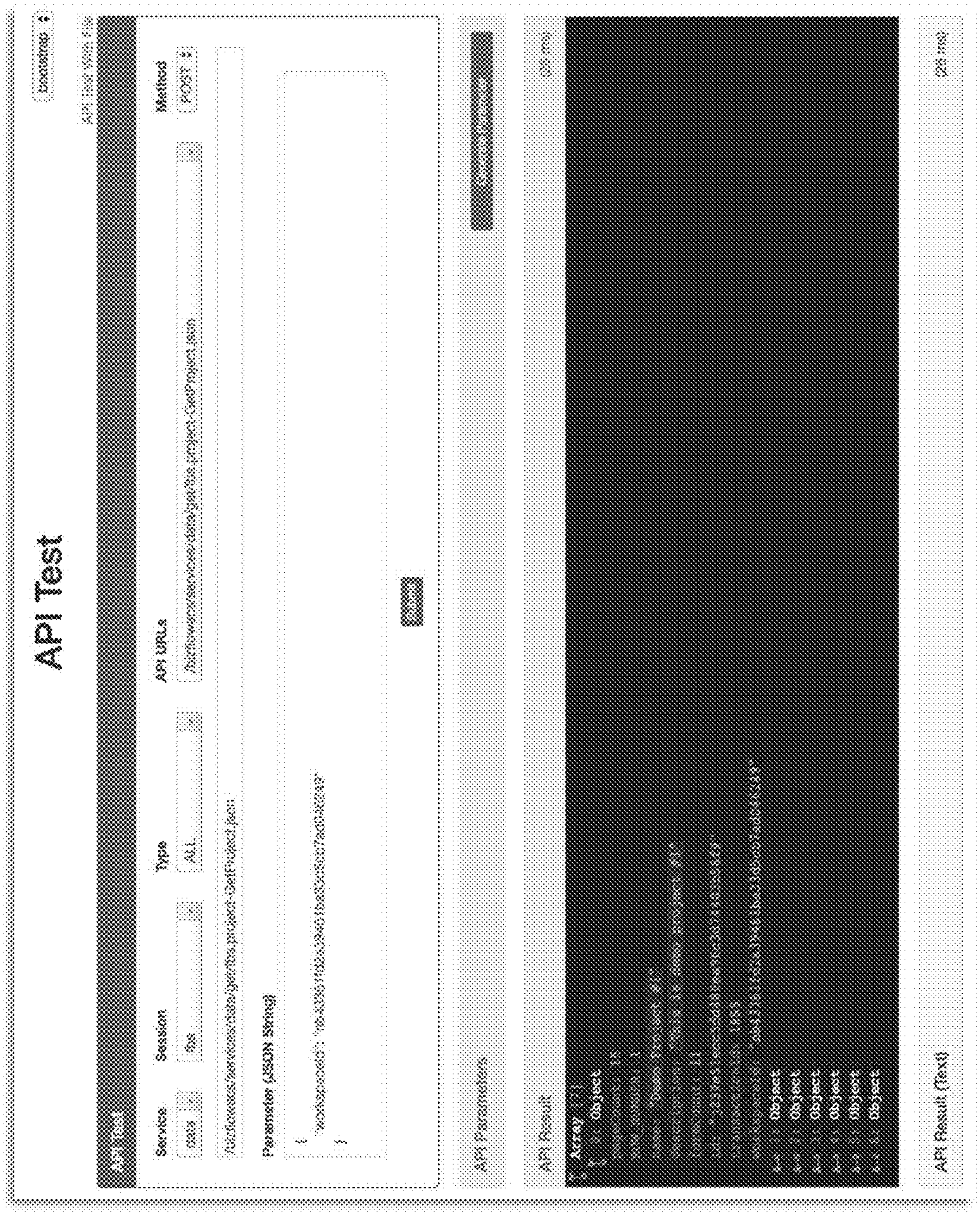
Figure 57:
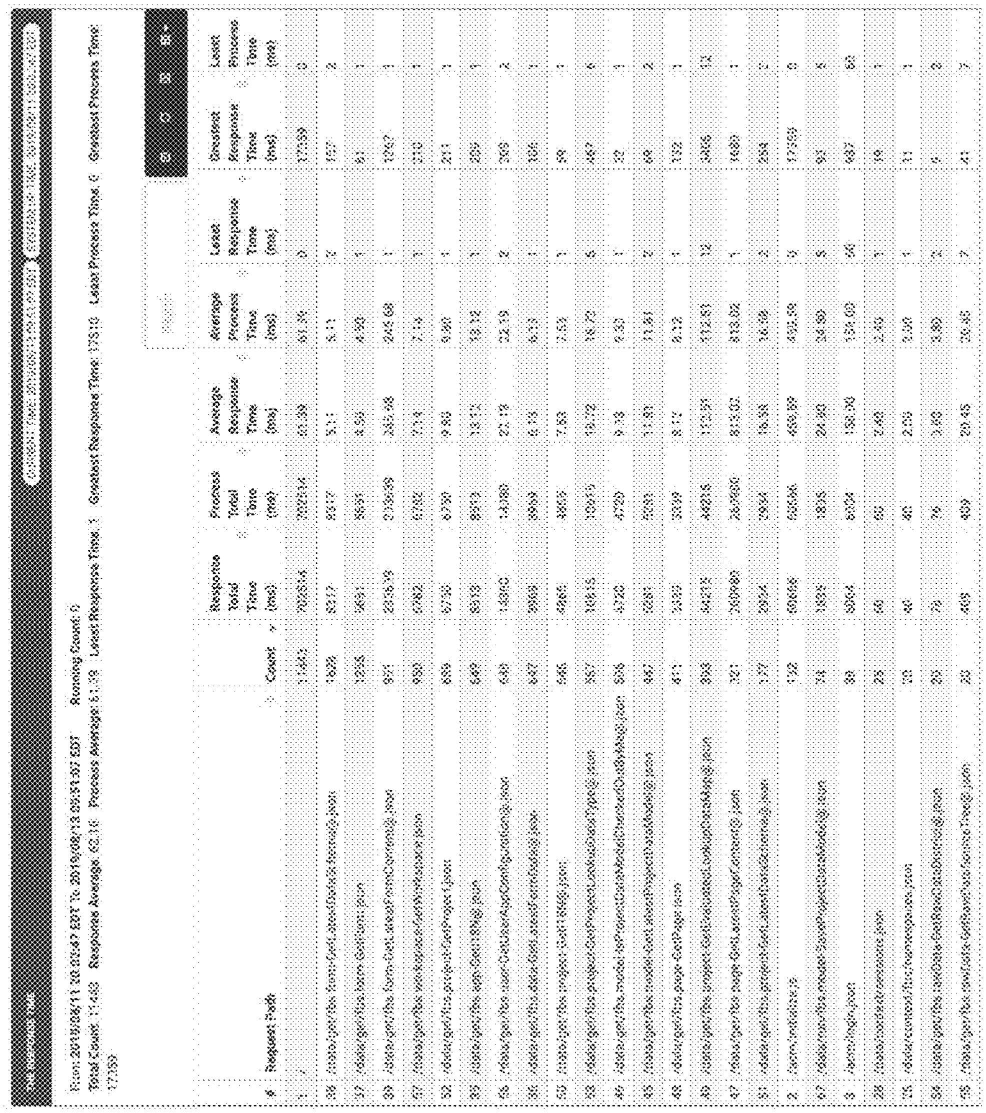
FIGS. 57, 58, 59, 60, 61, and 62 are diagrams of user interfaces for testing performance of various aspects of data-centric networked application development services according to various exemplary embodiments.
Figure 58:
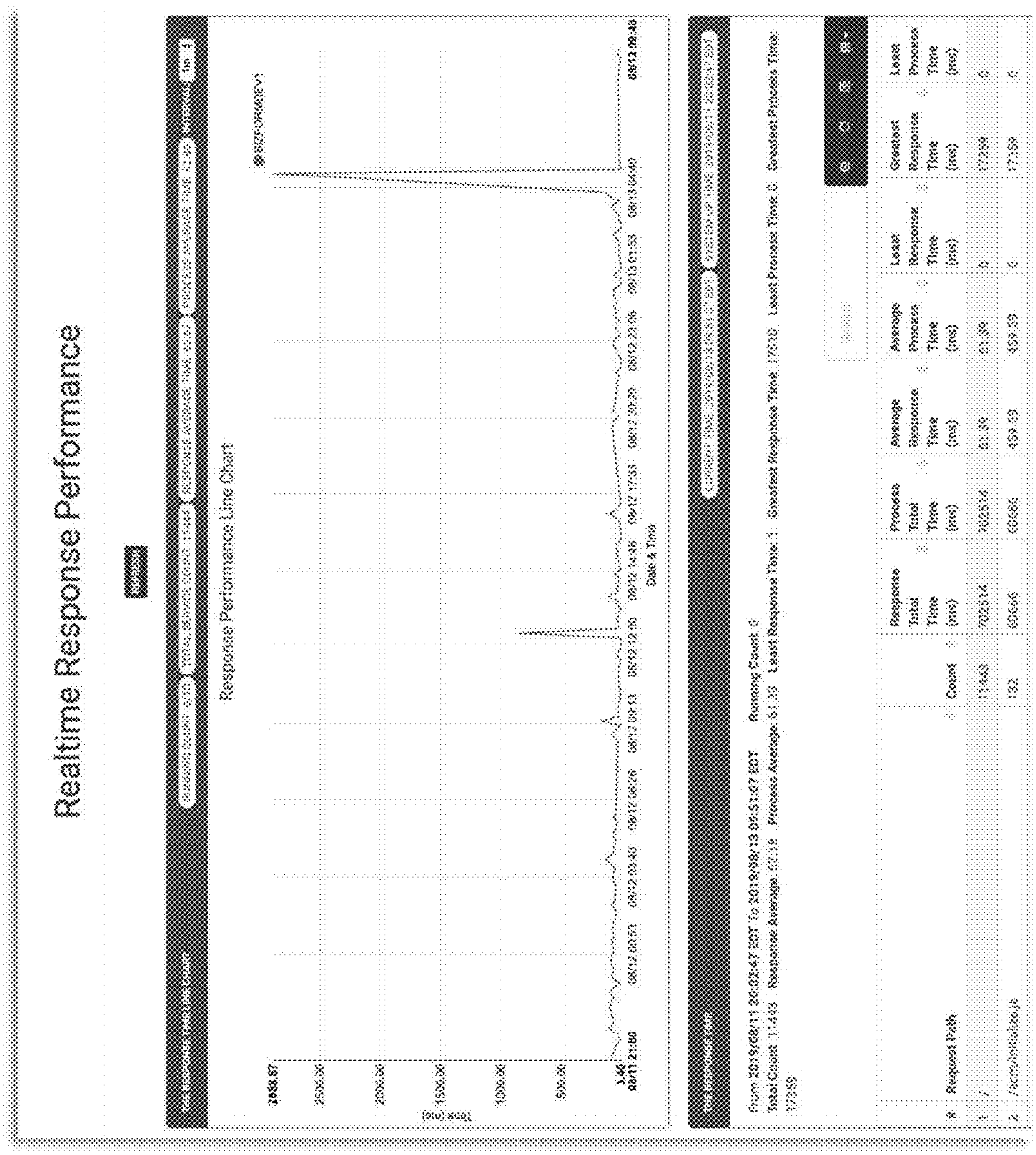
Figure 59:
Figure 60:
Figure 61:
Figure 62:
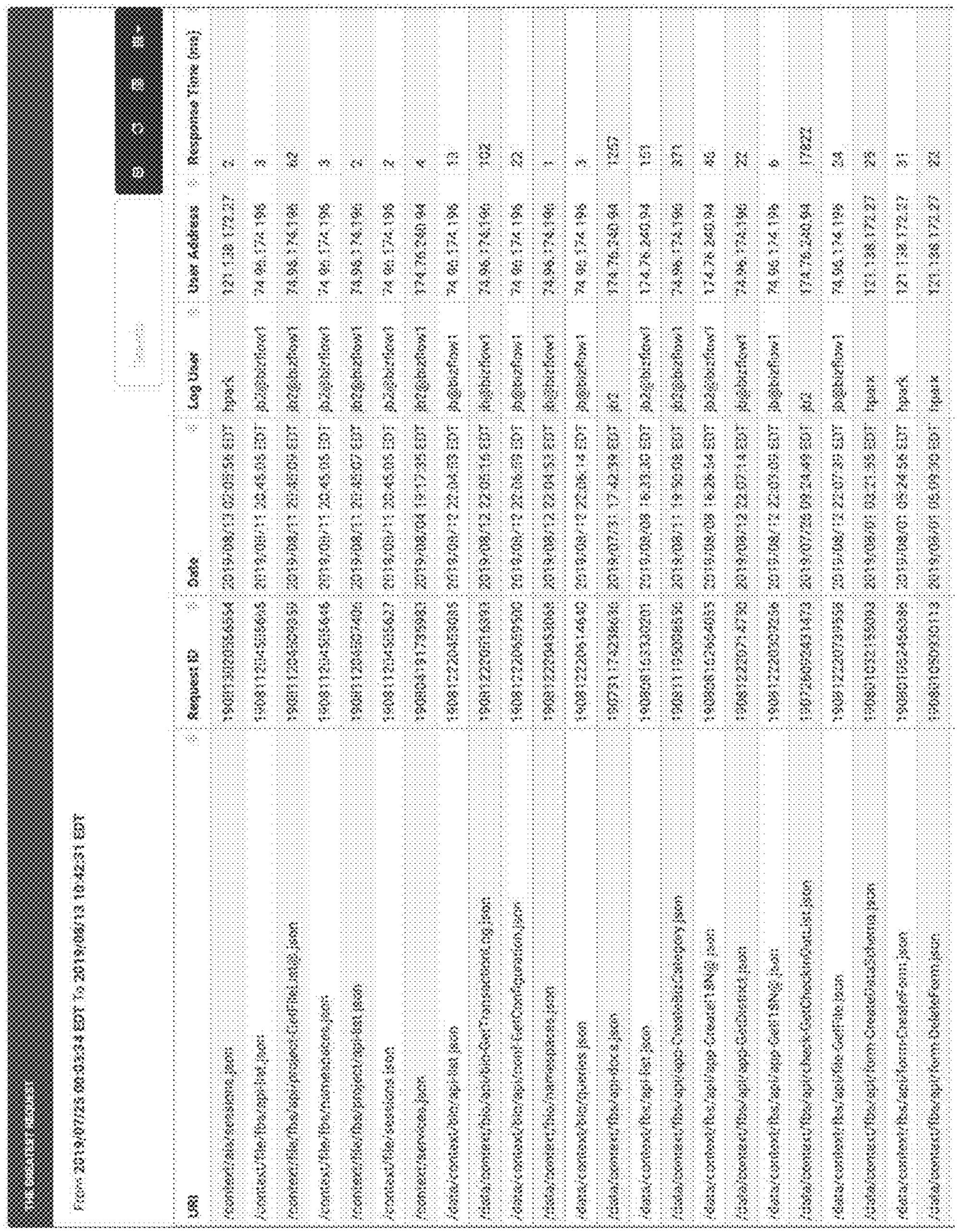
Figure 63:
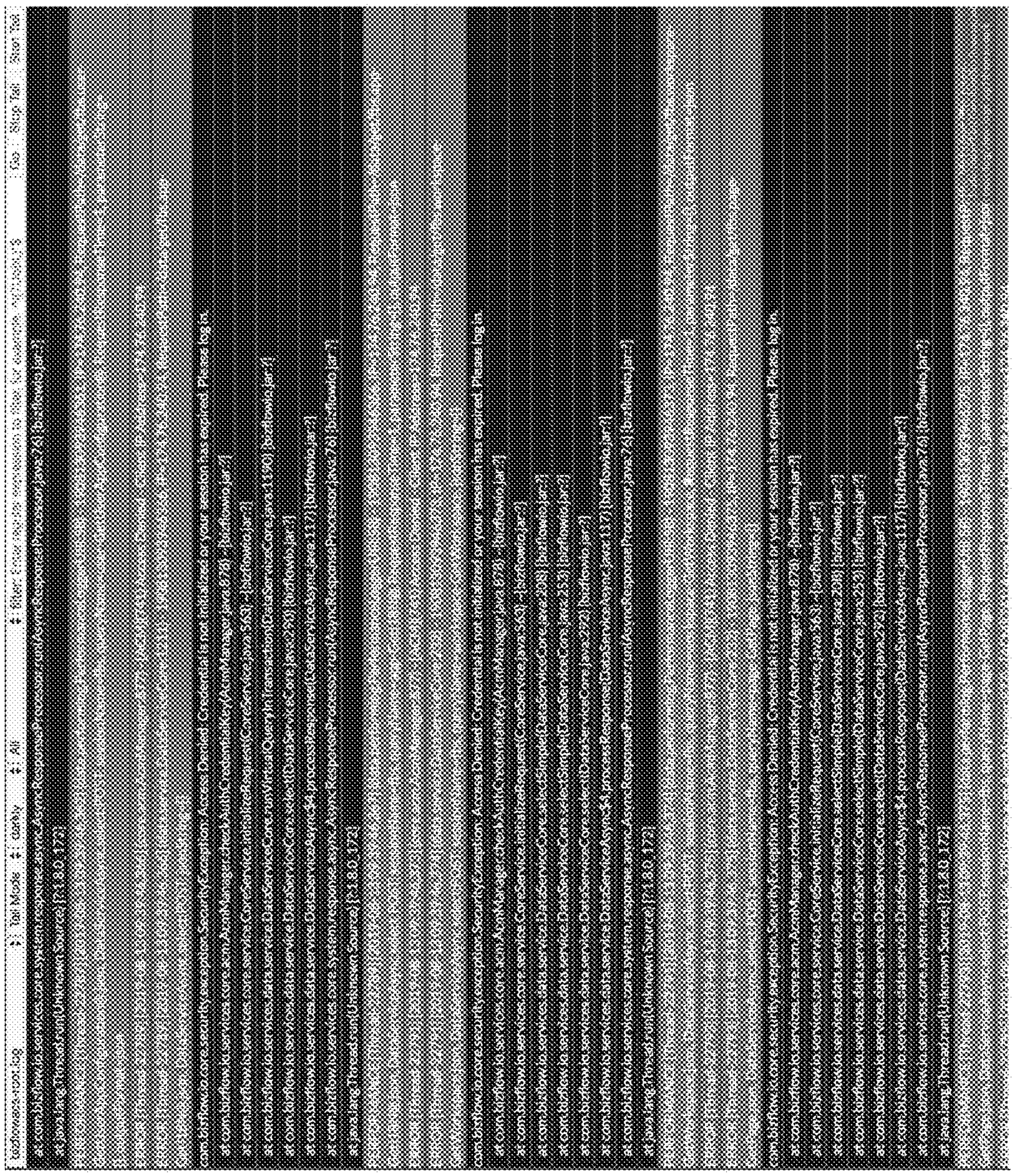
FIGS. 63 and 64 are diagrams of user interfaces for viewing log information according to various exemplary embodiments.
Figure 64:
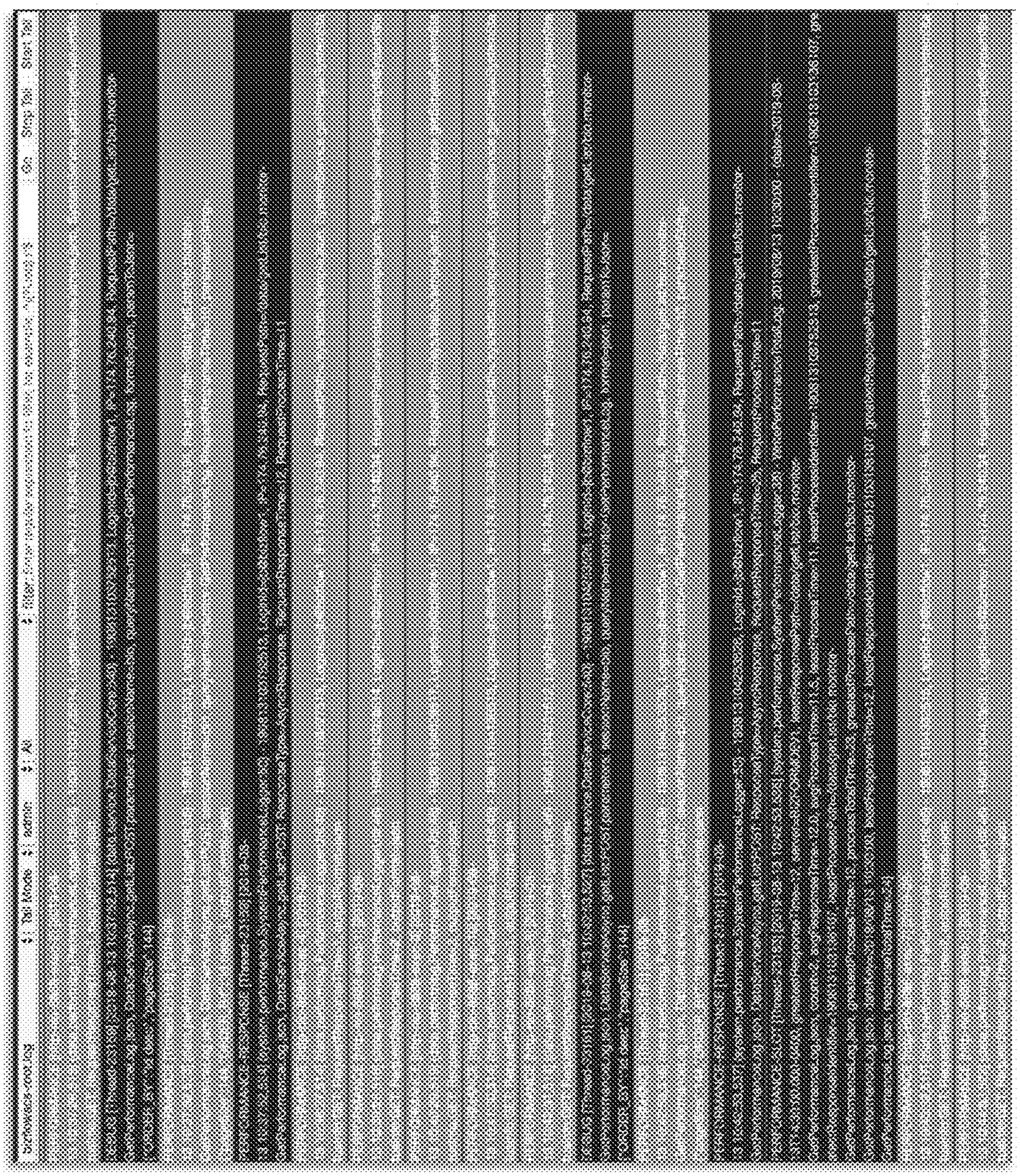
Figure 65:
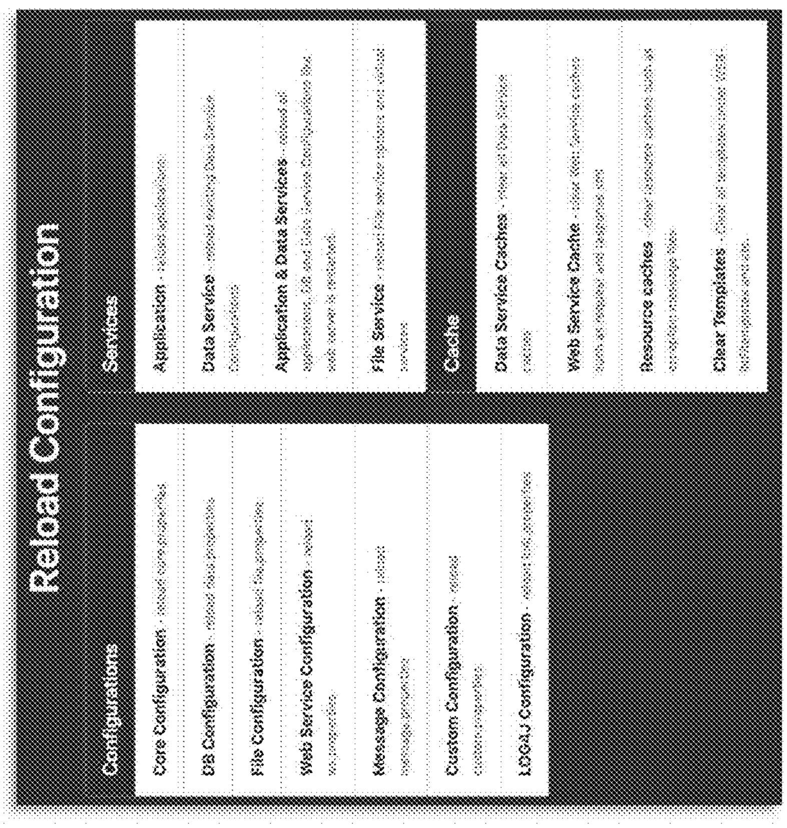
FIGS. 65, 66, 67, 68, and 69 are diagrams of user interfaces to facilitate managing users, servers, and databases of data-centric networked application development services according to various exemplary embodiments.
Figure 66:
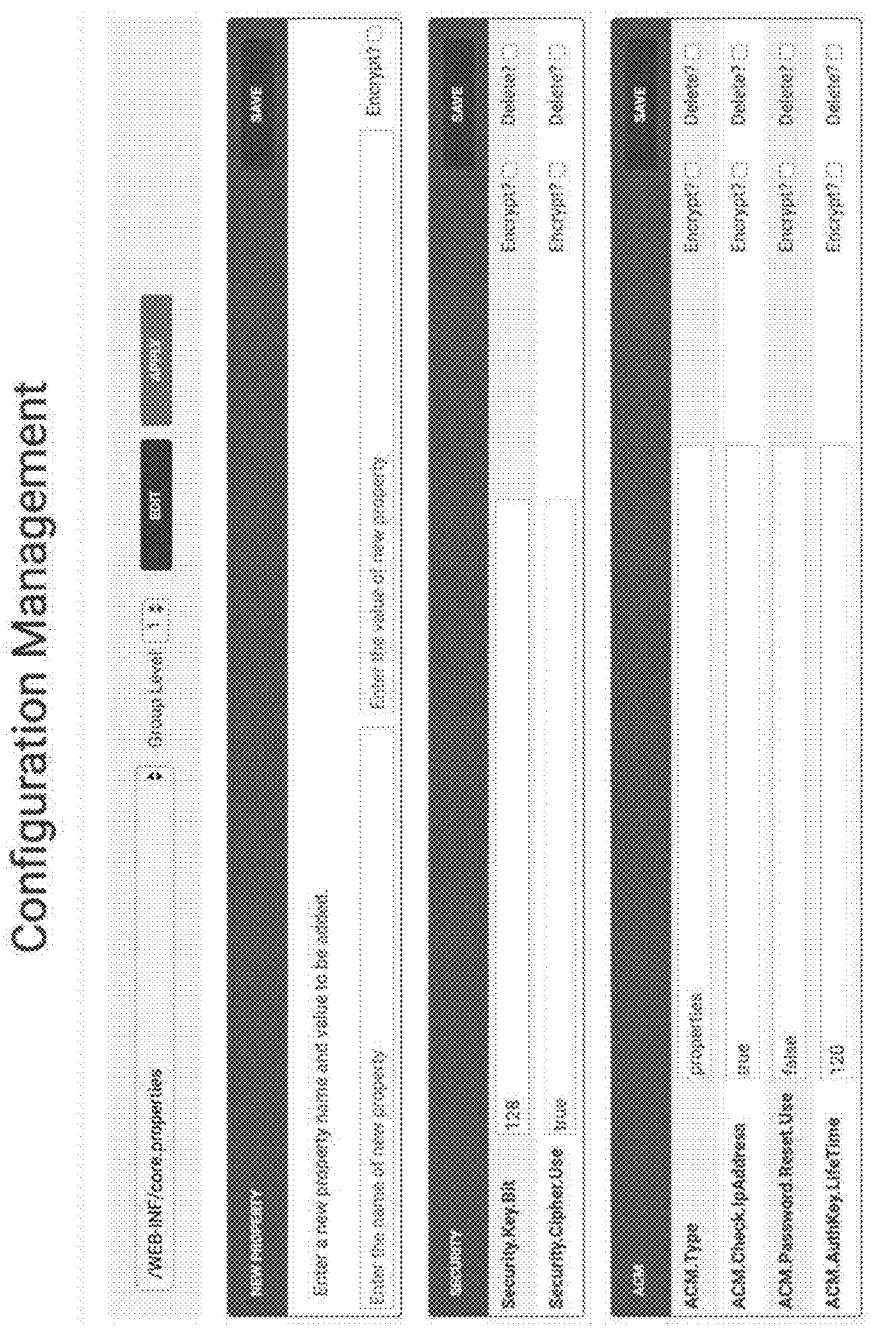
Figure 67:
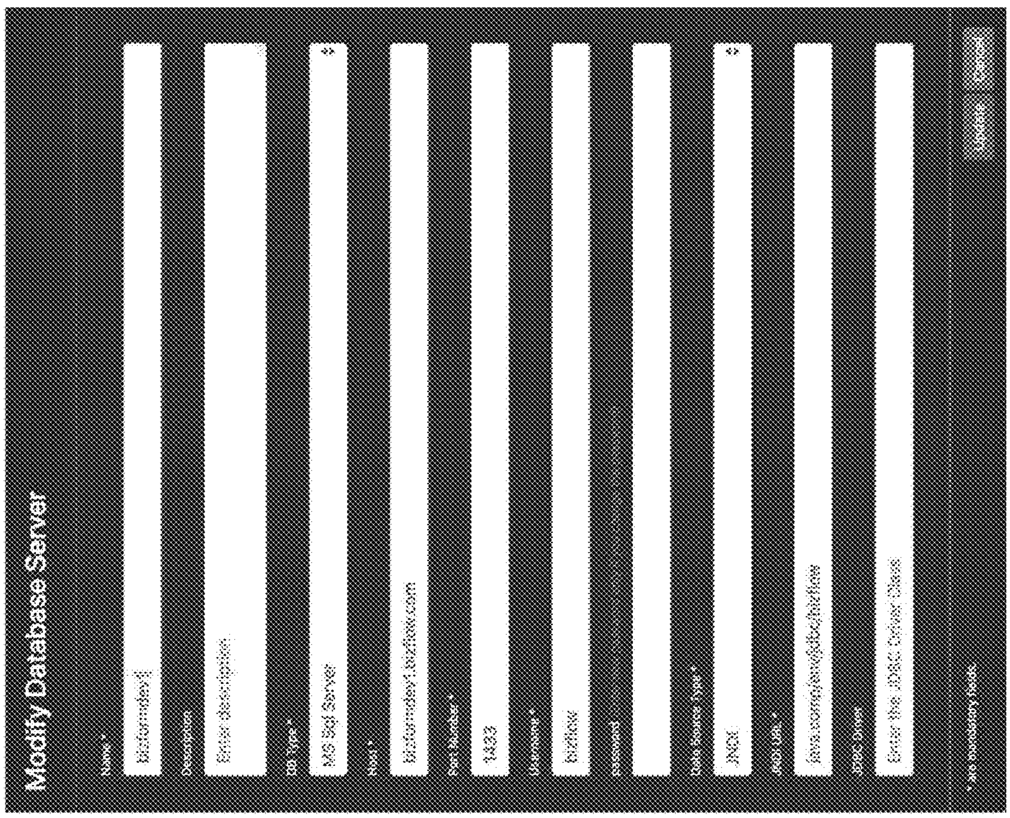
Figure 68:
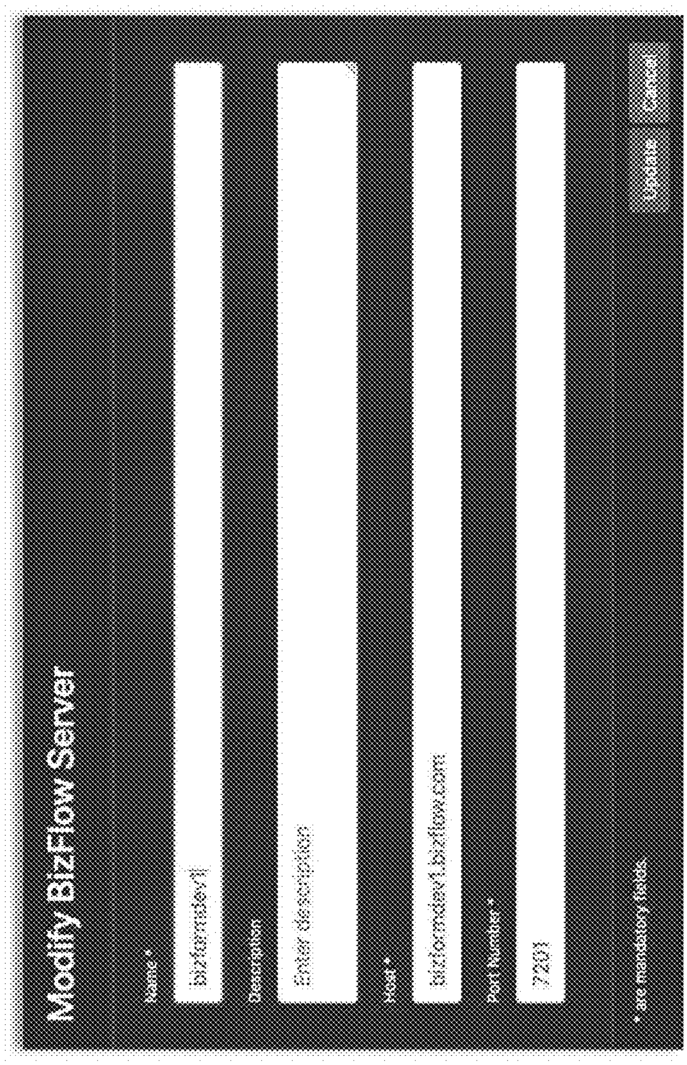
Figure 69:
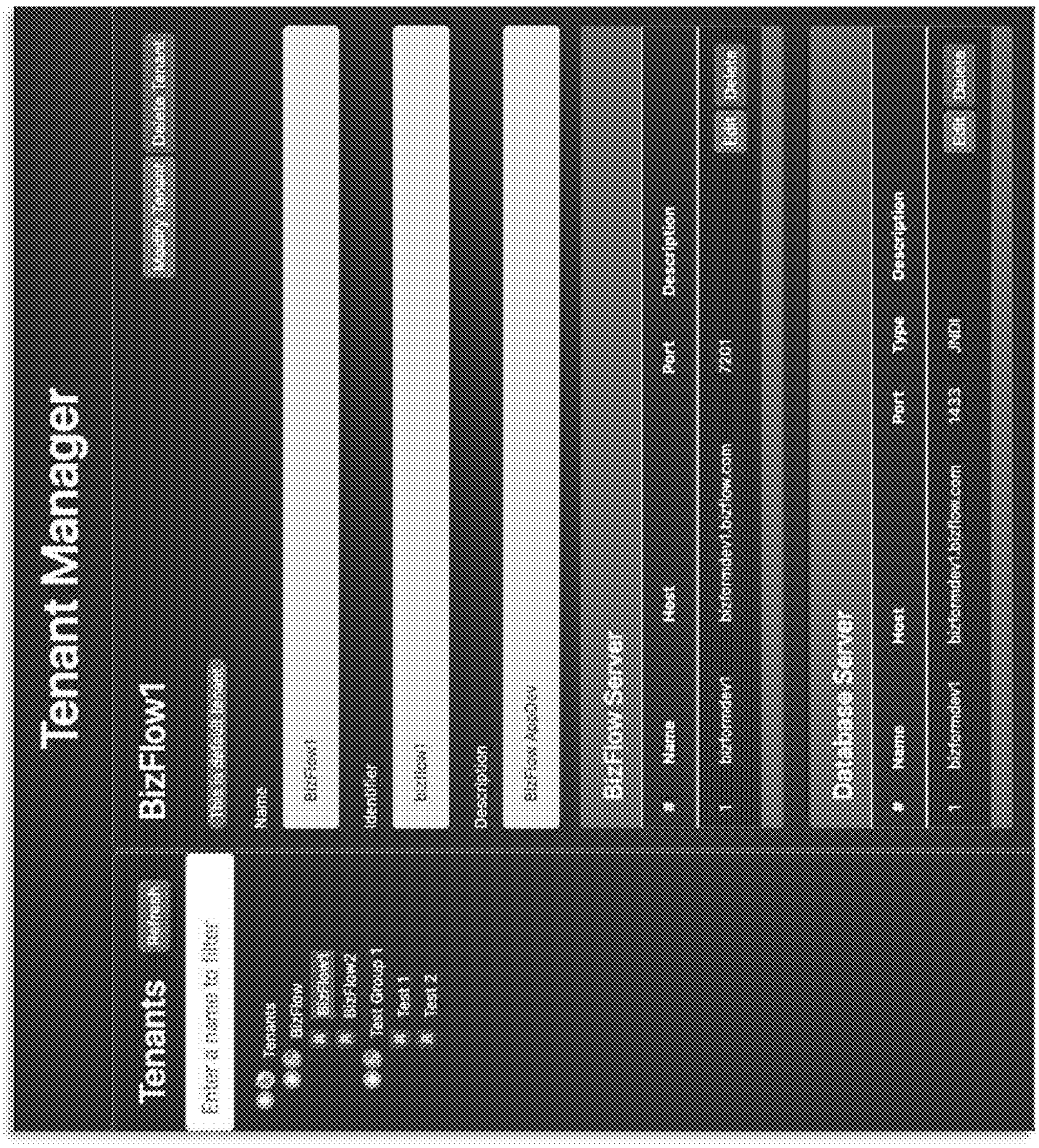

As previously mentioned, integration services 113 may provide various additional features to support data-centric networked application development. Some of these additional features may be made available to users via the user interfaces of FIGS. 48-69. FIG. 48 is a diagram of a user interface for query management according to some exemplary embodiments. FIGS. 49 and 50 are diagrams of user interfaces for database browsing according to various exemplary embodiments. FIGS. 51, 52, 53, and 54 are diagrams of user interfaces for accessing and reviewing application program interface documentation according to various exemplary embodiments. FIGS. 55 and 56 are diagrams of user interfaces for application program interface testing according to various exemplary embodiments. FIGS. 57, 58, 59, 60, 61, and 62 are diagrams of user interfaces for testing performance of various aspects of data-centric networked application development services according to various exemplary embodiments. FIGS. 63 and 64 are diagrams of user interfaces for viewing log information according to various exemplary embodiments. FIGS. 65, 66, 67, 68, and 69 are diagrams of user interfaces to facilitate managing users, servers, and databases of data-centric networked application development services according to some exemplary embodiments.

The processes described herein for providing data-centric network application development services may be implemented via software, hardware (e.g., general processor, Digital Signal Processing (DSP) chip, an Application Specific Integrated Circuit (ASIC), Field Programmable Gate Arrays (FPGAs), etc.), firmware, or any a combination thereof. Such exemplary hardware for performing the described functions is provided below.

Figure 70:
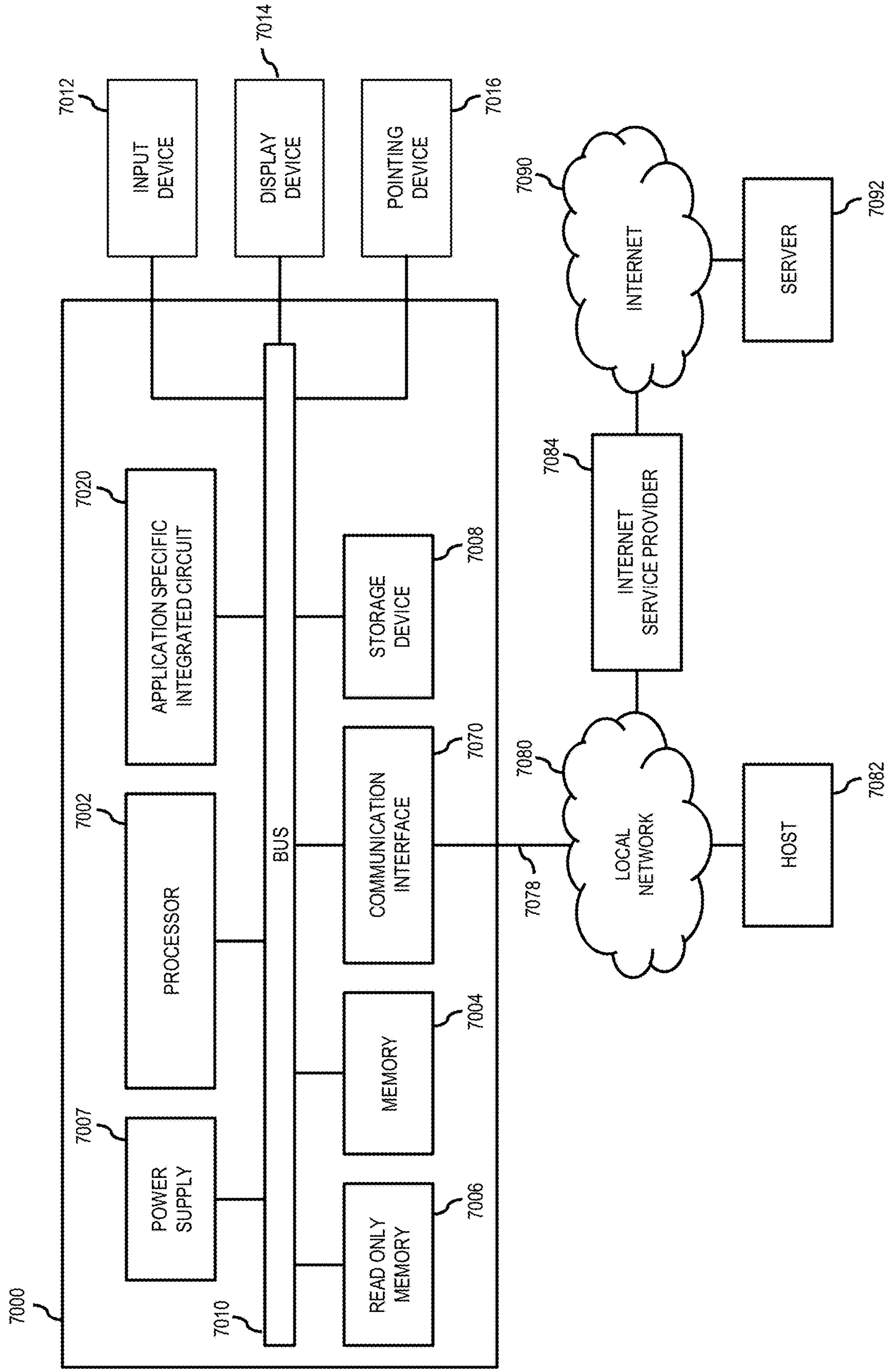
FIG. 70 is a diagram of hardware configured to implement one or more exemplary embodiments.

FIG. 70 illustrates computer system 7000 upon which one or more exemplary embodiments may be implemented. Computer system 7000 is programmed (e.g., via computer program code or instructions) to provide data-centric networked application development services as described herein and includes, for example, a communication mechanism, such as bus 7010, for passing information between internal and external components of computer system 7000. Information (also referred to as data) is represented as a physical expression of a measurable phenomenon, typically electric voltages, but including, in other exemplary embodiments, such phenomena as magnetic, electromagnetic, pressure, chemical, biological, molecular, atomic, sub-atomic, and/or quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some exemplary embodiments, information called analog data is represented by a near continuum of measurable values within a particular range.

Bus 7010 includes one or more parallel conductors of information so that information can be transferred quickly among devices coupled to bus 7010. One or more processors 7002 for processing information are coupled to bus 7010.

Processor(s) 7002 perform a set of operations on information as specified by computer program code related to data-centric networked application development services. The computer program code is a set of instructions or statements providing instructions for operation of processor 7002 and/or computer system 7000 to perform specified functions. The code, for example, may be written in a computer programming language that is compiled into a native instruction set of processor 7002. The code may also be written directly using the native instruction set (e.g., machine language). The set of operations include bringing information in from bus 7010 and placing information on bus 7010. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by processor 7002 is represented to processor 7020 by information called instructions, such as an operation code of one or more digits. A sequence of operations to be executed by processor 7002, such as a sequence of operation codes, constitute processor instructions, also called computer system instructions or, simply, computer instructions. Processors 7020 may be implemented as at least one of mechanical, electrical, magnetic, optical, chemical, and quantum components, among others.

Computer system 7000 also includes memory 7004 coupled to bus 7010. In some exemplary embodiments, memory 7004, such as a random access memory (RAM) or other dynamic storage device, stores information including processor instructions for data-centric networked application development services. Dynamic memory allows information stored therein to be changed by the computer system 7000. RAM allows a unit of information stored at a location called a memory address to be stored and retrieved independently of information at neighboring addresses. Memory 7004 is also used by processor 7002 to store temporary values during execution of processor instructions. Computer system 7000 also includes read only memory (ROM) 7006 or other static storage device coupled to bus 7010 for storing static information, including instructions, that is not changed by computer system 7000. Some memory is composed of volatile storage that loses the information stored thereon when power is lost, such as power provided via power supply 7007. Also coupled to bus 7010 is a non-volatile (persistent) storage device 7008, such as at least one of a magnetic disk, an optical disk, and a flash card, for storing information, including instructions, that persist even when computer system 7000 is turned off or otherwise loses power.

Information, including instructions for data-centric networked application development services, is provided to bus 7010 for use by processor 7002 from external input device 7012, such as a keyboard containing alphanumeric keys operated by a human user, or a sensor. A sensor detects conditions in its vicinity and transforms those detections into physical expression compatible with the measurable phenomenon used to represent information in computer system 7000. Other external devices coupled to bus 7010, used primarily for interacting with humans, may include display device 7014, such as a cathode ray tube (CRT), an electrophoretic display (EPD), an electrowetting display (EWD), a field emission display (FED), an inorganic electroluminescent display (ELD), a liquid crystal display (LCD), an organic light-emitting display (QLED), a plasma display (PD), or a surface-conduction electron-emitter display (SED) screen or printer for presenting text or images, and pointing device 7016, such as at least one of a mouse, a trackball, cursor direction keys, and motion sensor, for controlling a position of a cursor image presented via display 7014 and issuing commands associated with graphical elements presented via display 7014. In some exemplary embodiments, for example, in embodiments in which computer system 7000 performs all functions automatically without human input, one or more of external input device 7012, display device 7014, and pointing device 7016 may be omitted.

According to some exemplary embodiments, special purpose hardware, such as application specific integrated circuit (ASIC) 7020, is coupled to bus 7010. The special purpose hardware may be configured to perform operations not performed by processor 7002 quickly enough for special purposes. Examples of special purpose hardware include graphics accelerator cards for generating images for display 7014, cryptographic boards for encrypting and decrypting messages sent over a communication network, speech recognition, and interfaces to special external devices, such as robotic arms and scanning equipment that repeatedly perform some complex sequence of operations that are more efficiently implemented in hardware.

Computer system 7000 also includes one or more instances of communication interface 7070 coupled to bus 7010. Communication interface 7070 provides one-way or two-way communication coupling to a variety of external devices that operate with their own processors, such as printers, scanners and external disks. In general the coupling is with link 7078 that is connected to a local network 7080 to which a variety of external devices with their own processors are connected. For example, communication interface 7070 may be a parallel port or a serial port or a universal serial bus (USB) port on a personal computer. In some exemplary embodiments, communications interface 7070 is an integrated services digital network (ISDN) card or a digital subscriber line (DSL) card or a telephone modem that provides an information communication connection to a corresponding type of telephone line. In some exemplary embodiments, communication interface 7070 is a cable modem that converts signals on bus 7010 into signals for a communication connection over a coaxial cable or into optical signals for a communication connection over a fiber optic cable. In some exemplary embodiments, communications interface 7070 may be a local area network (LAN) card to provide a data communication connection to a compatible LAN, such as Ethernet. Wireless links may also be implemented. For wireless links, communications interface 7070 may send or receive (or transceive) electrical, acoustic, and/or electromagnetic signals, including infrared and optical signals, that carry information streams, such as digital data. For example, in wireless handheld devices, such as mobile telephones like cell phones, communications interface 7070 includes a radio band electromagnetic transmitter and receiver called a radio transceiver. In some exemplary embodiments, communications interface 7070 enables connection to the communication network and/or the service provider network of FIG. 1 for data-centric networked application development services.

The term computer-readable medium as used herein refers to any medium that participates in providing information to processor 7002, including instructions for execution. Such a medium may take many forms, including, but not limited to, at least one of non-volatile media, volatile media, and transmission media. Non-volatile media include, for example, optical or magnetic disks, such as storage device 7008. Volatile media include, for example, dynamic memory, such as memory 7004. Transmission media include, for example, coaxial cables, copper wire, fiber optic cables, and carrier waves that travel through space without wires or cables, such as acoustic waves and electromagnetic waves, including radio, optical and infrared waves. It is also noted that signals may include man-made transient variations in amplitude, frequency, phase, polarization, and/or other physical properties transmitted through transmission media. Some forms of computer-readable media include, for example, a floppy disk, a flexible disk, a hard disk, a magnetic tape, any other magnetic medium, a CD-ROM, a CD-RW, a DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Although certain exemplary embodiments and implementations have been described herein, other embodiments and modifications will be apparent from this description. Accordingly, the inventive concepts are not limited to such embodiments, but rather to the broader scope of the accompanying claims and various obvious modifications and equivalent arrangements as would be apparent to one of ordinary skill in the art.

What is claimed is:

1. A method for data-centric networked application development, the method comprising:

modifying a data model displayed via a graphical user interface of a networked application development environment with a selectable component for including a reusable data entity in a project, the reusable data entity being defined and bound to a form component via interaction with the graphical user interface;

configuring a block of a data-centric form of the project with the form component in response to selection of the selectable component from the data model at a design surface of the graphical user interface;

generating predefined APIs to store the data model as abstract data to a user database, and as instances of data collected as nested values in the data model, and using the predefined APIs to cause, at least in part, the instances of data collected to be stored to corresponding storage locations in concrete data of the user database, wherein the reusable data entity defines a piece of collectable data.

2. The method of claim 1, further comprising:

receiving, via the graphical user interface, selection of a first plurality of parameters associated with a piece of collectable data; and generating data schema defining the reusable data entity utilizing the first plurality of parameters.

3. The method of claim 2, wherein the data schema comprises the first plurality of parameters stored as nested objects in at least one of a JavaScript Object Notation (JSON) document tree and an Extensible Markup Language (XML) tree.

4. The method of claim 3, wherein, in association with collection of the piece of collectable data from at least one target via the data-centric form, instances of the piece of collectable data are stored as nested values in at least one of the JSON document tree and the XML document tree.

5. The method of claim 3, further comprising:

mapping, in association with configuring the data-centric form, at least one of the first plurality of parameters in the data schema to a database location according to a predefined application programming interface for collection of the piece of collectable data from at least one target via the data-centric form, wherein the predefined application programming interface is database agnostic.

6. The method of claim 5, further comprising:

receiving, via the design surface, an interaction to modify a position of the block of the data-centric form relative to another block of the data-centric form, wherein modification of the position in association with the interaction does not affect the mapping of the at least one of the first plurality of parameters in the data schema to the database location.

7. The method of claim 5, wherein the database location is a row in a Structured Query Language (SQL) database table.

8. The method of claim 2, further comprising:

generating form schema defining the form component utilizing a plurality of look-and-feel parameters received via the graphical user interface, the look-and-feel parameters governing configuration of the form component; and mapping the data schema to the form schema to bind the reusable data entity to the form component.

9. The method of claim 2, further comprising:

receiving a request to publish the reusable data entity to the project, wherein the selectable component is modified to the graphical user interface in response to receiving the request.

10. The method of claim 1, wherein the selectable component is one of a plurality of selectable components modified to the graphical user interface, each of the plurality of selectable components enabling inclusion of at least one of another reusable data entity bound to another form component, a group of reusable data entities bound to corresponding form components, and a block of a previously configured data-centric form.

11. The method of claim 10, wherein some of the plurality of selectable components are modified to the graphical user interface from a predefined library.

12. The method of claim 11, wherein the some of the plurality of selectable components are modified to the graphical user interface from the predefined library based on user profile information and at least one business rule.

13. The method of claim 1, further comprising:

receiving a request to publish the data-centric form; and causing, at least in part, the data-centric form to be deployed to at least one network node.

14. The method of claim 1, wherein the selection of the selectable component is a drag-and-drop input.

15. The method of claim 1, wherein the graphical user interface comprises a "what you see is what you get" (WYSIWYG) editor configured to automatically generate underlying computer code for the data-centric form in response to interaction with the graphical user interface.

16. The method of claim 1, wherein the graphical user interface is provided over at least one network via a portal uniquely accessible to users via corresponding uniform resource locators.

17. The method of claim 16, wherein communication over the at least one network is encrypted according to an Advanced Encryption Standard utilizing temporary keys.

18. The method of claim 1, wherein the graphical user interface is configured to interact with an integration server configured to provide access to one or more services associated with development of the data-centric form, the one or more services comprising at least one of application programming interface services, monitoring services, and reporting services.

19. A system for providing data-centric networked application development services to a user over at least one network, the system comprising:

a portal configured to provide the user unique access to a graphical user interface of an application development environment, the user being assigned a unique uniform resource locator to access the portal over the at least one network;

a first server coupled to the portal via the at least one network, the first server being configured to provide a data-centric form building engine to the graphical user interface to enable the user to:

generate a data model including a data entity defining a piece of collectable data via a plurality of first parameter selections, the data entity being bound to a form component capable of receiving the piece of data;

customize the form component via a plurality of second parameter selections;

develop a data-centric form via gesture-based interaction with at least a representation of the data model;

interface with a database configured to store the data model along with instances of the piece of collectable data as nested values in the data model; and publish a networked application to enable collection of the piece of collectable data from a target via the data-centric form; and a second server coupled to the first server via the at least one network, the second server being configured to provide access, via the graphical user interface, to an application programming interface service to support the data-centric form, wherein, in association with the development of the data-centric form, the data-centric form building engine is configured to:

modify the graphical user interface with a selectable component for including the data entity in a project of the networked application, the selectable component being configured as part of the representation of the data model presented via the graphical user interface;

configure a block of the data-centric form of the project with the form component in response to selection of the selectable component from the data model at a design surface of the graphical user interface;

generate predefined APIs to store the data model as abstract data to a user database and as instances of data collected as nested values in the data model, and use the predefined APIs to cause, at least in part, the instances of data collected to be stored to corresponding storage locations in concrete data of the user database, and wherein the data entity defines a piece of collectable data.

20. A method for data-centric networked application development, the method comprising:

defining a reusable data entity based on reception of a first plurality of parameters associated with a piece of collectable data;

binding, after defining the reusable data entity, the reusable data entity to a form component based on reception of a second plurality of parameters associated with the form component; and modifying a graphical user interface of a networked application development environment with a selectable component for including the reusable data entity in a project; and configuring a block of a data-centric form of the project with the form component in response to selection of the selectable component at a design surface of the graphical user interface;

generating predefined APIs to store the data model as abstract data to a user database and as instances of data collected as nested values in the data model, and using the predefined APIs to cause, at least in part, the instances of data collected to be stored to corresponding storage locations in concrete data of the user database.

* * * * *